US010853399B2

(12) United States Patent
Miller et al.

(10) Patent No.: US 10,853,399 B2
(45) Date of Patent: Dec. 1, 2020

(54) USER INTERFACE SEARCH TOOL FOR LOCATING AND SUMMARIZING DATA

(71) Applicant: Splunk Inc., San Francisco, CA (US)

(72) Inventors: Jesse Miller, Piedmont, CA (US); Jason Szeto, Belmont, CA (US); Jose Solis, Mountain View, CA (US); Jindrich Dinga, Los Altos, CA (US); David Marquardt, San Francisco, CA (US)

(73) Assignee: Splunk Inc., San Francisco, CA (US)

( * ) Notice: Subject to any disclaimer, the term of this patent is extended or adjusted under 35 U.S.C. 154(b) by 263 days.

(21) Appl. No.: 15/479,804

(22) Filed: Apr. 5, 2017

(65) Prior Publication Data
US 2018/0293308 A1 Oct. 11, 2018

(51) Int. Cl.
*G06F 16/34* (2019.01)
*G06T 11/20* (2006.01)
*G06F 16/335* (2019.01)
*G06F 16/35* (2019.01)

(52) U.S. Cl.
CPC .......... *G06F 16/345* (2019.01); *G06F 16/335* (2019.01); *G06F 16/358* (2019.01); *G06T 11/206* (2013.01); *G06T 2200/24* (2013.01)

(58) Field of Classification Search
CPC .. G06F 16/345; G06F 163/335; G06F 16/358; G06T 11/206
See application file for complete search history.

(56) References Cited

U.S. PATENT DOCUMENTS

| 8,024,329 | B1 | 9/2011 | Rennison | |
|---|---|---|---|---|
| 9,514,183 | B1 | 12/2016 | Alla | |
| 2003/0046307 | A1* | 3/2003 | Rivette | G06F 16/34 |
| 2003/0101183 | A1 | 5/2003 | Kabra et al. | |
| 2004/0117377 | A1* | 6/2004 | Moser | G06F 16/254 |
| 2004/0133564 | A1 | 7/2004 | Gross et al. | |
| 2005/0262062 | A1 | 11/2005 | Xia | |
| 2007/0033104 | A1* | 2/2007 | Collins | G06F 17/2785 |
| | | | | 705/14.41 |
| 2007/0112727 | A1 | 5/2007 | Jardine et al. | |
| 2007/0226640 | A1* | 9/2007 | Holbrook | G06F 16/951 |
| | | | | 715/765 |
| 2007/0244849 | A1 | 10/2007 | Predovic | |
| 2008/0005118 | A1 | 1/2008 | Shakib et al. | |
| 2008/0104542 | A1* | 5/2008 | Cohen | G06F 16/951 |
| | | | | 715/810 |
| 2008/0288527 | A1 | 11/2008 | Ames et al. | |
| 2010/0211564 | A1 | 8/2010 | Cohen et al. | |

(Continued)

OTHER PUBLICATIONS

Vaid, Workshop on Managing Systems via log Analysis and Machine Learning Techniques (SLAML '10), ;login: vol. 36, No. 1, Oct. 3, 2010, Vancouver, BC, Canada.

*Primary Examiner* — Cam Y T Truong
(74) *Attorney, Agent, or Firm* — Knobbe, Martens, Olson & Bear, LLP

(57) ABSTRACT

Systems and methods are disclosed involving user interface (UI) search tools for locating data, including tools for summarizing indexed raw machine data that organize and present results to enable expansion and exploration of initial summarizations. The initial summarizations may be explored and refined to help users determine how to identify and best focus a search on data subsets of greater interest.

29 Claims, 24 Drawing Sheets

(56) References Cited

U.S. PATENT DOCUMENTS

| | | |
|---|---|---|
| 2011/0191373 A1 | 8/2011 | Botros et al. |
| 2011/0314400 A1 | 12/2011 | Mital et al. |
| 2012/0110515 A1* | 5/2012 | Abramoff ............ G06F 16/904 |
| | | 715/854 |
| 2012/0166416 A1* | 6/2012 | Murdock ........... G06Q 30/0263 |
| | | 707/711 |
| 2012/0278316 A1* | 11/2012 | Reznik ................. G06F 16/951 |
| | | 707/723 |
| 2013/0041896 A1* | 2/2013 | Ghani ................ G06F 16/3329 |
| | | 707/732 |
| 2013/0226922 A1 | 8/2013 | Labenski et al. |
| 2013/0238631 A1 | 9/2013 | Carmel et al. |
| 2014/0279856 A1 | 9/2014 | Srinivasan et al. |
| 2015/0169726 A1* | 6/2015 | Kara .................. G06Q 10/0639 |
| | | 707/737 |
| 2015/0212663 A1* | 7/2015 | Papale ................. G06F 16/245 |
| | | 715/762 |
| 2016/0034525 A1 | 2/2016 | Neels et al. |
| 2016/0224660 A1 | 8/2016 | Munk et al. |
| 2016/0225271 A1 | 8/2016 | Robichaud |
| 2016/0371375 A1 | 12/2016 | Sasidhar |
| 2017/0060856 A1 | 3/2017 | Turtle et al. |
| 2017/0124156 A1* | 5/2017 | Chernyak .............. G06Q 50/01 |
| 2018/0293304 A1 | 10/2018 | Miller et al. |
| 2018/0293327 A1 | 10/2018 | Miller et al. |

* cited by examiner

FIG. 6A

| Data Summary | | | |
|---|---|---|---|
| Hosts (5) | Sources (8) | Sourcetypes (3) | |
| filter | | | |
| Host ≎ | | Count ≎ | Last Update ≎ |
| mailsv | ▬ ∨ | 9,829 | 4/29/14 1:32:47.000 PM |
| vendor_sales | ▬ ∨ | 30,244 | 4/29/14 1:32:46.000 PM |
| www1 | ▬ ∨ | 24,221 | 4/29/14 1:32:44.000 PM |
| www2 | ▬ ∨ | 22,595 | 4/29/14 1:32:47.000 PM |
| www3 | ▬ ∨ | 22,975 | 4/29/14 1:32:45.000 PM |

*Interface showing:* splunk> | App: Search &Reporting ~ | | Administrator ~ | ⊡Messages~ | Settings~ | Activity~ | Help~ | Find
Search | Datasets | Report | Alerts | Dashboards | | | | | | Locate Data

Locate Data

Search for your data with a keyword or field name. After you have located your data, expand a row to view Timeline, Top Fields, and a Sample Event. Click Open in Search to run the search and further explore your data.

Keyword 1112: error
Index 1116: _internal, main, sample ~
Source Type 1118: All ~   1153
Split By 1120: [≡Index][≡Sourcetype][≡Source]   1122
Split By Order 1152: Drag the buttons to change the split by order Time Range 1114: All time ~   1110
Sort order: [≡Count][≡Index][≡Sourcetype][≡Source]   1154 1156 1158 1124
Drag the buttons to change the sort order   1159
[Locate] 1126

Generated tstats 1128A: Open in Search
| stats count where (index=_internal or index=sample) TERM(error) by index sourcetype source | sort -count index sourcetype source   1128B   1128

1,676 events (before 12/16/16 1:56:31.000 PM)   1130

7 results   1140   Job ~ ∥   20 per page ~

| i | Index | Sourcetype | Source | Count | Action |
|---|---|---|---|---|---|
| > | sample | sendmail | /home/jsoils/splunk-home/etc/apps/sample_app/logs/mailog.1 | 738 | Open in Search |
| > | main | splunkd_ui_access | /home/jsoils/splunk-home/var/log/splunk/splunkd_ui_access.log | 497 | Open in Search |
| > | sample | sendmail | /home/jsoils/splunk-home/etc/apps/sample_app/logs/mailog | 362 | Open in Search |
| > | main | splunkd | /home/jsoils/splunk-home/var/log/splunk/splunkd.log | 36 | Open in Search |
| > | main | splunk_web-access | /home/jsoils/splunk-home/var/log/splunk/web_access.log | 33 | Open in Search |
| > | main | splunk_web-service | /home/jsoils/splunk-home/var/log/splunk/web_service.log | 8 | Open in Search |
| > | main | access_combined | websample.log.txt | 2 | Open in Search |

USER INTERFACE SEARCH TOOL FOR LOCATING AND SUMMARIZING DATA

RELATED APPLICATIONS

The present application is being filed concurrently with U.S. app. Ser. Nos. 15/479,823 and 15/479,852, entitled LOCATING AND CATEGORIZING DATA USING INVERTED INDEXES and SAMPLING DATA USING INVERTED INDEXES IN RESPONSE TO GROUPING SELECTION, respectively, each of which is incorporated herein by reference in its entirety.

FIELD

At least one embodiment of the present disclosure pertains to one or more tools for searching and analyzing large sets of data to locate data of interest.

BACKGROUND

Information technology (IT) environments can include diverse types of data systems that store large amounts of diverse data types generated by numerous devices. For example, a big data ecosystem may include databases such as MySQL and Oracle databases, cloud computing services such as Amazon web services (AWS), and other data systems that store passively or actively generated data, including machine-generated data ("machine data"). The machine data can include performance data, diagnostic data, or any other data that can be analyzed to diagnose equipment performance problems, monitor user interactions, and to derive other insights.

The large amount and diversity of data systems containing large amounts of structured, semi-structured, and unstructured data relevant to any search query can be massive, and continues to grow rapidly. This technological evolution can give rise to various challenges in relation to managing, understanding and effectively utilizing the data. To reduce the potentially vast amount of data that may be generated, some data systems pre-process data based on anticipated data analysis needs. In particular, specified data items may be extracted from the generated data and stored in a data system to facilitate efficient retrieval and analysis of those data items at a later time. At least some of the remainder of the generated data is typically discarded during pre-processing.

However, storing massive quantities of minimally processed or unprocessed data (collectively and individually referred to as "raw data") for later retrieval and analysis is becoming increasingly more feasible as storage capacity becomes more inexpensive and plentiful. In general, storing raw data and performing analysis on that data later can provide greater flexibility because it enables an analyst to analyze all of the generated data instead of only a fraction of it.

Although the availability of vastly greater amounts of diverse data on diverse data systems provides opportunities to derive new insights, it also gives rise to technical challenges to search and analyze the data. Tools exist that allow an analyst to search data systems separately and collect results over a network for the analyst to derive insights in a piecemeal manner. However, UI tools that allow analysts to quickly search and analyze large set of raw machine data to visually identify data subsets of interest, particularly via straightforward and easy-to-understand sets of tools and search functionality do not exist.

BRIEF DESCRIPTION OF THE DRAWINGS

In the drawings:

FIG. 6A illustrates a search screen in accordance with one or more embodiments;

FIG. 6B illustrates a data summary dialog that enables a user to select various data sources in accordance with one or more embodiments;

FIGS. 7A-7D illustrate a series of user interface screens for an example data model-driven report generation interface in accordance with one or more embodiments;

FIGS. 13A-13B illustrate user interface screens for example search interfaces including sample event and field information for selected results in accordance with one or more embodiments;

FIGS. 14A and 14B illustrate user interface screens for an example search interface including interactive search, interface objects, and display features in accordance with one or more embodiments;

DETAILED DESCRIPTION

Figure 1:
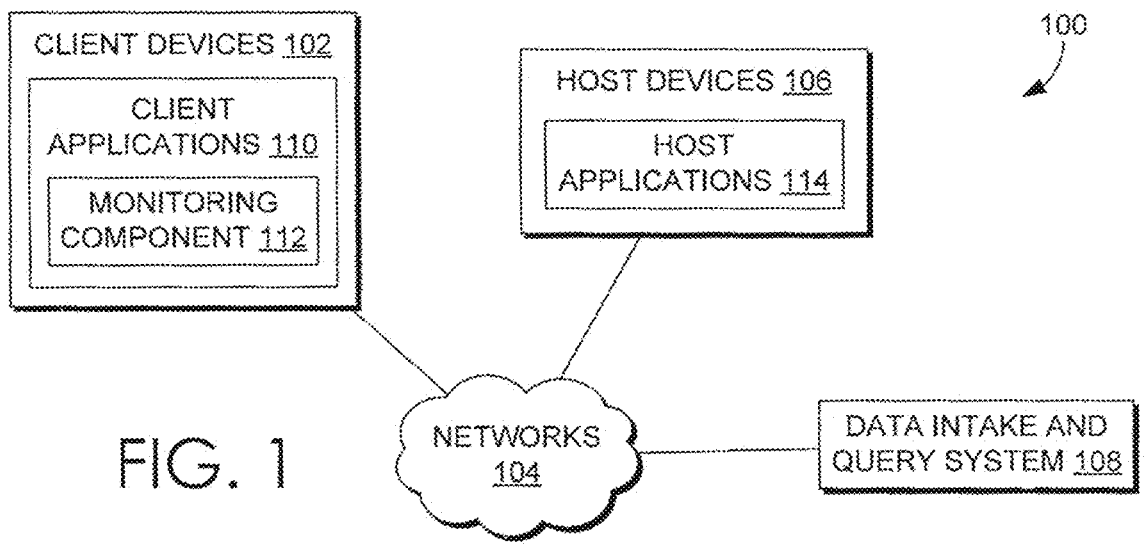
FIG. 1 illustrates a networked computer environment in which one or more embodiments may be implemented.

Embodiments are described herein according to the following outline:
1.0. General Overview
2.0. Operating Environment
  2.1. Host Devices
  2.2. Client Devices
  2.3. Client Device Applications
  2.4. Data Server System
  2.5. Data Ingestion
    2.5.1. Input
    2.5.2. Parsing
    2.5.3. Indexing
  2.6. Query Processing
  2.7. Field Extraction
  2.8. Example Search Screen
  2.9. Data Modelling
  2.10. Acceleration Techniques
    2.10.1. Aggregation Technique
    2.10.2. Keyword Index
    2.10.3. High Performance Analytics Store
    2.10.4. Accelerating Report Generation
  2.11. Security Features
  2.12. Data Center Monitoring
  2.13. Cloud-Based System Overview
  2.14. Searching Externally Archived Data
    2.14.1. ERP Process Features
3.0. Locate Data Tool
  3.1 User Interface
  3.2 Locating and Sampling Data 1.0. General Overview Modern data centers and other computing environments can comprise anywhere from a few host computer systems to thousands of systems configured to process data, service requests from remote clients, and perform numerous other computational tasks. During operation, various components within these computing environments often generate significant volumes of machine-generated data. For example, machine data is generated by various components in the information technology (IT) environments, such as servers, sensors, routers, mobile devices, Internet of Things (IoT) devices, etc. Machine-generated data can include system logs, network packet data, sensor data, application program data, error logs, stack traces, system performance data, etc. In general, machine-generated data can also include performance data, diagnostic information, and many other types of data that can be analyzed to diagnose performance problems, monitor user interactions, and to derive other insights.

A number of tools are available to analyze machine data, that is, machine-generated data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that report these types of information.

These challenges can be addressed by using an event-based data intake and query system, such as the SPLUNK® ENTERPRISE system developed by Splunk Inc. of San Francisco, Calif. The SPLUNK® ENTERPRISE system is the leading platform for providing real-time operational intelligence that enables organizations to collect, index, and search machine-generated data from various web sites, applications, servers, networks, and mobile devices that power their businesses. The SPLUNK® ENTERPRISE system is particularly useful for analyzing data which is commonly found in system log files, network data, and other data input sources. Although many of the techniques described herein are explained with reference to a data intake and query system similar to the SPLUNK® ENTERPRISE system, these techniques are also applicable to other types of data systems.

In the SPLUNK® ENTERPRISE system, machine-generated data are collected and stored as "events". An event comprises a portion of the machine-generated data and is associated with a specific point in time. For example, events may be derived from "time series data," where the time series data comprises a sequence of data points (e.g., performance measurements from a computer system, etc.) that are associated with successive points in time. In general, each event can be associated with a timestamp that is derived from the raw data in the event, determined through interpolation between temporally proximate events having known timestamps, or determined based on other configurable rules for associating timestamps with events, etc.

In some instances, machine data can have a predefined format, where data items with specific data formats are stored at predefined locations in the data. For example, the machine data may include data stored as fields in a database table. In other instances, machine data may not have a predefined format, that is, the data is not at fixed, predefined locations, but the data does have repeatable patterns and is not random. This means that some machine data can comprise various data items of different data types and that may be stored at different locations within the data. For example, when the data source is an operating system log, an event can include one or more lines from the operating system log containing raw data that includes different types of performance and diagnostic information associated with a specific point in time.

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The data generated by such data sources can include, for example and without limitation, server log files, activity log files, configuration files, messages, network packet data, performance measurements, sensor measurements, etc.

The SPLUNK® ENTERPRISE system uses flexible schema to specify how to extract information from the event data. A flexible schema may be developed and redefined as needed. Note that a flexible schema may be applied to event data "on the fly," when it is needed (e.g., at search time, index time, ingestion time, etc.). When the schema is not applied to event data until search time it may be referred to as a "late-binding schema."

During operation, the SPLUNK® ENTERPRISE system starts with raw input data (e.g., one or more system logs, streams of network packet data, sensor data, application program data, error logs, stack traces, system performance data, etc.). The system divides this raw data into blocks (e.g., buckets of data, each associated with a specific time frame, etc.), and parses the raw data to produce timestamped events. The system stores the timestamped events in a data store. The system enables users to run queries against the stored data to, for example, retrieve events that meet criteria specified in a query, such as containing certain keywords or having specific values in defined fields. As used herein throughout, data that is part of an event is referred to as "event data". In this context, the term "field" refers to a location in the event data containing one or more values for a specific data item. As will be described in more detail herein, the fields are defined by extraction rules (e.g., regular expressions) that derive one or more values from the portion of raw machine data in each event that has a particular field specified by an extraction rule. The set of values so produced are semantically-related (such as IP address), even though the raw machine data in each event may be in different formats (e.g., semantically-related values may be in different positions in the events derived from different sources).

As noted above, the SPLUNK® ENTERPRISE system utilizes a late-binding schema to event data while performing queries on events. One aspect of a late-binding schema is applying "extraction rules" to event data to extract values for specific fields during search time. More specifically, the extraction rules for a field can include one or more instructions that specify how to extract a value for the field from the event data. An extraction rule can generally include any type of instruction for extracting values from data in events. In certain cases, an extraction rule can identify a particular system to which the extraction rule is to be applied. For example, the extraction rule can identify a particular index (also referred to herein as a partition), host, source, or sourcetype associated with events that include the data to be extracted. Accordingly, different extraction rules can be used to extract data from events with different origins or associated with different systems or partitions. In some cases, an extraction rule comprises a regular expression where a sequence of characters form a search pattern, in which case the rule is referred to as a "regex rule." The system applies the regex rule to the relevant event data to extract values for associated fields in the event data by searching the event data for the sequence of characters defined in the regex rule.

In the SPLUNK® ENTERPRISE system, a field extractor may be configured to automatically generate extraction rules for certain field values in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the SPLUNK® ENTERPRISE system maintains the underlying raw data and uses late-binding schema for searching the raw data, it enables a user to continue investigating and learn valuable insights about the raw data.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by disparate data sources, the system facilitates use of a "common information model" (CIM) across the disparate data sources (further discussed with respect to FIG. 5).

2.0. Operating Environment

FIG. 1 illustrates a networked computer system 100 in which an embodiment may be implemented. Those skilled in the art would understand that FIG. 1 represents one example of a networked computer system and other embodiments may use different arrangements.

The networked computer system 100 comprises one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In an embodiment, one or more client devices 102 are coupled to one or more host devices 106 and a data intake and query system 108 via one or more networks 104.

Networks 104 broadly represent one or more LANs, WANs, cellular networks (e.g., LTE, HSPA, 3G, and other cellular technologies), and/or networks using any of wired, wireless, terrestrial microwave, or satellite links, and may include the public Internet.

2.1. Host Devices

In the illustrated embodiment, a system 100 includes one or more host devices 106. Host devices 106 may broadly include any number of computers, virtual machine instances, and/or data centers that are configured to host or execute one or more instances of host applications 114. In general, a host device 106 may be involved, directly or indirectly, in processing requests received from client devices 102. Each host device 106 may comprise, for example, one or more of a network device, a web server, an application server, a database server, etc. A collection of host devices 106 may be configured to implement a network-based service. For example, a provider of a network-based service may configure one or more host devices 106 and host applications 114 (e.g., one or more web servers, application servers, database servers, etc.) to collectively implement the network-based application.

In general, client devices 102 communicate with one or more host applications 114 to exchange information. The communication between a client device 102 and a host application 114 may, for example, be based on the Hypertext Transfer Protocol (HTTP) or any other network protocol. Content delivered from the host application 114 to a client device 102 may include, for example, HTML documents, media content, etc. The communication between a client device 102 and host application 114 may include sending various requests and receiving data packets. For example, in general, a client device 102 or application running on a client device may initiate communication with a host application 114 by making a request for a specific resource (e.g., based on an HTTP request), and the application server may respond with the requested content stored in one or more response packets.

In the illustrated embodiment, one or more of host applications 114 may generate various types of performance data during operation, including event logs, network data, sensor data, and other types of machine-generated data. For example, a host application 114 comprising a web server may generate one or more web server logs in which details of interactions between the web server and any number of client devices 102 is recorded. As another example, a host device 106 comprising a router may generate one or more router logs that record information related to network traffic managed by the router. As yet another example, a host application 114 comprising a database server may generate one or more logs that record information related to requests sent from other host applications 114 (e.g., web servers or application servers) for data managed by the database server.

2.2. Client Devices

Client devices 102 of FIG. 1 represent any computing device capable of interacting with one or more host devices 106 via a network 104. Examples of client devices 102 may include, without limitation, smart phones, tablet computers, handheld computers, wearable devices, laptop computers, desktop computers, servers, portable media players, gaming devices, and so forth. In general, a client device 102 can provide access to different content, for instance, content provided by one or more host devices 106, etc. Each client device 102 may comprise one or more client applications 110, described in more detail in a separate section hereinafter.

2.3. Client Device Applications

In an embodiment, each client device 102 may host or execute one or more client applications 110 that are capable of interacting with one or more host devices 106 via one or more networks 104. For instance, a client application 110 may be or comprise a web browser that a user may use to navigate to one or more websites or other resources provided by one or more host devices 106. As another example, a client application 110 may comprise a mobile application or "app." For example, an operator of a network-based service hosted by one or more host devices 106 may make available one or more mobile apps that enable users of client devices 102 to access various resources of the network-based service. As yet another example, client applications 110 may include background processes that perform various operations without direct interaction from a user. A client application 110 may include a "plug-in" or "extension" to another application, such as a web browser plug-in or extension.

In an embodiment, a client application 110 may include a monitoring component 112. At a high level, the monitoring component 112 comprises a software component or other logic that facilitates generating performance data related to a client device's operating state, including monitoring network traffic sent and received from the client device and collecting other device and/or application-specific information. Monitoring component 112 may be an integrated component of a client application 110, a plug-in, an extension, or any other type of add-on component. Monitoring component 112 may also be a stand-alone process.

In one embodiment, a monitoring component 112 may be created when a client application 110 is developed, for example, by an application developer using a software development kit (SDK). The SDK may include custom monitoring code that can be incorporated into the code implementing a client application 110. When the code is converted to an executable application, the custom code implementing the monitoring functionality can become part of the application itself.

In some cases, an SDK or other code for implementing the monitoring functionality may be offered by a provider of a data intake and query system, such as a system 108. In such cases, the provider of the system 108 can implement the custom code so that performance data generated by the monitoring functionality is sent to the system 108 to facilitate analysis of the performance data by a developer of the client application or other users.

In an embodiment, the custom monitoring code may be incorporated into the code of a client application 110 in a number of different ways, such as the insertion of one or more lines in the client application code that call or otherwise invoke the monitoring component 112. As such, a developer of a client application 110 can add one or more lines of code into the client application 110 to trigger the monitoring component 112 at desired points during execution of the application. Code that triggers the monitoring component may be referred to as a monitor trigger. For instance, a monitor trigger may be included at or near the beginning of the executable code of the client application 110 such that the monitoring component 112 is initiated or triggered as the application is launched, or included at other points in the code that correspond to various actions of the client application, such as sending a network request or displaying a particular interface.

In an embodiment, the monitoring component 112 may monitor one or more aspects of network traffic sent and/or received by a client application 110. For example, the monitoring component 112 may be configured to monitor data packets transmitted to and/or from one or more host applications 114. Incoming and/or outgoing data packets can be read or examined to identify network data contained within the packets, for example, and other aspects of data packets can be analyzed to determine a number of network performance statistics. Monitoring network traffic may enable information to be gathered particular to the network performance associated with a client application 110 or set of applications.

In an embodiment, network performance data refers to any type of data that indicates information about the network and/or network performance. Network performance data may include, for instance, a URL requested, a connection type (e.g., HTTP, HTTPS, etc.), a connection start time, a connection end time, an HTTP status code, request length, response length, request headers, response headers, connection status (e.g., completion, response time(s), failure, etc.), and the like. Upon obtaining network performance data indicating performance of the network, the network performance data can be transmitted to a data intake and query system 108 for analysis.

Upon developing a client application 110 that incorporates a monitoring component 112, the client application 110 can be distributed to client devices 102. Applications generally can be distributed to client devices 102 in any manner, or they can be pre-loaded. In some cases, the application may be distributed to a client device 102 via an application marketplace or other application distribution system. For instance, an application marketplace or other application distribution system might distribute the application to a client device based on a request from the client device to download the application.

Examples of functionality that enables monitoring performance of a client device are described in U.S. patent application Ser. No. 14/524,748, entitled "UTILIZING PACKET HEADERS TO MONITOR NETWORK TRAFFIC IN ASSOCIATION WITH A CLIENT DEVICE", filed on 27 Oct. 2014, and which is hereby incorporated by reference in its entirety for all purposes.

In an embodiment, the monitoring component 112 may also monitor and collect performance data related to one or more aspects of the operational state of a client application 110 and/or client device 102. For example, a monitoring component 112 may be configured to collect device performance information by monitoring one or more client device operations, or by making calls to an operating system and/or one or more other applications executing on a client device 102 for performance information. Device performance information may include, for instance, a current wireless signal strength of the device, a current connection type and network carrier, current memory performance information, a geographic location of the device, a device orientation, and any other information related to the operational state of the client device.

In an embodiment, the monitoring component 112 may also monitor and collect other device profile information including, for example, a type of client device, a manufacturer and model of the device, versions of various software applications installed on the device, and so forth.

In general, a monitoring component 112 may be configured to generate performance data in response to a monitor trigger in the code of a client application 110 or other triggering application event, as described above, and to store the performance data in one or more data records. Each data record, for example, may include a collection of field-value pairs, each field-value pair storing a particular item of performance data in association with a field for the item. For example, a data record generated by a monitoring component 112 may include a "networkLatency" field (not shown in the Figure) in which a value is stored. This field indicates a network latency measurement associated with one or more network requests. The data record may include a "state" field to store a value indicating a state of a network connection, and so forth for any number of aspects of collected performance data.

2.4. Data Server System

Figure 2:
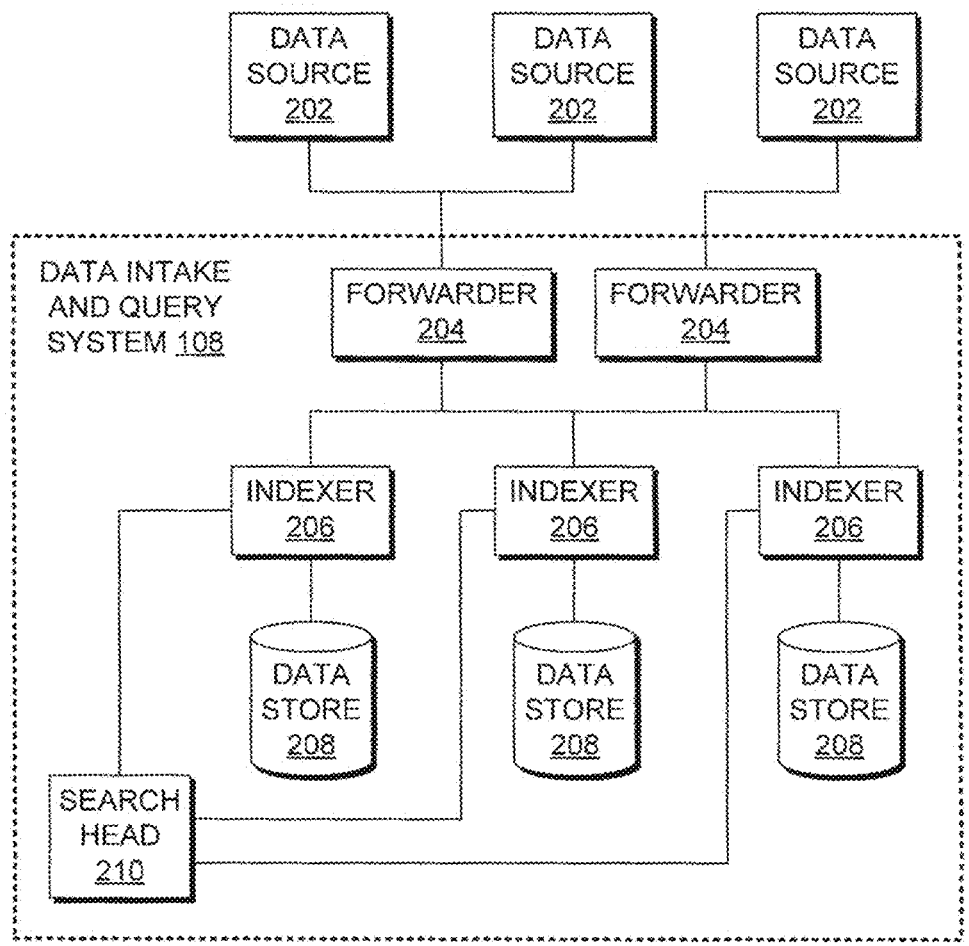
FIG. 2 illustrates a block diagram of an example data intake and query system in which one or more embodiments may be implemented.

FIG. 2 depicts a block diagram of an exemplary data intake and query system 108, similar to the SPLUNK® ENTERPRISE system. System 108 includes one or more forwarders 204 that receive data from a variety of input data sources 202, and one or more indexers 206 that process and store the data in one or more data stores 208. These forwarders and indexers can comprise separate computer systems, or may alternatively comprise separate processes executing on one or more computer systems.

Each data source 202 broadly represents a distinct source of data that can be consumed by a system 108. Examples of a data source 202 include, without limitation, data files, directories of files, data sent over a network, event logs, registries, etc.

During operation, the forwarders 204 identify which indexers 206 receive data collected from a data source 202 and forward the data to the appropriate indexers. Forwarders 204 can also perform operations on the data before forwarding, including removing extraneous data, detecting timestamps in the data, parsing data, indexing data, routing data based on criteria relating to the data being routed, and/or performing other data transformations.

In an embodiment, a forwarder 204 may comprise a service accessible to client devices 102 and host devices 106 via a network 104. For example, one type of forwarder 204 may be capable of consuming vast amounts of real-time data from a potentially large number of client devices 102 and/or host devices 106. The forwarder 204 may, for example, comprise a computing device which implements multiple data pipelines or "queues" to handle forwarding of network data to indexers 206. A forwarder 204 may also perform many of the functions that are performed by an indexer. For example, a forwarder 204 may perform keyword extractions on raw data or parse raw data to create events. A forwarder 204 may generate time stamps for events. Additionally or alternatively, a forwarder 204 may perform routing of events to indexers. Data store 208 may contain events derived from machine data from a variety of sources all pertaining to the same component in an IT environment, and this data may be produced by the machine in question or by other components in the IT environment.

2.5. Data Ingestion

Figure 3:
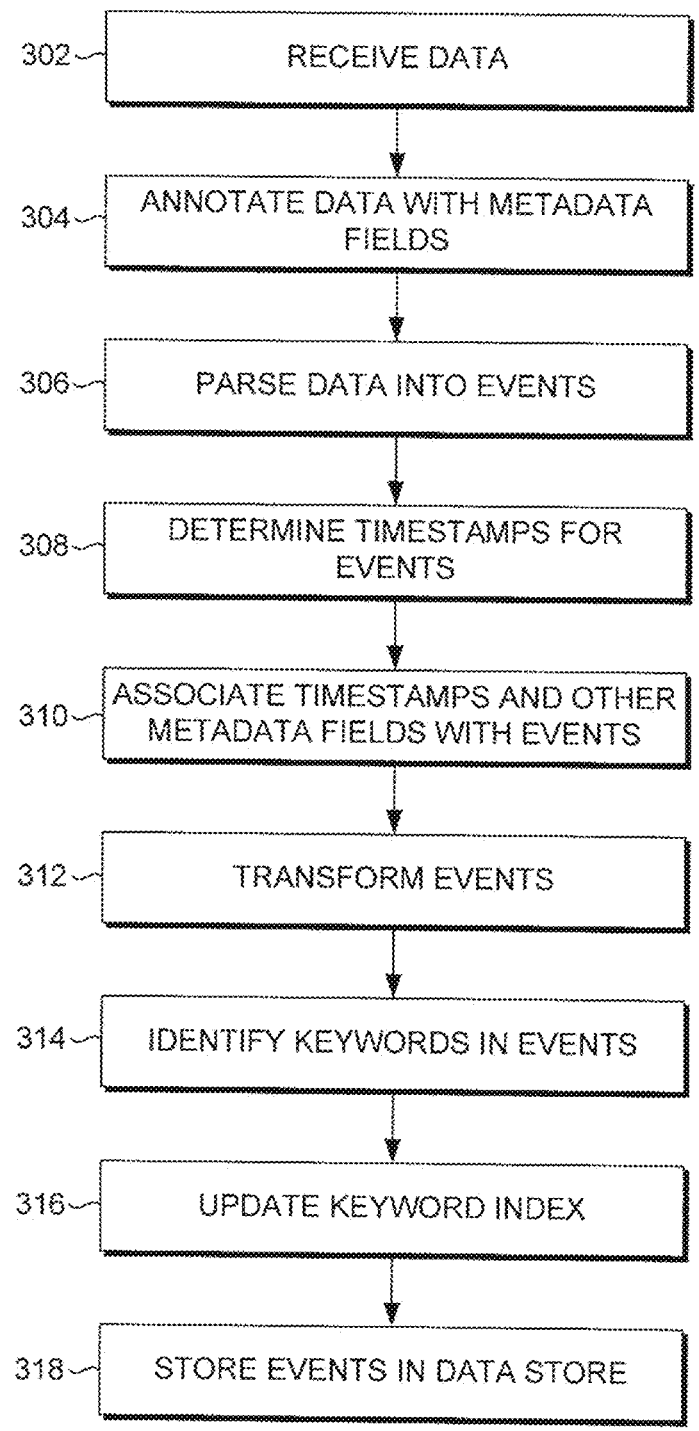
FIG. 3 is a flow diagram that illustrates how indexers process, index, and store data received from forwarders in accordance with one or more embodiments.

FIG. 3 depicts a flow chart illustrating an example data flow performed by Data Intake and Query system 108, in accordance with the disclosed embodiments. The data flow illustrated in FIG. 3 is provided for illustrative purposes only; those skilled in the art would understand that one or more of the steps of the processes illustrated in FIG. 3 may be removed or the ordering of the steps may be changed. Furthermore, for the purposes of illustrating a clear example, one or more particular system components are described in the context of performing various operations during each of the data flow stages. For example, a forwarder is described as receiving and processing data during an input phase; an indexer is described as parsing and indexing data during parsing and indexing phases; and a search head is described as performing a search query during a search phase. However, other system arrangements and distributions of the processing steps across system components may be used.

2.5.1. Input

At block 302, a forwarder receives data from an input source, such as a data source 202 shown in FIG. 2. A forwarder initially may receive the data as a raw data stream generated by the input source. For example, a forwarder may receive a data stream from a log file generated by an application server, from a stream of network data from a network device, or from any other source of data. In one embodiment, a forwarder receives the raw data and may segment the data stream into "blocks", or "buckets," possibly of a uniform data size, to facilitate subsequent processing steps.

At block 304, a forwarder or other system component annotates each block generated from the raw data with one or more metadata fields. These metadata fields may, for example, provide information related to the data block as a whole and may apply to each event that is subsequently derived from the data in the data block. For example, the metadata fields may include separate fields specifying each of a host, a source, and a sourcetype related to the data block. A host field may contain a value identifying a host name or IP address of a device that generated the data. A source field may contain a value identifying a source of the data, such as a pathname of a file or a protocol and port related to received network data. A sourcetype field may contain a value specifying a particular sourcetype label for the data. Additional metadata fields may also be included during the input phase, such as a character encoding of the data, if known, and possibly other values that provide information relevant to later processing steps. In an embodiment, a forwarder forwards the annotated data blocks to another system component (typically an indexer) for further processing.

The SPLUNK® ENTERPRISE system allows forwarding of data from one SPLUNK® ENTERPRISE instance to another, or even to a third-party system. SPLUNK® ENTERPRISE system can employ different types of forwarders in a configuration.

In an embodiment, a forwarder may contain the essential components needed to forward data. It can gather data from a variety of inputs and forward the data to a SPLUNK® ENTERPRISE server for indexing and searching. It also can tag metadata (e.g., source, sourcetype, host, etc.).

Additionally or optionally, in an embodiment, a forwarder has the capabilities of the aforementioned forwarder as well as additional capabilities. The forwarder can parse data before forwarding the data (e.g., associate a time stamp with a portion of data and create an event, etc.) and can route data based on criteria such as source or type of event. It can also index data locally while forwarding the data to another indexer.

2.5.2. Parsing

At block 306, an indexer receives data blocks from a forwarder and parses the data to organize the data into events. In an embodiment, to organize the data into events, an indexer may determine a sourcetype associated with each data block (e.g., by extracting a sourcetype label from the metadata fields associated with the data block, etc.) and refer to a sourcetype configuration corresponding to the identified sourcetype. The sourcetype definition may include one or more properties that indicate to the indexer to automatically determine the boundaries of events within the data. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a sourcetype for the data is unknown to the indexer, an indexer may infer a sourcetype for the data by examining the structure of the data. Then, it can apply an inferred sourcetype definition to the data to create the events.

At block 308, the indexer determines a timestamp for each event. Similar to the process for creating events, an indexer may again refer to a sourcetype definition associated with the data to locate one or more properties that indicate instructions for determining a timestamp for each event. The properties may, for example, instruct an indexer to extract a time value from a portion of data in the event, to interpolate time values based on timestamps associated with temporally proximate events, to create a timestamp based on a time the event data was received or generated, to use the timestamp of a previous event, or use any other rules for determining timestamps.

At block 310, the indexer associates with each event one or more metadata fields including a field containing the timestamp (in some embodiments, a timestamp may be included in the metadata fields) determined for the event. These metadata fields may include a number of "default fields" that are associated with all events, and may also include one more custom fields as defined by a user. Similar to the metadata fields associated with the data blocks at block 304, the default metadata fields associated with each event may include a host, source, and sourcetype field including or in addition to a field storing the timestamp.

At block 312, an indexer may optionally apply one or more transformations to data included in the events created at block 306. For example, such transformations can include removing a portion of an event (e.g., a portion used to define event boundaries, extraneous characters from the event, other extraneous text, etc.), masking a portion of an event (e.g., masking a credit card number), removing redundant portions of an event, etc. The transformations applied to event data may, for example, be specified in one or more configuration files and referenced by one or more sourcetype definitions.

2.5.3. Indexing

At blocks 314 and 316, an indexer can optionally generate a keyword index to facilitate fast keyword searching for event data. To build a keyword index, at block 314, the indexer identifies a set of keywords in each event. At block 316, the indexer includes the identified keywords in the keyword index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword.

In some embodiments, the keyword index may include entries for name-value pairs found in events, where a name-value pair can include a pair of keywords connected by a symbol, such as an equals sign or colon. This way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2".

At block 318, the indexer stores the events with an associated timestamp in a data store 208. Timestamps enable a user to search for events based on a time range. In one embodiment, the stored events are organized into "buckets," where each bucket stores events associated with a specific time range based on the timestamps associated with each event. This may not only improve time-based searching, but also allows for events with recent timestamps, which may have a higher likelihood of being accessed, to be stored in a faster memory to facilitate faster retrieval. For example, buckets containing the most recent events can be stored in flash memory rather than on a hard disk.

Each indexer 206 may be responsible for storing and searching a subset of the events contained in a corresponding data store 208. By distributing events among the indexers and data stores, the indexers can analyze events for a query in parallel. For example, using map-reduce techniques, each indexer returns partial responses for a subset of events to a search head that combines the results to produce an answer for the query. By storing events in buckets for specific time ranges, an indexer may further optimize data retrieval process by searching buckets corresponding to time ranges that are relevant to a query.

Moreover, events and buckets can also be replicated across different indexers and data stores to facilitate high availability and disaster recovery as described in U.S. patent application Ser. No. 14/266,812, entitled "SITE-BASED SEARCH AFFINITY", filed on 30 Apr. 2014, and in U.S. patent application Ser. No. 14/266,817, entitled "MULTI-SITE CLUSTERING", also filed on 30 Apr. 2014, each of which is hereby incorporated by reference in its entirety for all purposes.

2.6. Query Processing

Figure 4:
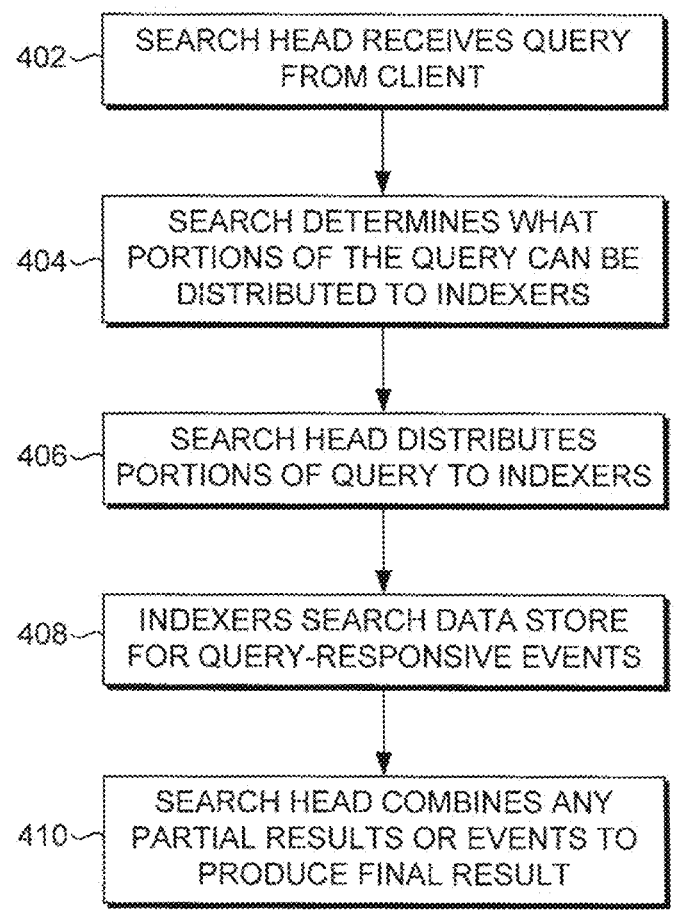
FIG. 4 is a flow diagram that illustrates how a search head and indexers perform a search query in accordance with one or more embodiments.

FIG. 4 is a flow diagram that illustrates an exemplary process that a search head and one or more indexers may perform during a search query. At block 402, a search head receives a search query from a client. At block 404, the search head analyzes the search query to determine what portion(s) of the query can be delegated to indexers and what portions of the query can be executed locally by the search head. At block 406, the search head distributes the determined portions of the query to the appropriate indexers. In an embodiment, a search head cluster may take the place of an independent search head where each search head in the search head cluster coordinates with peer search heads in the search head cluster to schedule jobs, replicate search results, update configurations, fulfill search requests, etc. In an embodiment, the search head (or each search head) communicates with a master node (also known as a cluster master, not shown in Fig.) that provides the search head with a list of indexers to which the search head can distribute the determined portions of the query. The master node maintains a list of active indexers and can also designate which indexers may have responsibility for responding to queries over certain sets of events. A search head may communicate with the master node before the search head distributes queries to indexers to discover the addresses of active indexers.

At block 408, the indexers to which the query was distributed, search data stores associated with them for events that are responsive to the query. To determine which events are responsive to the query, the indexer searches for events that match the criteria specified in the query. These criteria can include matching keywords or specific values for certain fields. The searching operations at block 408 may use the late-binding schema to extract values for specified fields from events at the time the query is processed. In an embodiment, one or more rules for extracting field values may be specified as part of a sourcetype definition. The indexers may then either send the relevant events back to the search head, or use the events to determine a partial result, and send the partial result back to the search head.

At block 410, the search head combines the partial results and/or events received from the indexers to produce a final result for the query. This final result may comprise different types of data depending on what the query requested. For example, the results can include a listing of matching events returned by the query, or some type of visualization of the data from the returned events. In another example, the final result can include one or more calculated values derived from the matching events.

The results generated by the system 108 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring the search jobs.

The search head can also perform various operations to make the search more efficient. For example, before the search head begins execution of a query, the search head can determine a time range for the query and a set of common keywords that all matching events include. The search head may then use these parameters to query the indexers to obtain a superset of the eventual results. Then, during a filtering stage, the search head can perform field-extraction operations on the superset to produce a reduced set of search results. This speeds up queries that are performed on a periodic basis.

2.7. Field Extraction

The search head 210 allows users to search and visualize event data extracted from raw machine data received from homogenous data sources. It also allows users to search and visualize event data extracted from raw machine data received from heterogeneous data sources. The search head 210 includes various mechanisms, which may additionally reside in an indexer 206, for processing a query. Splunk Processing Language (SPL), used in conjunction with the SPLUNK® ENTERPRISE system, can be utilized to make a query. SPL is a pipelined search language in which a set of inputs is operated on by a first command in a command line, and then a subsequent command following the pipe symbol "1" operates on the results produced by the first command, and so on for additional commands. Other query languages, such as the Structured Query Language ("SQL"), can be used to create a query.

In response to receiving the search query, search head 210 uses extraction rules to extract values for the fields associated with a field or fields in the event data being searched. The search head 210 obtains extraction rules that specify how to extract a value for certain fields from an event. Extraction rules can comprise regex rules that specify how to extract values for the relevant fields. In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

The search head 210 can apply the extraction rules to event data that it receives from indexers 206. Indexers 206 may apply the extraction rules to events in an associated data store 208. Extraction rules can be applied to all the events in a data store or to a subset of the events that have been filtered based on some criteria (e.g., event time stamp values, etc.). Extraction rules can be used to extract one or more values for a field from events by parsing the event data and examining the event data for one or more patterns of characters, numbers, delimiters, etc., that indicate where the field begins and, optionally, ends.

Figure 5:
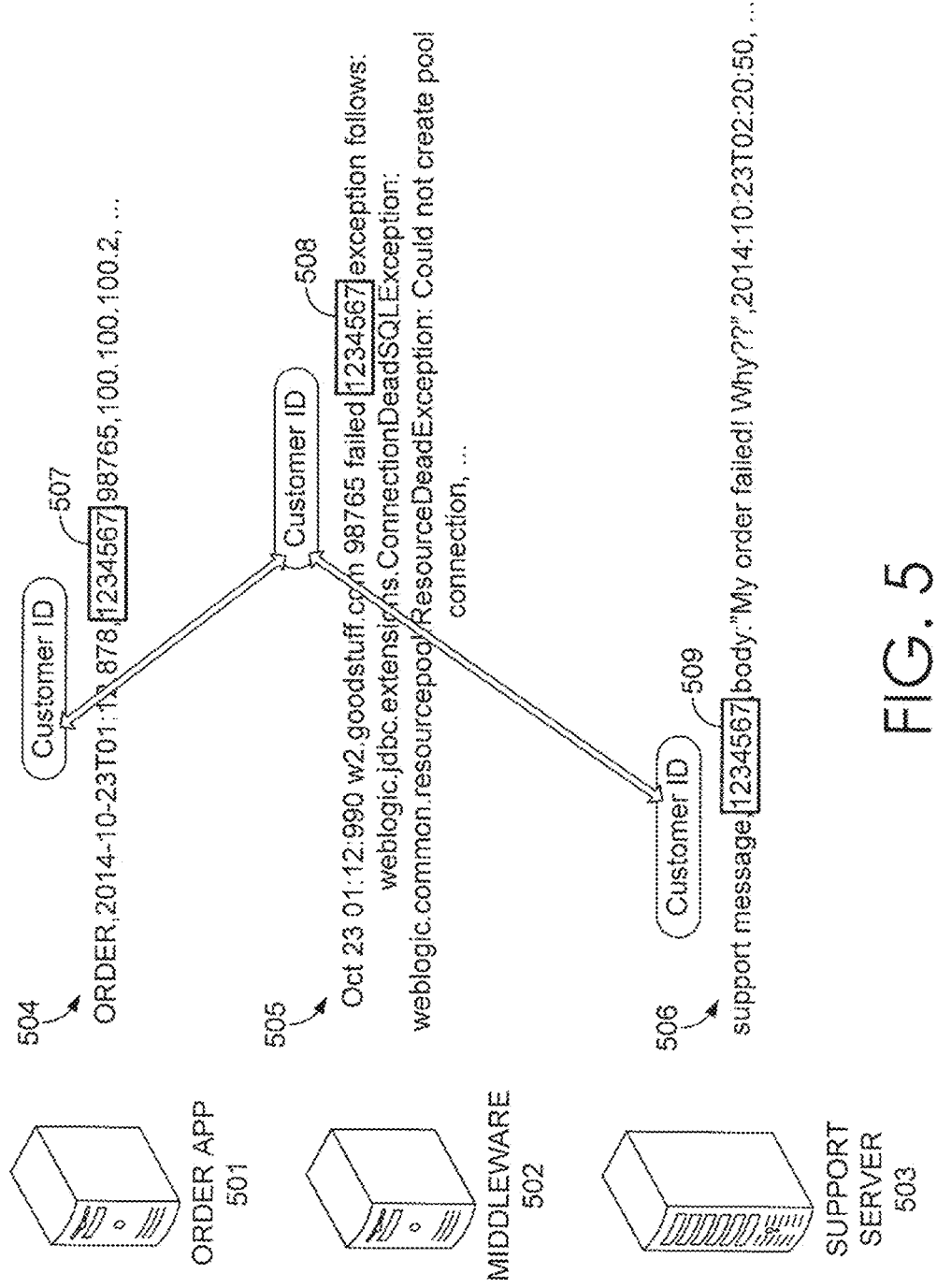
FIG. 5 illustrates a scenario where a common customer ID is found among log data received from three disparate sources in accordance with one or more embodiments.

FIG. 5 illustrates an example of raw machine data received from disparate data sources. In this example, a user submits an order for merchandise using a vendor's shopping application program 501 running on the user's system. In this example, the order was not delivered to the vendor's server due to a resource exception at the destination server that is detected by the middleware code 502. The user then sends a message to the customer support 503 to complain about the order failing to complete. The three systems 501, 502, and 503 are disparate systems that do not have a common logging format. The order application 501 sends log data 504 to the SPLUNK® ENTERPRISE system in one format, the middleware code 502 sends error log data 505 in a second format, and the support server 503 sends log data 506 in a third format.

Using the log data received at one or more indexers 206 from the three systems the vendor can uniquely obtain an insight into user activity, user experience, and system behavior. The search head 210 allows the vendor's administrator to search the log data from the three systems that one or more indexers 206 are responsible for searching, thereby obtaining correlated information, such as the order number and corresponding customer ID number of the person placing the order. The system also allows the administrator to see a visualization of related events via a user interface. The administrator can query the search head 210 for customer ID field value matches across the log data from the three systems that are stored at the one or more indexers 206. The customer ID field value exists in the data gathered from the three systems, but the customer ID field value may be located in different areas of the data given differences in the architecture of the systems—there is a semantic relationship between the customer ID field values generated by the three systems. The search head 210 requests event data from the one or more indexers 206 to gather relevant event data from the three systems. It then applies extraction rules to the event data in order to extract field values that it can correlate. The search head may apply a different extraction rule to each set of events from each system when the event data format differs among systems. In this example, the user interface can display to the administrator the event data corresponding to the common customer ID field values 507, 508, and 509, thereby providing the administrator with insight into a customer's experience.

Note that query results can be returned to a client, a search head, or any other system component for further processing. In general, query results may include a set of one or more events, a set of one or more values obtained from the events, a subset of the values, statistics calculated based on the values, a report containing the values, or a visualization, such as a graph or chart, generated from the values.

2.8. Example Search Screen

Figure 6A:
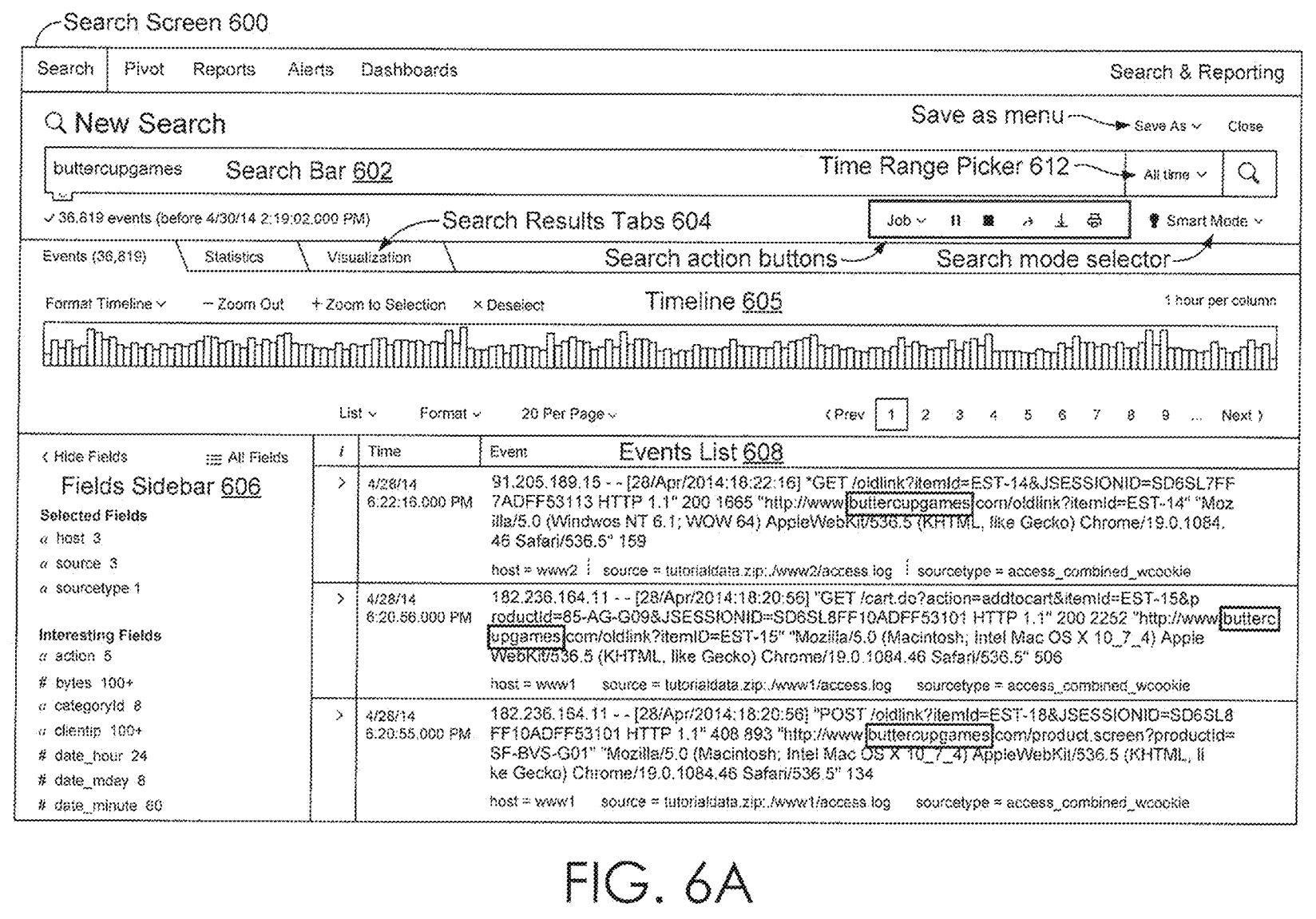

FIG. 6A illustrates an example search screen 600 in accordance with the disclosed embodiments. Search screen 600 includes a search bar 602 that accepts user input in the form of a search string. It also includes a time range picker 612 that enables the user to specify a time range for the search. For "historical searches" the user can select a specific time range, or alternatively a relative time range, such as "today," "yesterday" or "last week." For "real-time searches," the user can select the size of a preceding time window to search for real-time events. Search screen 600 also initially displays a "data summary" dialog as is illustrated in FIG. 6B that enables the user to select different sources for the event data, such as by selecting specific hosts and log files.

After the search is executed, the search screen 600 in FIG. 6A can display the results through search results tabs 604, wherein search results tabs 604 includes: an "events tab" that displays various information about events returned by the search; a "statistics tab" that displays statistics about the search results; and a "visualization tab" that displays various visualizations of the search results. The events tab illustrated in FIG. 6A displays a timeline graph 605 that graphically illustrates the number of events that occurred in one-hour intervals over the selected time range. It also displays an events list 608 that enables a user to view the raw data in each of the returned events. It additionally displays a fields sidebar 606 that includes statistics about occurrences of specific fields in the returned events, including "selected fields" that are pre-selected by the user, and "interesting fields" that are automatically selected by the system based on pre-specified criteria.

2.9. Data Models

A data model is a hierarchically structured search-time mapping of semantic knowledge about one or more datasets. It encodes the domain knowledge necessary to build a variety of specialized searches of those datasets. Those searches, in turn, can be used to generate reports.

A data model is composed of one or more "objects" (or "data model objects") that define or otherwise correspond to a specific set of data.

Objects in data models can be arranged hierarchically in parent/child relationships. Each child object represents a subset of the dataset covered by its parent object. The top-level objects in data models are collectively referred to as "root objects."

Child objects have inheritance. Data model objects are defined by characteristics that mostly break down into constraints and attributes. Child objects inherit constraints and attributes from their parent objects and have additional constraints and attributes of their own. Child objects provide a way of filtering events from parent objects. Because a child object always provides an additional constraint in addition to the constraints it has inherited from its parent object, the dataset it represents is always a subset of the dataset that its parent represents.

For example, a first data model object may define a broad set of data pertaining to e-mail activity generally, and another data model object may define specific datasets within the broad dataset, such as a subset of the e-mail data pertaining specifically to e-mails sent. Examples of data models can include electronic mail, authentication, databases, intrusion detection, malware, application state, alerts, compute inventory, network sessions, network traffic, performance, audits, updates, vulnerabilities, etc. Data models and their objects can be designed by knowledge managers in an organization, and they can enable downstream users to quickly focus on a specific set of data. For example, a user can simply select an "e-mail activity" data model object to access a dataset relating to e-mails generally (e.g., sent or received), or select an "e-mails sent" data model object (or data sub-model object) to access a dataset relating to e-mails sent.

A data model object may be defined by (1) a set of search constraints, and (2) a set of fields. Thus, a data model object can be used to quickly search data to identify a set of events and to identify a set of fields to be associated with the set of events. For example, an "e-mails sent" data model object may specify a search for events relating to e-mails that have been sent, and specify a set of fields that are associated with the events. Thus, a user can retrieve and use the "e-mails sent" data model object to quickly search source data for events relating to sent e-mails, and may be provided with a listing of the set of fields relevant to the events in a user interface screen.

A child of the parent data model may be defined by a search (typically a narrower search) that produces a subset of the events that would be produced by the parent data model's search. The child's set of fields can include a subset of the set of fields of the parent data model and/or additional fields. Data model objects that reference the subsets can be arranged in a hierarchical manner, so that child subsets of events are proper subsets of their parents. A user iteratively applies a model development tool (not shown in Fig.) to prepare a query that defines a subset of events and assigns an object name to that subset. A child subset is created by further limiting a query that generated a parent subset. A late-binding schema of field extraction rules is associated with each object or subset in the data model.

Data definitions in associated schemas can be taken from the common information model (CIM) or can be devised for a particular schema and optionally added to the CIM. Child objects inherit fields from parents and can include fields not present in parents. A model developer can select fewer extraction rules than are available for the sources returned by the query that defines events belonging to a model. Selecting a limited set of extraction rules can be a tool for simplifying and focusing the data model, while allowing a user flexibility to explore the data subset. Development of a data model is further explained in U.S. Pat. Nos. 8,788,525 and 8,788,526, both entitled "DATA MODEL FOR MACHINE DATA FOR SEMANTIC SEARCH", both issued on 22 Jul. 2014, U.S. Pat. No. 8,983,994, entitled "GENERATION OF A DATA MODEL FOR SEARCHING MACHINE DATA", issued on 17 Mar. 2015, U.S. patent application Ser. No. 14/611,232, entitled "GENERATION OF A DATA MODEL APPLIED TO QUERIES", filed on 31 Jan. 2015, and U.S. patent application Ser. No. 14/815,884, entitled "GENERATION OF A DATA MODEL APPLIED TO OBJECT QUERIES", filed on 31 Jul. 2015, each of which is hereby incorporated by reference in its entirety for all purposes. See, also, Knowledge Manager Manual, Build a Data Model, Splunk Enterprise 6.1.3 pp. 150-204 (Aug. 25, 2014).

A data model can also include reports. One or more report formats can be associated with a particular data model and be made available to run against the data model. A user can use child objects to design reports with object datasets that already have extraneous data pre-filtered out. In an embodiment, the data intake and query system 108 provides the user with the ability to produce reports (e.g., a table, chart, visualization, etc.) without having to enter SPL, SQL, or other query language terms into a search screen. Data models are used as the basis for the search feature.

Data models may be selected in a report generation interface. The report generator supports drag-and-drop organization of fields to be summarized in a report. When a model is selected, the fields with available extraction rules are made available for use in the report. The user may refine and/or filter search results to produce more precise reports. The user may select some fields for organizing the report and select other fields for providing detail according to the report organization. For example, "region" and "salesperson" are fields used for organizing the report and sales data can be summarized (subtotaled and totaled) within this organization. The report generator allows the user to specify one or more fields within events and apply statistical analysis on values extracted from the specified one or more fields. The report generator may aggregate search results across sets of events and generate statistics based on aggregated search results. Building reports using the report generation interface is further explained in U.S. patent application Ser. No. 14/503,335, entitled "GENERATING REPORTS FROM UNSTRUCTURED DATA", filed on 30 Sep. 2014, and which is hereby incorporated by reference in its entirety for all purposes, and in Pivot Manual, Splunk Enterprise 6.1.3 (Aug. 4, 2014). Data visualizations also can be generated in a variety of formats, by reference to the data model. Reports, data visualizations, and data model objects can be saved and associated with the data model for future use. The data model object may be used to perform searches of other data.

FIGS. 7A-7D illustrate a series of user interface screens where a user may select report generation options using data models. The report generation process may be driven by a predefined data model object, such as a data model object defined and/or saved via a reporting application or a data model object obtained from another source. A user can load a saved data model object using a report editor. For example, the initial search query and fields used to drive the report editor may be obtained from a data model object. The data model object that is used to drive a report generation process may define a search and a set of fields. Upon loading of the data model object, the report generation process may enable a user to use the fields (e.g., the fields defined by the data model object) to define criteria for a report (e.g., filters, split rows/columns, aggregates, etc.) and the search may be used to identify events (e.g., to identify events responsive to the search) used to generate the report. That is, for example, if a data model object is selected to drive a report editor, the graphical user interface of the report editor may enable a user to define reporting criteria for the report using the fields associated with the selected data model object, and the events used to generate the report may be constrained to the events that match, or otherwise satisfy, the search constraints of the selected data model object.

Figure 7A:
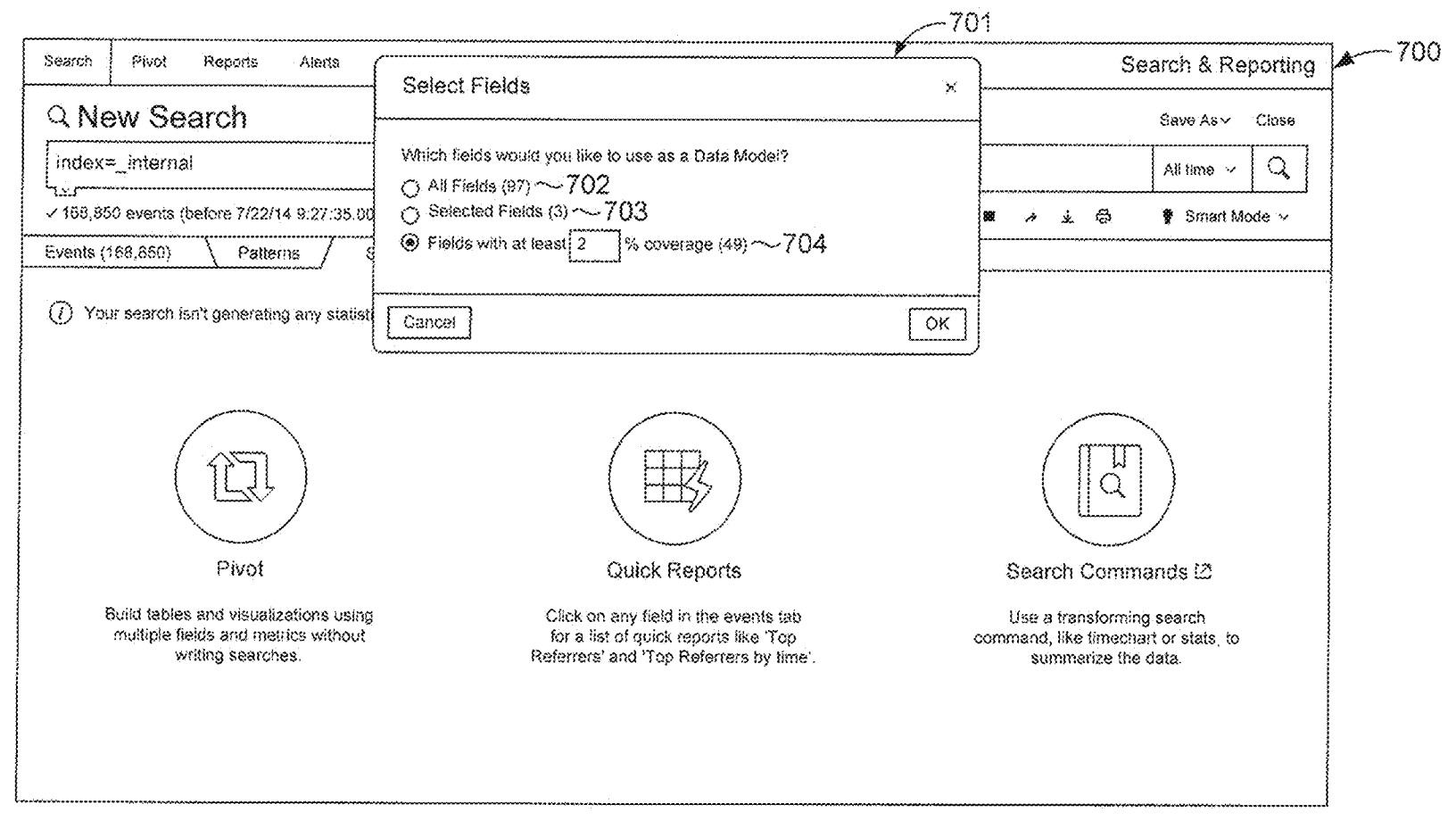

Once a data model object is selected by the user, a user interface screen 700 shown in FIG. 7A may display an interactive listing of automatic field identification options 701 based on the selected data model object. For example, a user may select one of the three illustrated options (e.g., the "All Fields" option 702, the "Selected Fields" option 703, or the "Coverage" option (e.g., fields with at least a specified % of coverage) 704). If the user selects the "All Fields" option 702, all of the fields identified from the events that were returned in response to an initial search query may be selected. That is, for example, all of the fields of the identified data model object fields may be selected. If the user selects the "Selected Fields" option 703, only the fields from the fields of the identified data model object fields that are selected by the user may be used. If the user selects the "Coverage" option 704, only the fields of the identified data model object fields meeting a specified coverage criteria may be selected. A percent coverage may refer to the percentage of events returned by the initial search query that a given field appears in. Thus, for example, if an object dataset includes 10,000 events returned in response to an initial search query, and the "avg_age" field appears in 854 of those 10,000 events, then the "avg_age" field would have a coverage of 8.54% for that object dataset. If, for example, the user selects the "Coverage" option and specifies a coverage value of 2%, only fields having a coverage value equal to or greater than 2% may be selected. The number of fields corresponding to each selectable option may be displayed in association with each option. For example, "97" displayed next to the "All Fields" option 702 indicates that 97 fields will be selected if the "All Fields" option is selected. The "3" displayed next to the "Selected Fields" option 703 indicates that 3 of the 97 fields will be selected if the "Selected Fields" option is selected. The "49" displayed next to the "Coverage" option 704 indicates that 49 of the 97 fields (e.g., the 49 fields having a coverage of 2% or greater) will be selected if the "Coverage" option is selected. The number of fields corresponding to the "Coverage" option may be dynamically updated based on the specified percent of coverage.

Figure 7B:
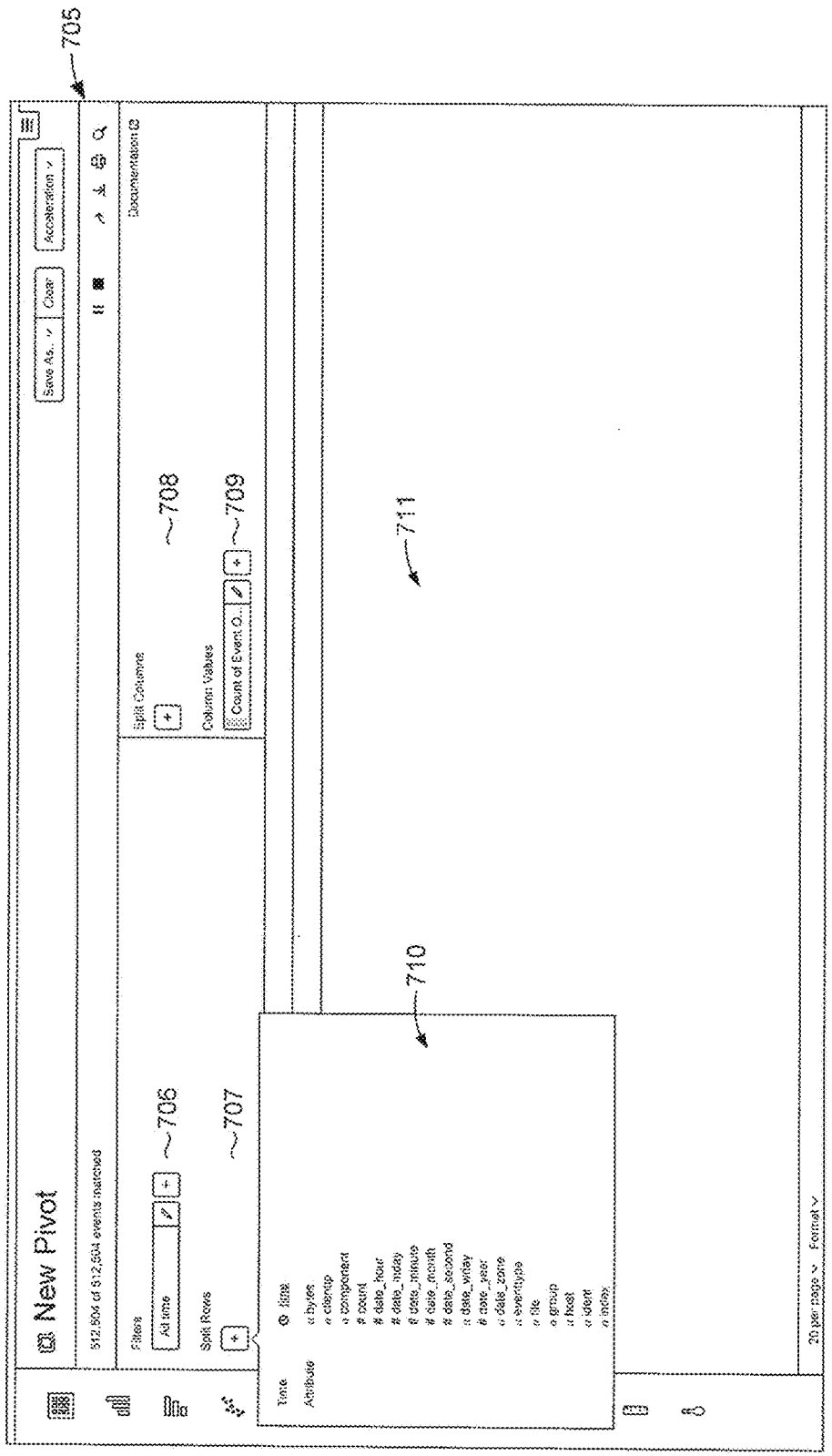
Figure 7C:
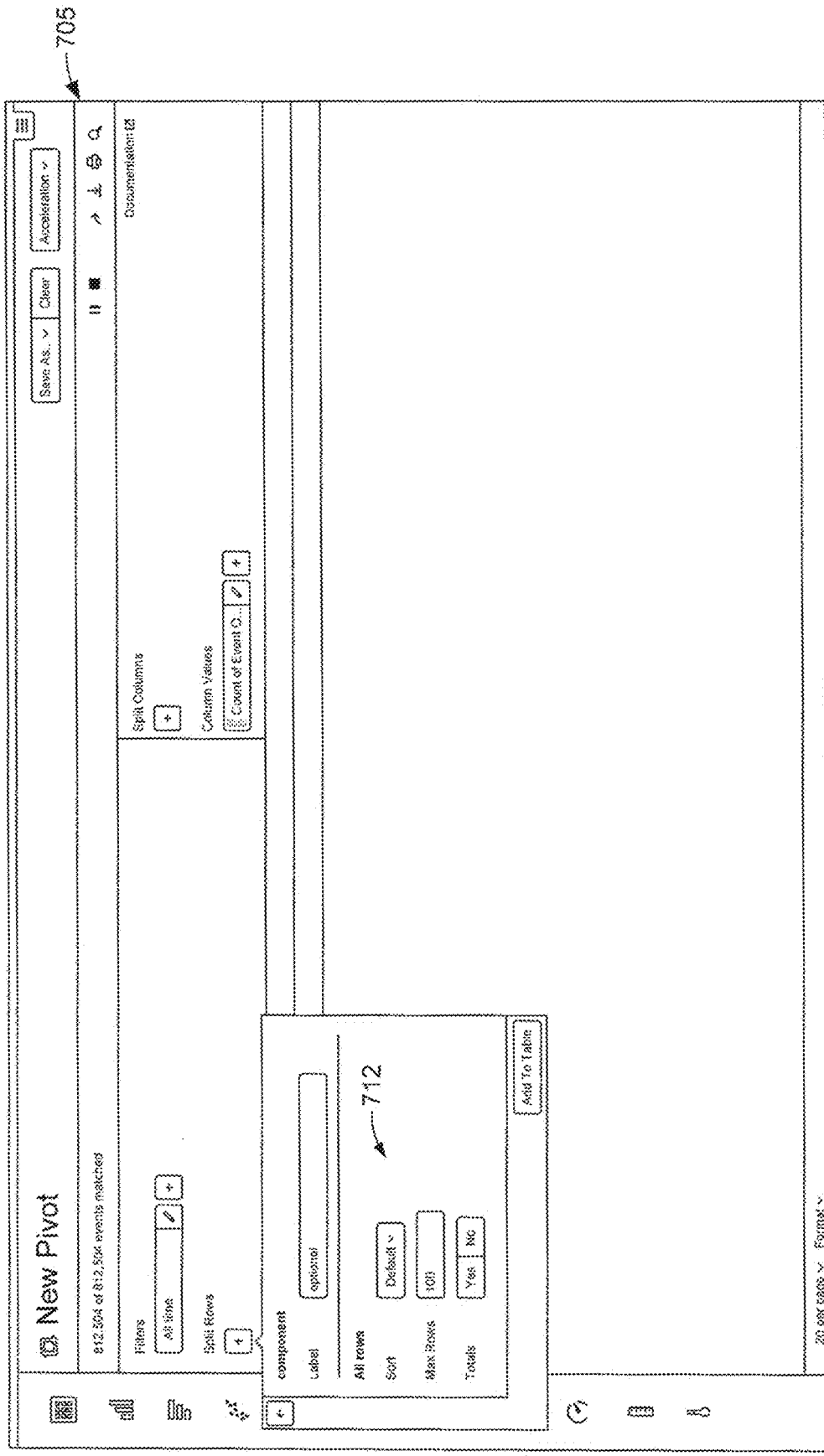

FIG. 7B illustrates an example graphical user interface screen (also called the pivot interface) 705 displaying the reporting application's "Report Editor" page. The screen may display interactive elements for defining various elements of a report. For example, the page includes a "Filters" element 706, a "Split Rows" element 707, a "Split Columns" element 708, and a "Column Values" element 709. The page may include a list of search results 711. In this example, the Split Rows element 707 is expanded, revealing a listing of fields 710 that can be used to define additional criteria (e.g., reporting criteria). The listing of fields 710 may correspond to the selected fields (attributes). That is, the listing of fields 710 may list only the fields previously selected, either automatically and/or manually by a user. FIG. 7C illustrates a formatting dialogue 712 that may be displayed upon selecting a field from the listing of fields 710. The dialogue can be used to format the display of the results of the selection (e.g., label the column to be displayed as "component").

Figure 7D:
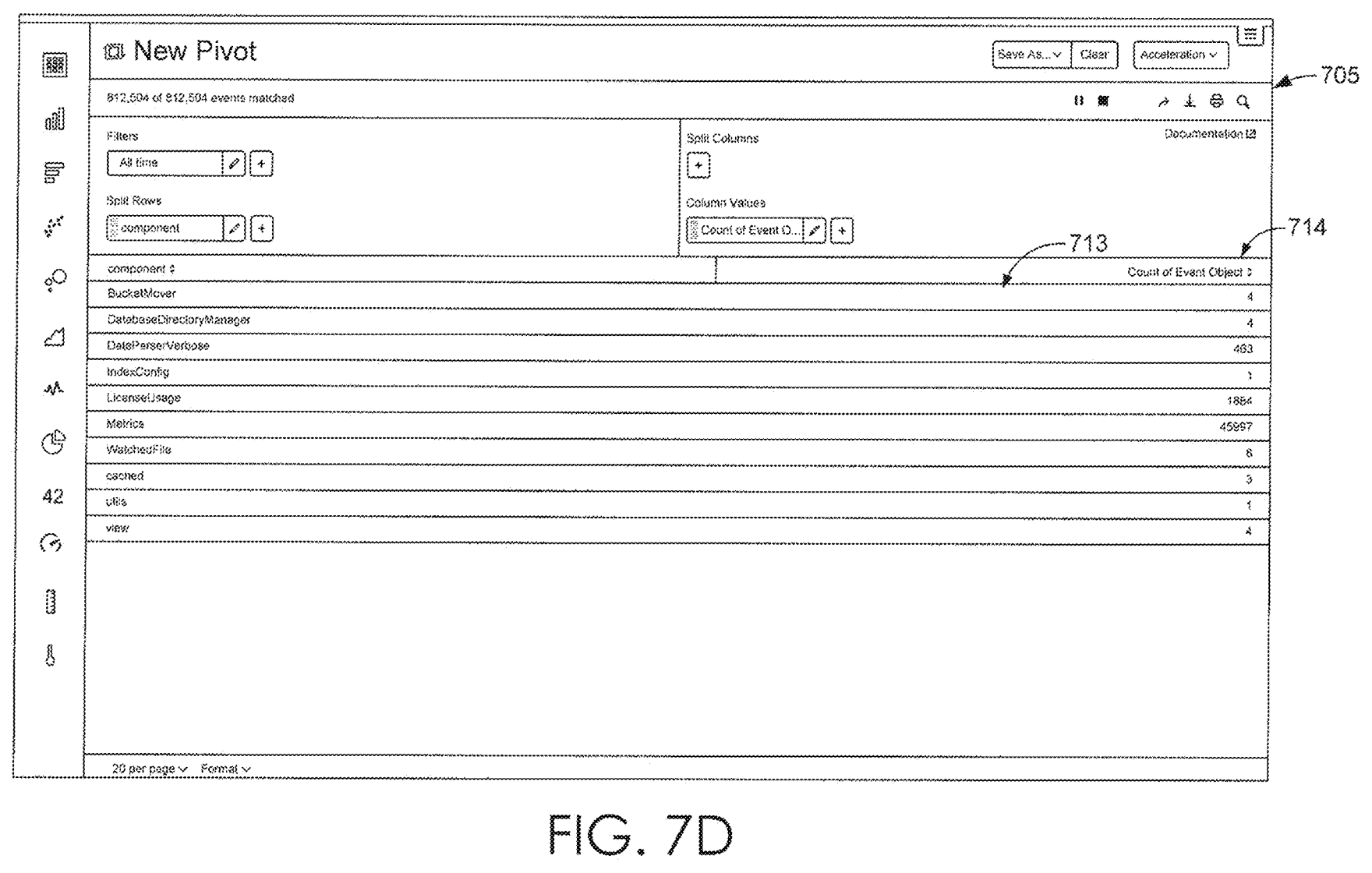

FIG. 7D illustrates an example graphical user interface screen 705 including a table of results 713 based on the selected criteria including splitting the rows by the "component" field. A column 714 having an associated count for each component listed in the table may be displayed that indicates an aggregate count of the number of times that the particular field-value pair (e.g., the value in a row) occurs in the set of events responsive to the initial search query.

2.10. Acceleration Technique

The above-described system provides significant flexibility by enabling a user to analyze massive quantities of minimally processed data "on the fly" at search time instead of storing pre-specified portions of the data in a database at ingestion time. This flexibility enables a user to see valuable insights, correlate data, and perform subsequent queries to examine interesting aspects of the data that may not have been apparent at ingestion time.

However, performing extraction and analysis operations at search time can involve a large amount of data and require a large number of computational operations, which can cause delays in processing the queries. Advantageously, SPLUNK® ENTERPRISE system employs a number of unique acceleration techniques that have been developed to speed up analysis operations performed at search time. These techniques include: (1) performing search operations in parallel across multiple indexers; (2) using a keyword index; (3) using a high performance analytics store; and (4) accelerating the process of generating reports. These novel techniques are described in more detail below.

2.10.1. Aggregation Technique

Figure 8:
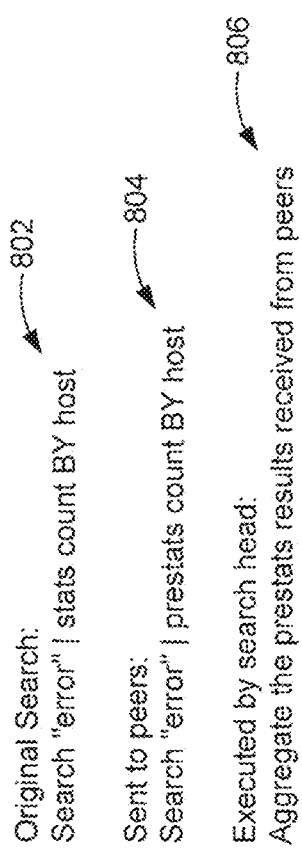
FIG. 8 illustrates an example search query received from a client and executed by search peers in accordance with one or more embodiments.

To facilitate faster query processing, a query can be structured such that multiple indexers perform the query in parallel, while aggregation of search results from the multiple indexers is performed locally at the search head. For example, FIG. 8 illustrates how a search query 802 received from a client at a search head 210 can split into two phases, including: (1) subtasks 804 (e.g., data retrieval or simple filtering) that may be performed in parallel by indexers 206 for execution, and (2) a search results aggregation operation 806 to be executed by the search head when the results are ultimately collected from the indexers.

During operation, upon receiving search query 802, a search head 210 determines that a portion of the operations involved with the search query may be performed locally by the search head. The search head modifies search query 802 by substituting "stats" (create aggregate statistics over results sets received from the indexers at the search head) with "prestats" (create statistics by the indexer from local results set) to produce search query 804, and then distributes search query 804 to distributed indexers, which are also referred to as "search peers." Note that search queries may generally specify search criteria (or filter criteria) or operations to be performed on events that meet the search criteria or filter criteria. Search queries may also specify field names, as well as search criteria for the values in the fields or operations to be performed on the values in the fields. Moreover, the search head may distribute the full search query to the search peers as illustrated in FIG. 4, or may alternatively distribute a modified version (e.g., a more restricted version) of the search query to the search peers. In this example, the indexers are responsible for producing the results and sending them to the search head. After the indexers return the results to the search head, the search head aggregates the received results 806 to form a single search result set. By executing the query in this manner, the system effectively distributes the computational operations across the indexers while minimizing data transfers.

2.10.2. Keyword Index

As described above with reference to the flow charts in FIG. 3 and FIG. 4, data intake and query system 108 can construct and maintain one or more keyword indexes (the term "indices" is also used interchangeably with "indexes," throughout the disclosure and in the drawings) to quickly identify events containing specific keywords. This technique can greatly speed up the processing of queries involving specific keywords. As mentioned above, to build a keyword index, an indexer first identifies a set of keywords. Then, the indexer includes the identified keywords in the keyword index, which associates each stored keyword with references to events containing that keyword, or to locations within events where that keyword is located. When an indexer subsequently receives a keyword-based query, the indexer can access the keyword index to quickly identify events containing the keyword.

2.10.3. High Performance Analytics Store

To speed up certain types of queries, some embodiments of system 108 create a high performance analytics store, which is referred to as a "summarization table," that contains entries for specific field-value pairs. Each of these entries keeps track of instances of a specific value in a specific field in the event data and includes references to events containing the specific value in the specific field. For example, an example entry in a summarization table can keep track of occurrences of the value "94107" in a "ZIP code" field of a set of events and the entry includes references to all of the events that contain the value "94107" in the ZIP code field. This optimization technique enables the system to quickly process queries that seek to determine how many events have a particular value for a particular field. To this end, the system can examine the entry in the summarization table to count instances of the specific value in the field without having to go through the individual events or perform data extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range. A bucket-specific summarization table includes entries for specific field-value combinations that occur in events in the specific bucket. Alternatively, the system can maintain a separate summarization table for each indexer. The indexer-specific summarization table includes entries for the events in a data store that are managed by the specific indexer. Indexer-specific summarization tables may also be bucket-specific.

The summarization table can be populated by running a periodic query that scans a set of events to find instances of a specific field-value combination, or alternatively instances of all field-value combinations for a specific field. A periodic query can be initiated by a user, or can be scheduled to occur automatically at specific time intervals. A periodic query can also be automatically launched in response to a query that asks for a specific field-value combination.

In some cases, when the summarization tables may not cover all of the events that are relevant to a query, the system can use the summarization tables to obtain partial results for the events that are covered by summarization tables, but may also have to search through other events that are not covered by the summarization tables to produce additional results. These additional results can then be combined with the partial results to produce a final set of results for the query. The summarization table and associated techniques are described in more detail in U.S. Pat. No. 8,682,925, entitled "DISTRIBUTED HIGH PERFORMANCE ANALYTICS STORE", issued on 25 Mar. 2014, U.S. patent application Ser. No. 14/170,159, entitled "SUPPLEMENTING A HIGH PERFORMANCE ANALYTICS STORE WITH EVALUATION OF INDIVIDUAL EVENTS TO RESPOND TO AN EVENT QUERY", filed on 31 Jan. 2014, and U.S. patent application Ser. No. 14/815,973, entitled "STORAGE MEDIUM AND CONTROL DEVICE", filed on 21 Feb. 2014, each of which is hereby incorporated by reference in its entirety.

2.10.4. Accelerating Report Generation

In some embodiments, a data server system such as the SPLUNK® ENTERPRISE system can accelerate the process of periodically generating updated reports based on query results. To accelerate this process, a summarization engine automatically examines the query to determine whether generation of updated reports can be accelerated by creating intermediate summaries. If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In addition to the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so advantageously only the newer event data needs to be processed while generating an updated report. These report acceleration techniques are described in more detail in U.S. Pat. No. 8,589,403, entitled "COMPRESSED JOURNALING IN EVENT TRACKING FILES FOR METADATA RECOVERY AND REPLICATION", issued on 19 Nov. 2013, U.S. Pat. No. 8,412,696, entitled "REAL TIME SEARCHING AND REPORTING", issued on 2 Apr. 2011, and U.S. Pat. Nos. 8,589,375 and 8,589,432, both also entitled "REAL TIME SEARCHING AND REPORTING", both issued on 19 Nov. 2013, each of which is hereby incorporated by reference in its entirety.

2.11. Security Features

The SPLUNK® ENTERPRISE platform provides various schemas, dashboards and visualizations that simplify developers' task to create applications with additional capabilities. One such application is the SPLUNK® APP FOR ENTERPRISE SECURITY, which performs monitoring and alerting operations and includes analytics to facilitate identifying both known and unknown security threats based on large volumes of data stored by the SPLUNK® ENTERPRISE system. SPLUNK® APP FOR ENTERPRISE SECURITY provides the security practitioner with visibility into security-relevant threats found in the enterprise infrastructure by capturing, monitoring, and reporting on data from enterprise security devices, systems, and applications. Through the use of SPLUNK® ENTERPRISE searching and reporting capabilities, SPLUNK® APP FOR ENTERPRISE SECURITY provides a top-down and bottom-up view of an organization's security posture.

The SPLUNK® APP FOR ENTERPRISE SECURITY leverages SPLUNK® ENTERPRISE search-time normalization techniques, saved searches, and correlation searches to provide visibility into security-relevant threats and activity and generate notable events for tracking. The App enables the security practitioner to investigate and explore the data to find new or unknown threats that do not follow signature-based patterns.

Conventional Security Information and Event Management (SIEM) systems that lack the infrastructure to effectively store and analyze large volumes of security-related data. Traditional SIEM systems typically use fixed schemas to extract data from pre-defined security-related fields at data ingestion time and storing the extracted data in a relational database. This traditional data extraction process (and associated reduction in data size) that occurs at data ingestion time inevitably hampers future incident investigations that may need original data to determine the root cause of a security issue, or to detect the onset of an impending security threat.

In contrast, the SPLUNK® APP FOR ENTERPRISE SECURITY system stores large volumes of minimally processed security-related data at ingestion time for later retrieval and analysis at search time when a live security threat is being investigated. To facilitate this data retrieval process, the SPLUNK® APP FOR ENTERPRISE SECURITY provides pre-specified schemas for extracting relevant values from the different types of security-related event data and enables a user to define such schemas.

The SPLUNK® APP FOR ENTERPRISE SECURITY can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. The process of detecting security threats for network-related information is further described in U.S. Pat. No. 8,826,434, entitled "SECURITY THREAT DETECTION BASED ON INDICATIONS IN BIG DATA OF ACCESS TO NEWLY REGISTERED DOMAINS", issued on 2 Sep. 2014, U.S. patent application Ser. No. 13/956,252, entitled "INVESTIGATIVE AND DYNAMIC DETECTION OF POTENTIAL SECURITY-THREAT INDICATORS FROM EVENTS IN BIG DATA", filed on 31 Jul. 2013, U.S. patent application Ser. No. 14/445,018, entitled "GRAPHIC DISPLAY OF SECURITY THREATS BASED ON INDICATIONS OF ACCESS TO NEWLY REGISTERED DOMAINS", filed on 28 Jul. 2014, U.S. patent application Ser. No. 14/445,023, entitled "SECURITY THREAT DETECTION OF NEWLY REGISTERED DOMAINS", filed on 28 Jul. 2014, U.S. patent application Ser. No. 14/815,971, entitled "SECURITY THREAT DETECTION USING DOMAIN NAME ACCESSES", filed on 1 Aug. 2015, and U.S. patent application Ser. No. 14/815,972, entitled "SECURITY THREAT DETECTION USING DOMAIN NAME REGISTRATIONS", filed on 1 Aug. 2015, each of which is hereby incorporated by reference in its entirety for all purposes. Security-related information can also include malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the SPLUNK® APP FOR ENTERPRISE SECURITY facilitates detecting "notable events" that are likely to indicate a security threat. These notable events can be detected in a number of ways: (1) a user can notice a correlation in the data and can manually identify a corresponding group of one or more events as "notable;" or (2) a user can define a "correlation search" specifying criteria for a notable event, and every time one or more events satisfy the criteria, the application can indicate that the one or more events are notable. A user can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

2.12. Data Center Monitoring

As mentioned above, the SPLUNK® ENTERPRISE platform provides various features that simplify the developer's task to create various applications. One such application is SPLUNK® APP FOR VMWARE® that provides operational visibility into granular performance metrics, logs, tasks and events, and topology from hosts, virtual machines and virtual centers. It empowers administrators with an accurate real-time picture of the health of the environment, proactively identifying performance and capacity bottlenecks.

Conventional data-center-monitoring systems lack the infrastructure to effectively store and analyze large volumes of machine-generated data, such as performance information and log data obtained from the data center. In conventional data-center-monitoring systems, machine-generated data is typically pre-processed prior to being stored, for example, by extracting pre-specified data items and storing them in a database to facilitate subsequent retrieval and analysis at search time. However, the rest of the data is not saved and discarded during pre-processing.

In contrast, the SPLUNK® APP FOR VMWARE® stores large volumes of minimally processed machine data, such as performance information and log data, at ingestion time for later retrieval and analysis at search time when a live performance issue is being investigated. In addition to data obtained from various log files, this performance-related information can include values for performance metrics obtained through an application programming interface (API) provided as part of the vSphere Hypervisor™ system distributed by VMware, Inc. of Palo Alto, Calif. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. Such performance metrics are described in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes.

To facilitate retrieving information of interest from performance data and log files, the SPLUNK® APP FOR VMWARE® provides pre-specified schemas for extracting relevant values from different types of performance-related event data, and also enables a user to define such schemas.

The SPLUNK® APP FOR VMWARE® additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems). The ease of navigation provided by selective expansion in combination with the associated performance-state information enables a user to quickly diagnose the root cause of a performance problem. The proactive monitoring tree is described in further detail in U.S. patent application Ser. No. 14/253,490, entitled "PROACTIVE MONITORING TREE WITH SEVERITY STATE SORTING", filed on 15 Apr. 2014, and U.S. patent application Ser. No. 14/812,948, also entitled "PROACTIVE MONITORING TREE WITH SEVERITY STATE SORTING", filed on 29 Jul. 2015, each of which is hereby incorporated by reference in its entirety for all purposes.

The SPLUNK® APP FOR VMWARE® also provides a user interface that enables a user to select a specific time range and then view heterogeneous data comprising events, log data, and associated performance metrics for the selected time range. Such user interface is described in more detail in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes.

2.13. Cloud-Based System Overview

The example data intake and query system 108 described in reference to FIG. 2 comprises several system components, including one or more forwarders, indexers, and search heads. In some environments, a user of a data intake and query system 108 may install and configure, on computing devices owned and operated by the user, one or more software applications that implement some or all of these system components. For example, a user may install a software application on server computers owned by the user and configure each server to operate as one or more of a forwarder, an indexer, a search head, etc. This arrangement generally may be referred to as an "on-premises" solution. That is, the system 108 is installed and operates on computing devices directly controlled by the user of the system. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 108 operate.

In one embodiment, to provide an alternative to an entirely on-premises environment for system 108, one or more of the components of a data intake and query system instead may be provided as a cloud-based service. In this context, a cloud-based service refers to a service hosted by one more computing resources that are accessible to end users over a network, for example, by using a web browser or other application on a client device to interface with the remote computing resources. For example, a service provider may provide a cloud-based data intake and query system by managing computing resources configured to implement various aspects of the system (e.g., forwarders, indexers, search heads, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

Figure 9:
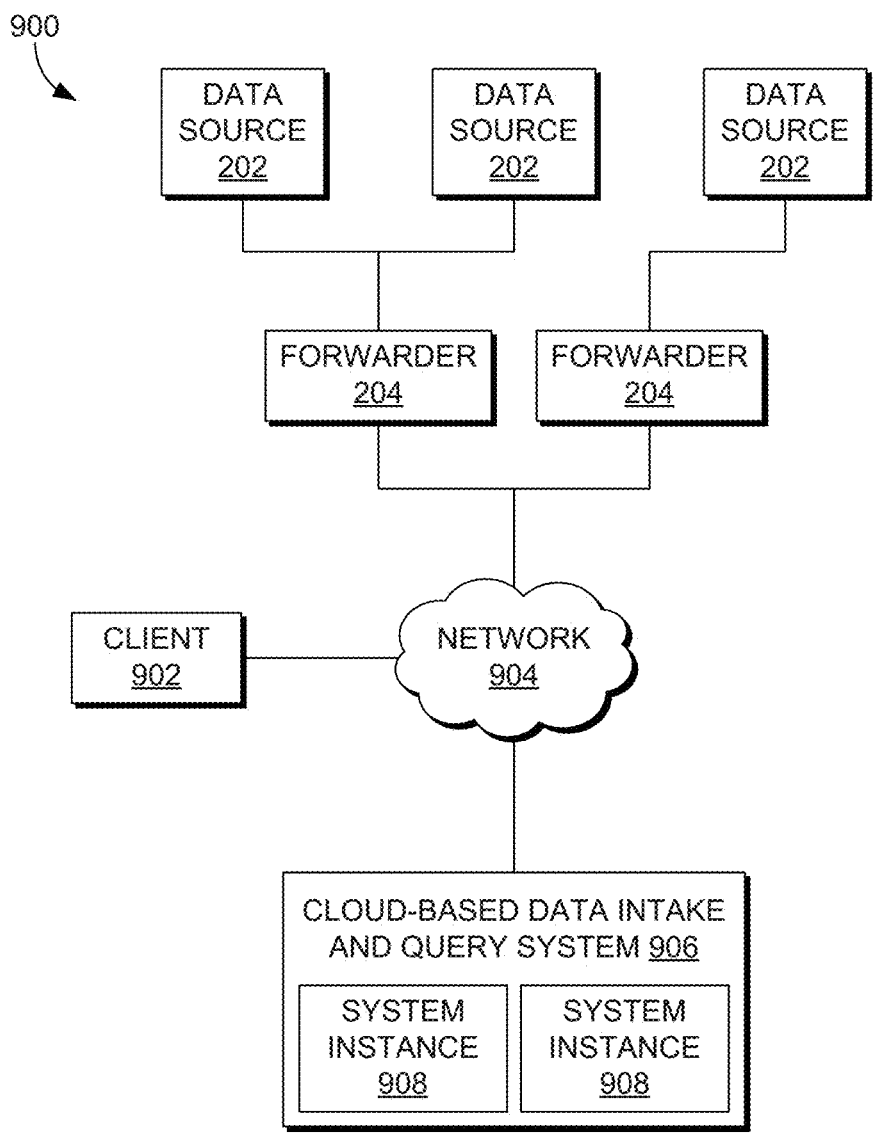
FIG. 9 illustrates a block diagram of an example cloud-based data intake and query system in which one or more embodiments may be implemented.

FIG. 9 illustrates a block diagram of an example cloud-based data intake and query system. Similar to the system of FIG. 2, the networked computer system 900 includes input data sources 202 and forwarders 204. These input data sources and forwarders may be in a subscriber's private computing environment. Alternatively, they might be directly managed by the service provider as part of the cloud service. In the example system 900, one or more forwarders 204 and client devices 902 are coupled to a cloud-based data intake and query system 906 via one or more networks 904. Network 904 broadly represents one or more LANs, WANs, cellular networks, intranetworks, internetworks, etc., using any of wired, wireless, terrestrial microwave, satellite links, etc., and may include the public Internet, and is used by client devices 902 and forwarders 204 to access the system 906. Similar to the system of 108, each of the forwarders 204 may be configured to receive data from an input source and to forward the data to other components of the system 906 for further processing.

In an embodiment, a cloud-based data intake and query system 906 may comprise a plurality of system instances 908. In general, each system instance 908 may include one or more computing resources managed by a provider of the cloud-based system 906 made available to a particular subscriber. The computing resources comprising a system instance 908 may, for example, include one or more servers or other devices configured to implement one or more forwarders, indexers, search heads, and other components of a data intake and query system, similar to system 108. As indicated above, a subscriber may use a web browser or other application of a client device 902 to access a web portal or other interface that enables the subscriber to configure an instance 908.

Providing a data intake and query system as described in reference to system 108 as a cloud-based service presents a number of challenges. Each of the components of a system 108 (e.g., forwarders, indexers and search heads) may at times refer to various configuration files stored locally at each component. These configuration files typically may involve some level of user configuration to accommodate particular types of data a user desires to analyze and to account for other user preferences. However, in a cloud-based service context, users typically may not have direct access to the underlying computing resources implementing the various system components (e.g., the computing resources comprising each system instance 908) and may desire to make such configurations indirectly, for example, using one or more web-based interfaces. Thus, the techniques and systems described herein for providing user interfaces that enable a user to configure sourcetype definitions are applicable to both on-premises and cloud-based service contexts, or some combination thereof (e.g., a hybrid system where both an on-premises environment such as SPLUNK® ENTERPRISE and a cloud-based environment such as SPLUNK CLOUD™ are centrally visible).

2.14. Searching Externally Archived Data

Figure 10:
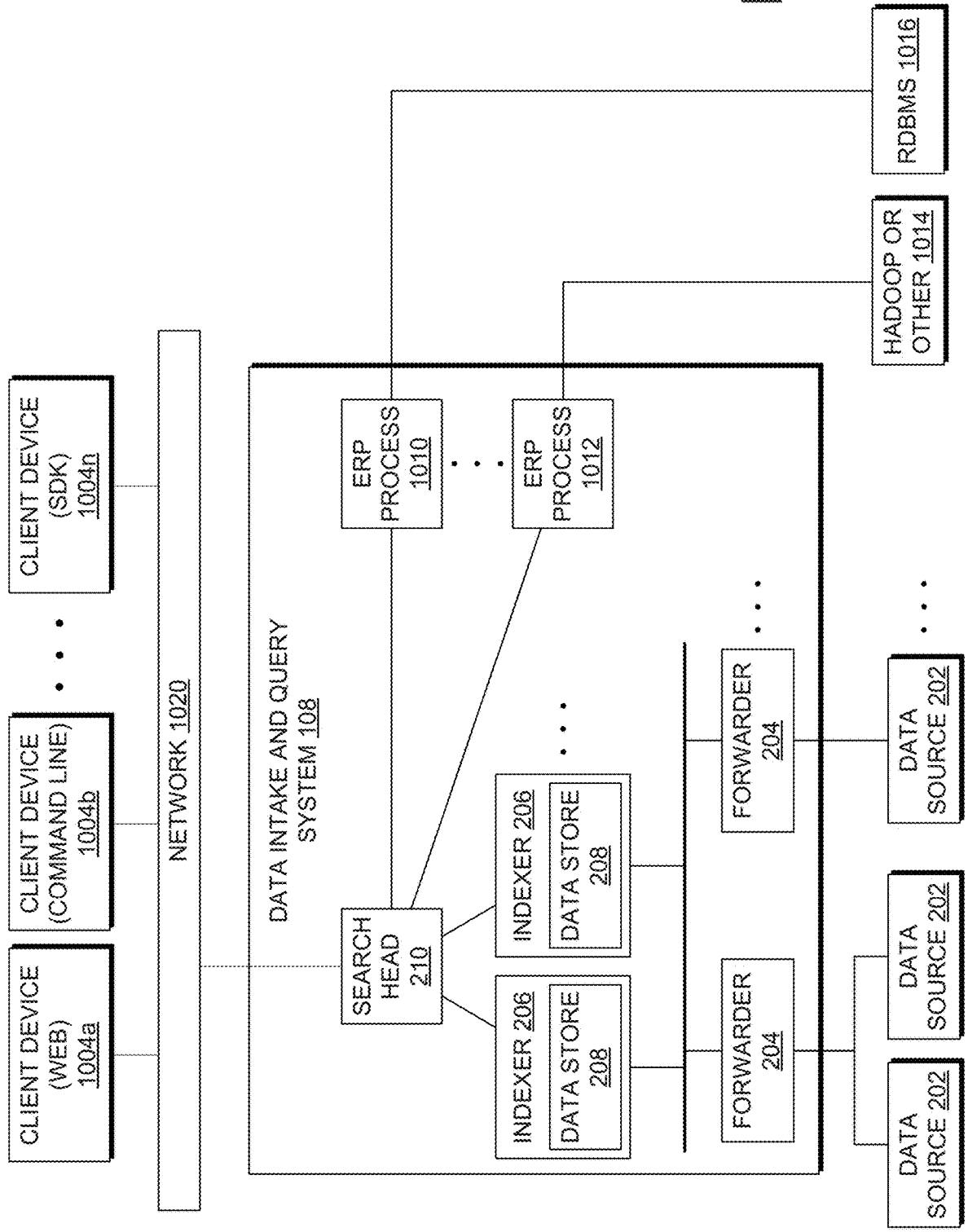
FIG. 10 illustrates a block diagram of an example data intake and query system that performs searches across external data systems in accordance with one or more embodiments.

FIG. 10 shows a block diagram of an example of a data intake and query system 108 that provides transparent search facilities for data systems that are external to the data intake and query system. Such facilities are available in the HUNK® system provided by Splunk Inc. of San Francisco, Calif. HUNK® represents an analytics platform that enables business and IT teams to rapidly explore, analyze, and visualize data in Hadoop and NoSQL data stores.

The search head 210 of the data intake and query system receives search requests from one or more client devices 1004 over network connections 1020. As discussed above, the data intake and query system 108 may reside in an enterprise location, in the cloud, etc. FIG. 10 illustrates that multiple client devices 1004a, 1004b . . . 1004n may communicate with the data intake and query system 108. The client devices 1004 may communicate with the data intake and query system using a variety of connections. For example, one client device in FIG. 10 is illustrated as communicating over an Internet (Web) protocol, another client device is illustrated as communicating via a command line interface, and another client device is illustrated as communicating via a system developer kit (SDK).

The search head 210 analyzes the received search request to identify request parameters. If a search request received from one of the client devices 1004 references an index (also referred to herein as a partition) maintained by the data intake and query system, then the search head 210 connects to one or more indexers 206 of the data intake and query system for the index referenced in the request parameters. That is, if the request parameters of the search request reference an index, then the search head accesses the data in the index via the indexer. The data intake and query system 108 may include one or more indexers 206, depending on system access resources and requirements. As described further below, the indexers 206 retrieve data from their respective local data stores 208 as specified in the search request. The indexers and their respective data stores can comprise one or more storage devices and typically reside on the same system, though they may be connected via a local network connection.

If the request parameters of the received search request reference an external data collection, which is not accessible to the indexers 206 or under the management of the data intake and query system, then the search head 210 can access the external data collection through an External Result Provider (ERP) process 1010. An external data collection may be referred to as a "virtual index" (plural, "virtual indexes"). An ERP process provides an interface through which the search head 210 may access virtual indexes.

Figure 11:
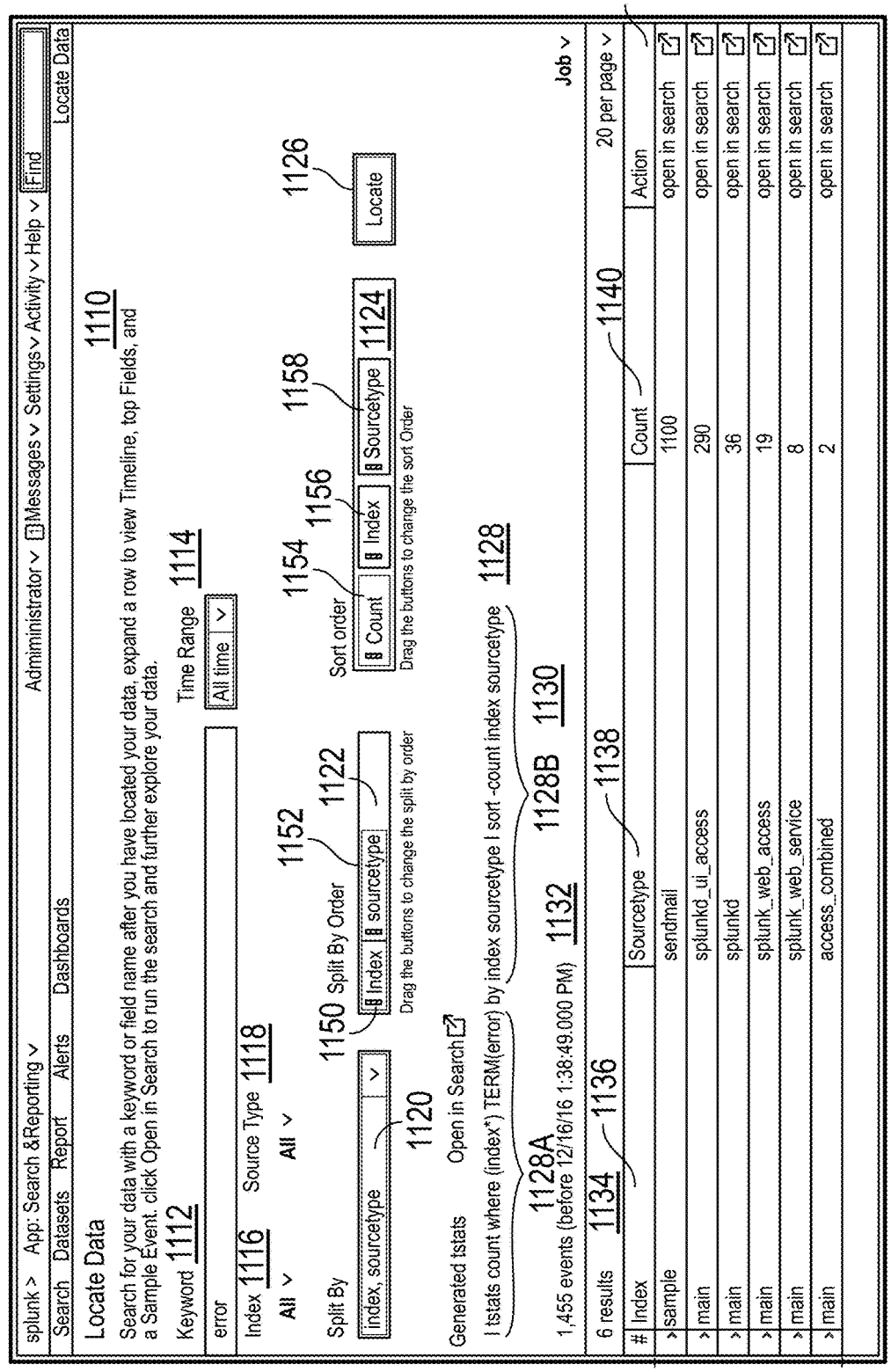
FIG. 11 illustrates a user interface screen for an example search interface including search and results display features in accordance with one or more embodiments.

Thus, a search reference to an index of the system relates to a locally stored and managed data collection. In contrast, a search reference to a virtual index relates to an externally stored and managed data collection, which the search head may access through one or more ERP processes 1010, 1012. FIG. 11 shows two ERP processes 1010, 1012 that connect to respective remote (external) virtual indexes, which are indicated as a Hadoop or another system 1014 (e.g., Amazon S3, Amazon EMR, other Hadoop Compatible File Systems (HCFS), etc.) and a relational database management system (RDBMS) 1016. Other virtual indexes may include other file organizations and protocols, such as Structured Query Language (SQL) and the like. The ellipses between the ERP processes 1010, 1012 indicate optional additional ERP processes of the data intake and query system 108. An ERP process may be a computer process that is initiated or spawned by the search head 210 and is executed by the search data intake and query system 108. Alternatively or additionally, an ERP process may be a process spawned by the search head 210 on the same or different host system as the search head 210 resides.

The search head 210 may spawn a single ERP process in response to multiple virtual indexes referenced in a search request, or the search head may spawn different ERP processes for different virtual indexes. Generally, virtual indexes that share common data configurations or protocols may share ERP processes. For example, all search query references to a Hadoop file system may be processed by the same ERP process, if the ERP process is suitably configured. Likewise, all search query references to an SQL database may be processed by the same ERP process. In addition, the search head may provide a common ERP process for common external data sourcetypes (e.g., a common vendor may utilize a common ERP process, even if the vendor includes different data storage system types, such as Hadoop and SQL). Common indexing schemes also may be handled by common ERP processes, such as flat text files or Weblog files.

The search head 210 determines the number of ERP processes to be initiated via the use of configuration parameters that are included in a search request message. Generally, there is a one-to-many relationship between an external results provider "family" and ERP processes. There is also a one-to-many relationship between an ERP process and corresponding virtual indexes that are referred to in a search request. For example, using RDBMS, assume two independent instances of such a system by one vendor, such as one RDBMS for production and another RDBMS used for development. In such a situation, it is likely preferable (but optional) to use two ERP processes to maintain the independent operation as between production and development data. Both of the ERPs, however, will belong to the same family, because the two RDBMS system types are from the same vendor.

The ERP processes 1010, 1012 receive a search request from the search head 210. The search head may optimize the received search request for execution at the respective external virtual index. Alternatively, the ERP process may receive a search request as a result of analysis performed by the search head or by a different system process. The ERP processes 1010, 1012 can communicate with the search head 210 via conventional input/output routines (e.g., standard in/standard out, etc.). In this way, the ERP process receives the search request from a client device such that the search request may be efficiently executed at the corresponding external virtual index.

The ERP processes 1010, 1012 may be implemented as a process of the data intake and query system. Each ERP process may be provided by the data intake and query system, or may be provided by process or application providers who are independent of the data intake and query system. Each respective ERP process may include an interface application installed at a computer of the external result provider that ensures proper communication between the search support system and the external result provider. The ERP processes 1010, 1012 generate appropriate search requests in the protocol and syntax of the respective virtual indexes 1014, 1016, each of which corresponds to the search request received by the search head 210. Upon receiving search results from their corresponding virtual indexes, the respective ERP process passes the result to the search head 210, which may return or display the results or a processed set of results based on the returned results to the respective client device.

Client devices 1004 may communicate with the data intake and query system 108 through a network interface 1020, e.g., one or more LANs, WANs, cellular networks, intranetworks, and/or internetworks using any of wired, wireless, terrestrial microwave, satellite links, etc., and may include the public Internet.

The analytics platform utilizing the External Result Provider process described in more detail in U.S. Pat. No. 8,738,629, entitled "EXTERNAL RESULT PROVIDED PROCESS FOR RETRIEVING DATA STORED USING A DIFFERENT CONFIGURATION OR PROTOCOL", issued on 27 May 2014, U.S. Pat. No. 8,738,587, entitled "PROCESSING A SYSTEM SEARCH REQUEST BY RETRIEVING RESULTS FROM BOTH A NATIVE INDEX AND A VIRTUAL INDEX", issued on 25 Jul. 2013, U.S. patent application Ser. No. 14/266,832, entitled "PROCESSING A SYSTEM SEARCH REQUEST ACROSS DISPARATE DATA COLLECTION SYSTEMS", filed on 1 May 2014, and U.S. patent application Ser. No. 14/449,144, entitled "PROCESSING A SYSTEM SEARCH REQUEST INCLUDING EXTERNAL DATA SOURCES", filed on 31 Jul. 2014, each of which is hereby incorporated by reference in its entirety for all purposes.

2.14.1. ERP Process Features

The ERP processes described above may include two operation modes: a streaming mode and a reporting mode.

The ERP processes can operate in streaming mode only, in reporting mode only, or in both modes simultaneously. Operating in both modes simultaneously is referred to as mixed mode operation. In a mixed mode operation, the ERP at some point can stop providing the search head with streaming results and only provide reporting results thereafter, or the search head at some point may start ignoring streaming results it has been using and only use reporting results thereafter.

The streaming mode returns search results in real time, with minimal processing, in response to the search request. The reporting mode provides results of a search request with processing of the search results prior to providing them to the requesting search head, which in turn provides results to the requesting client device. ERP operation with such multiple modes provides greater performance flexibility with regard to report time, search latency, and resource utilization.

In a mixed mode operation, both streaming mode and reporting mode are operating simultaneously. The streaming mode results (e.g., the raw data obtained from the external data source) are provided to the search head, which can then process the results data (e.g., break the raw data into events, timestamp it, filter it, etc.) and integrate the results data with the results data from other external data sources, and/or from data stores of the search head. The search head performs such processing and can immediately start returning interim (streaming mode) results to the user at the requesting client device; simultaneously, the search head is waiting for the ERP process to process the data it is retrieving from the external data source as a result of the concurrently executing reporting mode.

In some instances, the ERP process initially operates in a mixed mode, such that the streaming mode operates to enable the ERP quickly to return interim results (e.g., some of the raw or unprocessed data necessary to respond to a search request) to the search head, enabling the search head to process the interim results and begin providing to the client or search requester interim results that are responsive to the query. Meanwhile, in this mixed mode, the ERP also operates concurrently in reporting mode, processing portions of raw data in a manner responsive to the search query. Upon determining that it has results from the reporting mode available to return to the search head, the ERP may halt processing in the mixed mode at that time (or some later time) by stopping the return of data in streaming mode to the search head and switching to reporting mode only. The ERP at this point starts sending interim results in reporting mode to the search head, which in turn may then present this processed data responsive to the search request to the client or search requester. Typically the search head switches from using results from the ERP's streaming mode of operation to results from the ERP's reporting mode of operation when the higher bandwidth results from the reporting mode outstrip the amount of data processed by the search head in the ]streaming mode of ERP operation.

A reporting mode may have a higher bandwidth because the ERP does not have to spend time transferring data to the search head for processing all the raw data. In addition, the ERP may optionally direct another processor to do the processing.

The streaming mode of operation does not need to be stopped to gain the higher bandwidth benefits of a reporting mode; the search head could simply stop using the streaming mode results—and start using the reporting mode results—when the bandwidth of the reporting mode has caught up with or exceeded the amount of bandwidth provided by the streaming mode. Thus, a variety of triggers and ways to accomplish a search head's switch from using streaming mode results to using reporting mode results may be appreciated by one skilled in the art.

The reporting mode can involve the ERP process (or an external system) performing event breaking, time stamping, filtering of events to match the search query request, and calculating statistics on the results. The user can request particular types of data, such as if the search query itself involves types of events, or the search request may ask for statistics on data, such as on events that meet the search request. In either case, the search head understands the query language used in the received query request, which may be a proprietary language. One exemplary query language is Splunk Processing Language (SPL) developed by the assignee of the application, Splunk Inc. The search head typically understands how to use that language to obtain data from the indexers, which store data in a format used by the SPLUNK® Enterprise system.

The ERP processes support the search head, as the search head is not ordinarily configured to understand the format in which data is stored in external data sources such as Hadoop or SQL data systems. Rather, the ERP process performs that translation from the query submitted in the search support system's native format (e.g., SPL if SPLUNK® ENTERPRISE is used as the search support system) to a search query request format that will be accepted by the corresponding external data system. The external data system typically stores data in a different format from that of the search support system's native index format, and it utilizes a different query language (e.g., SQL or MapReduce, rather than SPL or the like).

As noted, the ERP process can operate in the streaming mode alone. After the ERP process has performed the translation of the query request and received raw results from the streaming mode, the search head can integrate the returned data with any data obtained from local data sources (e.g., native to the search support system), other external data sources, and other ERP processes (if such operations were required to satisfy the terms of the search query). An advantage of mixed mode operation is that, in addition to streaming mode, the ERP process is also executing concurrently in reporting mode. Thus, the ERP process (rather than the search head) is processing query results (e.g., performing event breaking, timestamping, filtering, possibly calculating statistics if required to be responsive to the search query request, etc.). It should be apparent to those skilled in the art that additional time is needed for the ERP process to perform the processing in such a configuration. Therefore, the streaming mode will allow the search head to start returning interim results to the user at the client device before the ERP process can complete sufficient processing to start returning any search results. The switchover between streaming and reporting mode happens when the ERP process determines that the switchover is appropriate, such as when the ERP process determines it can begin returning meaningful results from its reporting mode.

The operation described above illustrates the source of operational latency: streaming mode has low latency (immediate results) and usually has relatively low bandwidth (fewer results can be returned per unit of time). In contrast, the concurrently running reporting mode has relatively high latency (it has to perform a lot more processing before returning any results) and usually has relatively high bandwidth (more results can be processed per unit of time). For example, when the ERP process does begin returning report results, it returns more processed results than in the streaming mode, because, e.g., statistics only need to be calculated to be responsive to the search request. That is, the ERP process doesn't have to take time to first return raw data to the search head. As noted, the ERP process could be configured to operate in streaming mode alone and return just the raw data for the search head to process in a way that is responsive to the search request. Alternatively, the ERP process can be configured to operate in the reporting mode only. Also, the ERP process can be configured to operate in streaming mode and reporting mode concurrently, as described, with the ERP process stopping the transmission of streaming results to the search head when the concurrently running reporting mode has caught up and started providing results. The reporting mode does not require the processing of all raw data that is responsive to the search query request before the ERP process starts returning results; rather, the reporting mode usually performs processing of chunks of events and returns the processing results to the search head for each chunk.

For example, an ERP process can be configured to merely return the contents of a search result file verbatim, with little or no processing of results. That way, the search head performs all processing (such as parsing byte streams into events, filtering, etc.). The ERP process can be configured to perform additional intelligence, such as analyzing the search request and handling all the computation that a native search indexer process would otherwise perform. In this way, the configured ERP process provides greater flexibility in features while operating according to desired preferences, such as response latency and resource requirements.

2.14. IT Service Monitoring

As previously mentioned, the SPLUNK® ENTERPRISE platform provides various schemas, dashboards and visualizations that make it easy for developers to create applications to provide additional capabilities. One such application is SPLUNK® IT SERVICE INTELLIGENCE™, which performs monitoring and alerting operations. It also includes analytics to help an analyst diagnose the root cause of performance problems based on large volumes of data stored by the SPLUNK® ENTERPRISE system as correlated to the various services an IT organization provides (a service-centric view). This differs significantly from conventional IT monitoring systems that lack the infrastructure to effectively store and analyze large volumes of service-related event data. Traditional service monitoring systems typically use fixed schemas to extract data from pre-defined fields at data ingestion time, wherein the extracted data is typically stored in a relational database. This data extraction process and associated reduction in data content that occurs at data ingestion time inevitably hampers future investigations, when all of the original data may be needed to determine the root cause of or contributing factors to a service issue.

In contrast, a SPLUNK® IT SERVICE INTELLIGENCE™ system stores large volumes of minimally-processed service-related data at ingestion time for later retrieval and analysis at search time, to perform regular monitoring, or to investigate a service issue. To facilitate this data retrieval process, SPLUNK® IT SERVICE INTELLIGENCE™ enables a user to define an IT operations infrastructure from the perspective of the services it provides. In this service-centric approach, a service such as corporate e-mail may be defined in terms of the entities employed to provide the service, such as host machines and network devices. Each entity is defined to include information for identifying all of the event data that pertains to the entity, whether produced by the entity itself or by another machine, and considering the many various ways the entity may be identified in raw machine data (such as by a URL, an IP address, or machine name). The service and entity definitions can organize event data around a service so that all of the event data pertaining to that service can be easily identified. This capability provides a foundation for the implementation of Key Performance Indicators.

One or more Key Performance Indicators (KPI's) are defined for a service within the SPLUNK® IT SERVICE INTELLIGENCE™ application. Each KPI measures an aspect of service performance at a point in time or over a period of time (aspect KPI's). Each KPI is defined by a search query that derives a KPI value from the machine data of events associated with the entities that provide the service. Information in the entity definitions may be used to identify the appropriate events at the time a KPI is defined or whenever a KPI value is being determined. The KPI values derived over time may be stored to build a valuable repository of current and historical performance information for the service, and the repository, itself, may be subject to search query processing. Aggregate KPIs may be defined to provide a measure of service performance calculated from a set of service aspect KPI values; this aggregate may even be taken across defined timeframes and/or across multiple services. A particular service may have an aggregate KPI derived from substantially all of the aspect KPI's of the service to indicate an overall health score for the service.

SPLUNK® IT SERVICE INTELLIGENCE™ facilitates the production of meaningful aggregate KPI's through a system of KPI thresholds and state values. Different KPI definitions may produce values in different ranges, and so the same value may mean something very different from one KPI definition to another. To address this, SPLUNK® IT SERVICE INTELLIGENCE™ implements a translation of individual KPI values to a common domain of "state" values. For example, a KPI range of values may be 1-100, or 50-275, while values in the state domain may be 'critical,' 'warning,' 'normal,' and 'informational.' Thresholds associated with a particular KPI definition determine ranges of values for that KPI that correspond to the various state values. In one case, KPI values 95-100 may be set to correspond to 'critical' in the state domain. KPI values from disparate KPI's can be processed uniformly once they are translated into the common state values using the thresholds. For example, "normal 80% of the time" can be applied across various KPI's. To provide meaningful aggregate KPI's, a weighting value can be assigned to each KPI so that its influence on the calculated aggregate KPI value is increased or decreased relative to the other KPI's.

One service in an IT environment often impacts, or is impacted by, another service. SPLUNK® IT SERVICE INTELLIGENCE™ can reflect these dependencies. For example, a dependency relationship between a corporate e-mail service and a centralized authentication service can be reflected by recording an association between their respective service definitions. The recorded associations establish a service dependency topology that informs the data or selection options presented in a GUI, for example. (The service dependency topology is like a "map" showing how services are connected based on their dependencies.) The service topology may itself be depicted in a GUI and may be interactive to allow navigation among related services.

Entity definitions in SPLUNK® IT SERVICE INTELLIGENCE™ can include informational fields that can serve as metadata, implied data fields, or attributed data fields for the events identified by other aspects of the entity definition. Entity definitions in SPLUNK® IT SERVICE INTELLI- GENCE™ can also be created and updated by an import of tabular data (as represented in a CSV, another delimited file, or a search query result set). The import may be GUI-mediated or processed using import parameters from a GUI-based import definition process. Entity definitions in SPLUNK® IT SERVICE INTELLIGENCE™ can also be associated with a service by means of a service definition rule. Processing the rule results in the matching entity definitions being associated with the service definition. The rule can be processed at creation time, and thereafter on a scheduled or on-demand basis. This allows dynamic, rule-based updates to the service definition.

During operation, SPLUNK® IT SERVICE INTELLIGENCE™ can recognize so-called "notable events" that may indicate a service performance problem or other situation of interest. These notable events can be recognized by a "correlation search" specifying trigger criteria for a notable event: every time KPI values satisfy the criteria, the application indicates a notable event. A severity level for the notable event may also be specified. Furthermore, when trigger criteria are satisfied, the correlation search may additionally or alternatively cause a service ticket to be created in an IT service management (IT SM) system, such as a systems available from ServiceNow, Inc., of Santa Clara, Calif.

SPLUNK® IT SERVICE INTELLIGENCE™ provides various visualizations built on its service-centric organization of event data and the KPI values generated and collected. Visualizations can be particularly useful for monitoring or investigating service performance. SPLUNK® IT SERVICE INTELLIGENCE™ provides a service monitoring interface suitable as the home page for ongoing IT service monitoring. The interface is appropriate for settings such as desktop use or for a wall-mounted display in a network operations center (NOC). The interface may prominently display a services health section with tiles for the aggregate KPI's indicating overall health for defined services and a general KPI section with tiles for KPI's related to individual service aspects. These tiles may display KPI information in a variety of ways, such as by being colored and ordered according to factors like the KPI state value. They also can be interactive and navigate to visualizations of more detailed KPI information.

SPLUNK® IT SERVICE INTELLIGENCE™ provides a service-monitoring dashboard visualization based on a user-defined template. The template can include user-selectable widgets of varying types and styles to display KPI information. The content and the appearance of widgets can respond dynamically to changing KPI information. The KPI widgets can appear in conjunction with a background image, user drawing objects, or other visual elements, that depict the IT operations environment, for example. The KPI widgets or other GUI elements can be interactive so as to provide navigation to visualizations of more detailed KPI information.

SPLUNK® IT SERVICE INTELLIGENCE™ provides a visualization showing detailed time-series information for multiple KPI's in parallel graph lanes. The length of each lane can correspond to a uniform time range, while the width of each lane may be automatically adjusted to fit the displayed KPI data. Data within each lane may be displayed in a user selectable style, such as a line, area, or bar chart. During operation a user may select a position in the time range of the graph lanes to activate lane inspection at that point in time. Lane inspection may display an indicator for the selected time across the graph lanes and display the KPI value associated with that point in time for each of the graph lanes. The visualization may also provide navigation to an interface for defining a correlation search, using information from the visualization to pre-populate the definition.

SPLUNK® IT SERVICE INTELLIGENCE™ provides a visualization for incident review showing detailed information for notable events. The incident review visualization may also show summary information for the notable events over a time frame, such as an indication of the number of notable events at each of a number of severity levels. The severity level display may be presented as a rainbow chart with the warmest color associated with the highest severity classification. The incident review visualization may also show summary information for the notable events over a time frame, such as the number of notable events occurring within segments of the time frame. The incident review visualization may display a list of notable events within the time frame ordered by any number of factors, such as time or severity. The selection of a particular notable event from the list may display detailed information about that notable event, including an identification of the correlation search that generated the notable event.

SPLUNK® IT SERVICE INTELLIGENCE™ provides pre-specified schemas for extracting relevant values from the different types of service-related event data. It also enables a user to define such schemas.

3.0 Locate Data Tool

Systems and methods involving user interface (UI) search tools for locating data are described below. In one or more embodiments, search tools for summarizing sets of data including indexed raw machine data and presenting the summarization to enable expansion and exploration of groupings are provided, such as by a data intake and query system. Initial summarizations can be reviewed and refined to help users determine how to identify and focus their searches on data subsets of greater interest. In some embodiments, a user initiates a summarization by entering filter criteria (e.g., one or more search terms, a time range, partition identifier (e.g., index identifier), field values, etc.). The system identifies events in one or more field-searchable data stores that satisfy the filter criteria using inverted indexes, categorizes the results based on categorization criteria-value pairs (such as index and sourcetype combinations), and returns groupings based on the categorization. Each grouping, for example, can be associated with events that satisfy the filter criteria and have matching categorization criteria-value pairs. Specific groupings of the summarization may then be expanded to view sample data, timelines, field summaries, etc., associated with the events in the selected grouping. In some cases, sample data can be provided based on accessing a sample of raw events associated with a particular grouping.

Using the embodiments described herein, a user can organize, display, and/or graphically refine groups of the summarization in ways that allow the user to visually determine which subsets of data (e.g., combinations of categories and/or fields) are likely to contain data of potential interest. More focused or elaborate search or sampling of the underlying raw data of these groupings may then be performed. In this way, a user can iteratively review summarizations of sets of data to identify relevant results and data. Further, through the system's iterative and progressive disclosure of data locations, sample data and/or field/value summaries, a user can identify relevant data without initially knowing where the relevant event(s) or data is located or how to find it.

3.1 User Interface

FIG. 11 illustrates an example search screen 1100 showing various exemplary search features and an associated summarization in accordance with one or more embodiments. In the illustrated embodiment of FIG. 11, the search screen 1100 includes a criteria section 1110 and a results or summarization section 1130. In the illustrated embodiment of FIG. 11, the criteria section 1110 includes a search bar 1112, a time range selector 1114, a partition selector 1116, a sourcetype selector 1118, a category selector 1120, a display order selector 1122, a sort order selector 1124, a request execution element 1126, and a generated request or command 1128. In the illustrated embodiment, the summarization section 1130 includes an event summary 1132, a summarization 1134, summarization columns 1136, 1138, 1140, 1142, and a set of interactive, categorized results or groupings 1144 (also referred to herein as groupings). In some embodiments, the screen 1100 can include a hide options interface element that enables a user to toggle between hiding certain options or selectors or showing the options or selectors. In this way, the system can use less real estate on a screen.

As a non-limiting example, one or more elements of the criteria section 1110 can be used to generate the request or command 1128. In response to the selection of the request execution element 1126, a data intake and query system can initiate a review of one or more field-searchable data stores that store machine data based on the generated request or command 1128, and categorize the results. The categorized results, or groupings, can be displayed as interactive groupings in the summarization section 1130. In some embodiments, such as those described below with reference to FIG. 16, when the request execution element 1126 is selected, the command reviews one or more inverted indexes or lexicons, such as TSIDX files, instead of searching or parsing all of the events in one or more data stores (or in the identified indexes, sourcetypes, sources, or hosts). In some cases, as a result of the command, the system only reviews the inverted indexes or lexicons. In such embodiments, by reviewing the inverted indexes rather than all of the data, the results can be obtained more quickly. However, it will be understood that the request can be performed in a variety of ways to identify relevant events.

The search bar 1112 can accept user input in the form of one or more search terms, keywords, or tokens. The keywords can include a search string, text, selections from drop down menus, and/or interaction with or movement of interactive user interface elements, or other inputs that can be used as filter criteria. The tokens received via the search bar 1112 can be used to identify relevant events. In some cases, the keywords are used to search events stored in a time-series data store. In certain cases, the keywords are used to review one or more inverted indexes or lexicons. For example the system can use the keywords to review a TSIDX file using a tstats command.

In some embodiments, the system generates the summarization based on only those events that include all of the keywords. In certain cases, however, the system can generate the summarization based on events that include any one or any combination of the keywords. When multiple keywords are entered, the system can treat the keywords as individual keywords or a single string. Furthermore, in some embodiments, the search bar 1112 can be left blank or in a null state. In such embodiments, the system can use a wildcard as the keyword and/or identify results primarily based on the filter criteria received from other selectors, such as filter criteria received from the time range selector 1114, partition selector 1116, sourcetype selector 1118, host selector, source selector, and/or other selectors.

The time range selector 1114 can be used to specify filter criteria or field values related to time, such as a date and time range or date and time criteria for a search, similar to the time range picker 612, described in greater detail above with reference to FIG. 6A. For example, the filter criteria received via the time range selector 1112 can be used to identify events that are associated with a timestamp within a particular time range, etc. In some cases, the time range selector 1114 may be provided as a drop-down menu or another format that enables a user to limit a search to an identified date or time range or filter results as a function of the identified date or time range associated with the underlying data. According to embodiments, the drop-down menu or other formats utilized for the time range selector 1114 may allow for selection between a variety of pre-set and/or frequently used timeframes (e.g., "last 24 hours," etc.), other UI functionality to select a date and/or time range of the event data to be searched, or the like. In certain embodiments, the time range selector 1114 can use a default time range.

The partition selector 1116, sourcetype selector 1118, source selector (not shown), and host selector (not shown) can be used to select filter criteria or field values for use in identifying data that is to be summarized based on a given partition (or index) or sourcetype associated with the underlying data. For example, the partition selector 1116 can identify one or more indexes that include data that is to be summarized and/or indexes that are of interest (e.g., event data associated with, or including, an identified partition are to be included in the results). Similarly, the sourcetype selector 1118 can be used to identify one or more sourcetypes of interest (e.g., event data associated with, or including, an identified sourcetype are to be included in the results). It will be understood that fewer or more selectors can be used as desired. As a non-limiting example, although not illustrated in FIG. 11, it will be understood that a host selector and/or a source selector can be included to identify one or more hosts or one or more sources of interest, respectively. Further, partition selector 1116 and/or sourcetype selector 1118 can be removed or replaced, or one or more additional selectors can be used as desired.

In some embodiments, the selectors 1116, 1118 (or others, such as a host selector and/or a source selector) can comprise a drop-down menu that enables a user to limit the search to a subset of available indexes, sourcetypes, hosts, and/or sources. In some cases, the drop down menu can also include a search bar that enables the user to lookup or search for indexes or sourcetypes of interest. As a non-limiting example, upon selection of one or more indexes or sourcetypes via selectors 1116, 1118, respectively, the summarization can be filtered or limited to the selected indexes and/or sourcetypes, or only events associated with the at least one of the selected indexes and/or at least one of the selected sourcetypes will be summarized. In some embodiments, the summarization section 1130 can display all results that are associated with the selected indexes or sourcetypes and that satisfy other filter criteria received via the criteria section 1110. In some cases, a wildcard can be used such that data associated with all indexes, sources, sourcetypes, or hosts (depending on where the wildcard is used or entered) is summarized.

In some cases, the search bar 1112 and selectors 1114, 1116, and 1118 (or other selectors used for filtering data, such as a host selector and/or source selector) can be referred to as filter control elements and can be used to select filter criteria, such as one or more keywords, partitions, directories, and/or field values, for the data that is to be summarized. For example, the filter criteria can include one or more tokens received via the search bar 1112, one or more time ranges received via the time range selector 1114, one or more index identifiers received via the partition selector 1116, one or more sourcetype identifiers received via the sourcetype selector 1118, one or more host identifiers received via a host selector, one or more source identifiers received via a source selector and/or one or more other identifiers for a filter criterion via other selectors, etc. As mentioned above, the filter criteria can be used to identify data (for example: based on location and origin) that is to be summarized. The filter criteria from the filter control elements 1112, 1114, 1116, 1118 can be used in any combination to broaden or narrow the data that is to be summarized (e.g., the results can correspond to events that include or are associated with all of the filter criteria from the filter control elements 1112, 1114, 1116, 1118, or the results can correspond to events that include or are associated with any one of the filter criteria from the filter control elements 1112, 1114, 1116, 1118, etc.).

In some cases, one or more of the filter control elements can be left blank. For example, the search bar 1112 can be left blank such that the summarization is not limited by the keywords from the search bar 1112, or the search term used is an inclusive search term, such as a wildcard or asterisk. Similarly, other fields or selectors within the criteria section 1110 may be left in a blank or null state, where the summarization is not limited by filter criteria related to such empty or null fields, or the filter criteria or field values used are an inclusive value, such as a wildcard or asterisk. Accordingly, in certain cases, if a search bar or selector is left empty, blank, or in a null state, the system can return results related to the empty search bar or selector. As a non-limiting example, if no keywords are entered into the search bar 1112, the system can return all results from an identified indexer, time range, and/or sourcetype. Additionally, if no results or hits are located for a particular request, the system can display a "no results found" message, which may include one or more recommendations to expand a time range, and/or to adjust filter criteria.

With continued reference to FIG. 11, the selector 1120 can be used to select categorization or groupings criteria indicating how to summarize the data and/or how the data is to be categorized or grouped, and the selectors 1122, 1124 can be used to select display criteria indicating how to organize and sort the groupings for display. The categorization criteria selector 1122 can also be referred to as a category control element and the selectors 1122, 1124 can also be referred to as display control elements. For example, using the data received via the selector 1120 the system can determine how the data identified using the filter control elements is to be categorized, and using the selectors 1122, 1224, the system can determine how the different categories or groupings are to be organized and displayed in the results section 1130. It will be understood that fewer or more selectors can be used as desired. For example, categorization criteria selector 1120, display order selector 1122, and/or sort order selector 1124 can be removed or replaced, or one or more additional selectors can be used as desired.

The categorization criteria selector 1120 can be used to categorization criteria, such as one or more categories or fields by which the data or events are to be categorized or split. In the illustrated embodiment of FIG. 11, the selected categories are index and sourcetype. Accordingly, the system can review and categorize the results based on a partition value or identifier associated with the data and a sourcetype associated with the data (e.g., the index or partition associated with the events and the sourcetype in metadata associated with events). The categorization criteria selector 1120 can be implemented using a drop-down menu that enables a user to select certain fields or categories and/or a search bar that enables the user to lookup or search for categories or fields of interest, etc. In some embodiments, the selectable categories can include index, sourcetype, host, and source. However, it will be understood that additional categories can be used as desired. In addition, for each category selected, the results section 1130 can display a corresponding column. In some non-limiting embodiments, the system can require that at least one category be selected via the categorization criteria selector 1120.

In some cases, each event or data entry of the data that is to be summarized can include or be associated with a category identifier for one or more categories of the categories that are selectable via the categorization criteria selector 1120. In certain embodiments, each result can include or be associated with a category identifier for each category that is selectable via the categorization criteria selector 1120. The category identifier associated with or included in a particular result (also referred to herein as an event) can be based on the data found within the result, the partition where the result is located, or metadata associated with the result as described in greater detail above. In certain embodiments, the categories selectable via the categorization criteria selector 1120 can include index, sourcetype, host, and source, however, it will be understood that fewer or more categories can be used as desired. In such embodiments, the results, or events, can include or be associated with, a partition identifier, sourcetype identifier, host identifier, and/or source identifier. The identifiers can correspond to a name or location of a particular partition, host, source, or sourcetype and/or can correspond to a particular field value if the category is a field. For example, an event may be associated with a _main partition (non-limiting example: located in a partition named _main, originated from a partition named _main, or otherwise associated with a partition named _main) and have metadata indicating the event originated from host:www1, source: /home/webservice.log, and sourcetype: web_service.

In some cases, one or more results can be assigned or associated with the same category identifier or categorization criteria-value pairs. For example, multiple events can be associated with the categorization criteria-value pairs: index::main and sourcetype::sendmail or category identifiers main (for the index category) and sendmail (for the sourcetype category). In cases, where one or more results are associated with the same categorization criteria-value pairs for the categories selected via the categorization criteria selector 1120, the one or more results can be placed into the same result group or grouping.

The display order selector 1122 can be used to select display criteria related to an order by which the selected categories are to be displayed in relation to a particular result group. The sort order selector 1124 can be used to select display criteria related to an order by which event groupings or result groups 1144 are ordered. The selectors 1122, 1124 can be implemented using user interface objects or drop-down menus that enable a user to manipulate or select certain display criteria and/or a search bar that enables the user to lookup or search for fields of interest, etc. While the selectors 1120, 1124 and other selectors and search bars are disclosed as being user interface objects, drop down menus or text-fillable fields, etc., it is noted that various other interface objects, elements and/or features can also be utilized to implement the search bars and selectors described herein.

In some embodiments, the content displayed in the selectors 1122, 1124 can be automatically generated based at least in part on the categories selected via the categorization criteria selector 1120. For example, in the illustrated embodiment, index and sourcetype have been selected via the categorization criteria selector 1120. Accordingly, in certain embodiments, index and sourcetype can auto-populate to the display order selector 1122 and/or the sort order selector 1124 based on the selection of index and sourcetype by the categorization criteria selector 1120. In addition, in certain embodiments, the sort order selector 1124 can automatically include a count interface object 1154.

In the illustrated embodiment of FIG. 11 "index" and "sourcetype" have been selected in the categorization criteria selector 1120. The order of the selected categories for each grouping for display can be selected using display order selector 1122. As shown in FIG. 11, using the display order selector 1122, index has been selected as the first category and sourcetype has been selected and the second category. Accordingly, the first column for each grouping 1144 is the index column 1136 and the second column for each grouping is the sourcetype column 1138.

The categories selected in the categorization criteria selector 1120 can be displayed in the display order selector 1122 as interface objects, such as interface object 1150, 1152. The interface objects 1150, 1152 can be moved or dragged by user input to rearrange the order by which the results are tabulated and/or displayed. For example, the sourcetype interface object 1152 shown in the display order selector 1122 can be dragged in front of the index interface object 1150. As a result of the movement of the sourcetype interface object 1152, the system can update the generated request or command 1128 and the order of the columns 1136, 1138 in the summarization section 1130 can change.

Similarly, the sort order selector 1124 can include a series of interface objects, such as count interface object 1154, index interface object 1156, sourcetype interface object 1158, etc., that may similarly be reorganized. Such reorganization can cause the system to update the generated request or command 1128 and update the order of the result groups 1144 shown in the display section 1138. For example, in the illustrated embodiment of FIG. 11, the result groups 1144 are ordered first by count, then by index identifier, and then by sourcetype identifier (or field value). As such, the grouping with a count of 1100 results is listed first. By moving sourcetype interface object 1158, to be in front of the count interface object 1154, the system can sort the groupings first by sourcetype field value, then by count, and then by index identifier. In such an embodiment, the system can update the display section 1130 such that the result groups are ordered as a function of (e.g., alphabetically by) the sourcetype field value first (e.g., the result group with the sourcetype "access_combined" can be listed first or last). Result groups with the same sourcetype field value would be sorted by count number. Result groups with the same sourcetype field value and count number would be sorted by index field value.

Accordingly, using the display order elements 1120, 1122, 1124, a user can select categorization criteria and display criteria, and reorganize and display various results and result groups 1144 in a variety of ways. For example, changes to the category control element 1120 enables a user to adjust the categorization or groupings of the data identified by the filter criteria and the reorganization and rearrangement of results achieved by display order elements 1122, 1124 enables a user to graphically display different result groups in ways that allow the user to visually determine which groupings include relevant events or subsets of data. Such features allow a user to identify smaller groups or subsets of data of interest and then perform more detailed review or sampling on the underlying raw machine data, which is particularly advantageous when the overall set of raw machine data to be searched is too large to run a desired search in a timely or effective manner.

As noted above, the search screen 1100 can include a request or command 1128 that contains a language-based representation of the command. The request or command 1128 can be generated based on filter criteria received via the filter control elements (e.g., keywords from search bar 1112 and filter criteria or field values from selectors 1114, 1116, and 1118), category control elements (e.g., categorization criteria selector 1120), and/or the display order elements (e.g., selectors 1122, 1124).

In some embodiments, the request or command 1128 is generated and displayed as a language-based command, such as a computer/programming language or source code command. In various embodiments, such commands may include computer instructions in the form of regular expressions, object code, source code, computer commands, or the like. In the illustrated embodiment of FIG. 11, for example, the source code of the request or command 1128 may take the form of a human-readable and editable programming language defining the command to be run. In certain cases, the request or command 1128 is generated as a proprietary computer language, such as a tstats command in Splunk Processing Language (SPL).

The request or command 1128 can be edited by adjusting one or more filter control elements, category control elements, and/or one or more display control elements. As a non-limiting example, using partition selector 1116 a user can select a subset of available indexes, such as index: main. Based on the selection, the system can automatically update the corresponding portion of the request or command 1128. For example, the system can change "(index=*)" to "(index=main)".

As another non-limiting example, using sort order selector 1124 a user can update the order of the interface objects 1154, 1156, 1158 of the sort order selector 1124 to be in the following order: sourcetype interface object 1158, count interface object 1154, index interface object 1156. Based on the change, the system can automatically update the corresponding portion of the request or command 1128. For example, the system can change "(sort—count index sourcetype)" to "(sort—sourcetype count index)." In some cases, based on changes to the filter control elements, category control elements, and/or the display control elements, the system can automatically update the summarization section 1130 in accordance with the generated change to the request or command 1128. In certain embodiments, the system can update the display section 1130 upon determining that the request execution element 1126 has been selected.

In some cases, a user can edit the request or command 1128 directly by updating or adding keywords, filter criteria, display criteria, and/or field values to the request or command 1128. In such embodiments, based on the changes to the request or command 1128, the system can automatically update any affected filter control elements or display control elements. As a non-limiting example and with reference to FIG. 11, if a user were to change "(sort—count index sourcetype)" of the request or command 1128 to "(sort— sourcetype count index)," the system could update the interface objects 1154, 1156, 1158 of the sort order selector 1124 to be in the following order: sourcetype interface object 1158, count interface object 1154, index interface object 1156. In some embodiments, the system can also automatically update the display section 1130 based on the change. In certain embodiments, the system can update the display section 1130 upon determining that the request execution element 1126 has been selected.

In some embodiments, the generated request or command 1128 can include one or more portions. In the illustrated embodiment of FIG. 11, the generated request or command 1128 includes a filter control portion 1128A and a category/display control portion 1128B. However, it will be understood that the generated request or command 1128 can include fewer or more portions.

In the illustrated embodiment of FIG. 11, the filter control portion 1128A includes the portions of the generated request or command 1128 prior to the term 'by' and the category/display control portion 1128A includes the portions of the generated request or command 1128 following the term 'by.' However, it will be understood that the filter control portion 1128A and category/display control portions 1128B can be separated using a variety of techniques. In some embodiments the separation of the portions 1128A, 1128B can be based on the language used for the request or command 1128.

In some embodiments, the filter control elements (e.g., the search bar 1112, time range selector 1114, partition selector 1116, and sourcetype selector 1118) can be used to generate the filter control portion 1128A of the request or command 1128, and the category control elements and display control elements (e.g., categorization criteria selector 1120, display order selector 1122, sort order selector 1124) can be used to generate the category/display control portion 1128B of the request or command 1128. In certain embodiments, changes to the filter control elements can result in an updated filter control portion 1128A of the request or command 1128. Such changes to the filter control elements can, in some cases, result in a new review being performed or an updated filtering of existing results.

In some embodiments, changes to the category control elements or display control elements can result in an updated category/display control portion 1128B of the request or command 1128. In some cases, the changes to the request or command 1128 can result in a new review and/or an updated filtering of existing results. In certain cases, the changes may not result in a new review, but can cause the data intake and query system to reorganize or re-categorize the results or result groups 1144. Accordingly, in some embodiments, any change to the generated request or command 1128 can result in a new review being initiated, and in certain embodiments, some changes to the generated request or command can result in a new review being initiated and other changes to the to the generated request or command 1128 may not result in a new review being initiated. In such embodiments, the pre-existing results can be re-categorized and/or reordered for display based on the changes to the generated request or command 1128.

In general, a review may be run against a full set of raw data events or against an inverted index, lexicon, or summary associated with a set of such events. The inverted indexes, lexicons, or summaries, can be created upon entry of the data into the system, and, in some cases, the search can be initially run only against information regarding the data indexed or contained in the indexes, or summaries.

In some embodiments, a user can enter initial filter criteria, such as a time range, and the system can return initial results of events identified using the initial filter criteria. For example, the events may include the keywords or field criteria in corresponding event data or satisfy the filter criteria based on metadata related to the events, be stored in a partition that satisfies a filter criterion, and/or otherwise be associated with the filter criteria. A user may then interact with the filter control elements, category control elements, display control elements, and/or interactive result groups to manipulate the groupings and/or expand particular results to locate data subsets of interest. In some cases, the results can be displayed in tabular or other graphical formats to enable a user to more quickly identify data subsets of potential interest.

As mentioned above, the results can be organized and/or displayed in the summarization section 1130 as result groups 1144 or event groupings. The result groups 1144 can be displayed as rows (or columns) and include one or more results that have the same field values of the selected fields. In the illustrated embodiment of FIG. 11, for example, in response to the search, the results section 1130 includes an event summary 1132, a summarization 1134, summarization columns 1136, 1138, 1140, 1142, and a set of interactive, categorized results 1144 or groupings 1144.

The event summary 1132 can identify the number of events that meet the filter criteria, as well as some of the parameters of the search and/or date and time the search was completed. The summarization 1134 identifies the number of result groups 1144 into which the results have been categorized. Columns 1136 and 1138 correspond to selected categories of the categorization criteria selector 1120 and are ordered based on the display order selector 1122. Columns 1140 and 1142 provide additional information. For example, count column 1104 identifies a number of results within a particular result group, which can correspond to the number of events that share the same categorization criteria-value pairs. The action column 1142 includes a hyperlink or interface element to access the results or subset thereof (such as a sampling) of a particular result group 1144. In some cases, upon selecting the hyperlink or interface element in the action column 1142, a new window can launch with functionality to perform detailed search and refinement of the data contained within the selected result group 1144. In certain embodiments selection of the hyperlink or interface element can cause the system to perform search functionality such as that set forth in U.S. patent application Ser. No. 14/528,939, entitled "EVENT VIEW SELECTOR", filed on 30 Oct. 2014, published as US2016/0092045A1, which is hereby incorporated by reference in its entirety for all purposes. It will be understood that fewer or more columns can be used as desired.

The result groups 1144 can be sorted and ordered based on the sort order selector 1124. Further, a result group 1144 can be indicative of results or events that have been assigned or are associated with the same category identifier for each of the one or more categories (e.g., have matching categorization criteria values). For example, in the illustrated embodiment, the first result group includes 1100 results or events that have or are associated with the categorization criteria-value pairs index: sample and sourcetype: sendmail. The second result group includes 290 events or results that have or are associated with index:main and sourcetype: splunkd_ui_access, and so on. It will be understood that the results or events can be categorized into fewer or more event groupings 1144 as desired. In some instances, the results or events can be categorized based on one or more categories selected using the categorization criteria selector 1120. In such embodiments, some or all of the selected categories can be displayed in the results section 1130. As additional categories are used or displayed, the results section 1130 can be updated as will be described in greater detail below with reference to FIGS. 14 and 15.

In addition, the result groups 1144 can be displayed as interactive results to enable a user to interact with and view additional details relevant to the results or events in a particular result group 1144. Upon interaction with a grouping, the system can return additional information, such as sample events, snippets of data, field summaries of the events in the selected result group 1144, timeline visualizations of the events in the grouping 1144, etc. In some cases, the information displayed can correspond to a sampling of the events in the grouping 1144. For example, the system can sample the data in a grouping based on sampling criteria as opposed to evaluating every event, and display the information based on the sampling criteria. As will be described in greater detail below, in some cases, the sampling can include identifying events that satisfy the filter criteria and match the categorization criteria-value pairs of the selected grouping using an inverted index, identifying a subset of the events identified using the inverted index for sampling, and accessing the event data associated with the events identified for sampling.

Figure 12:
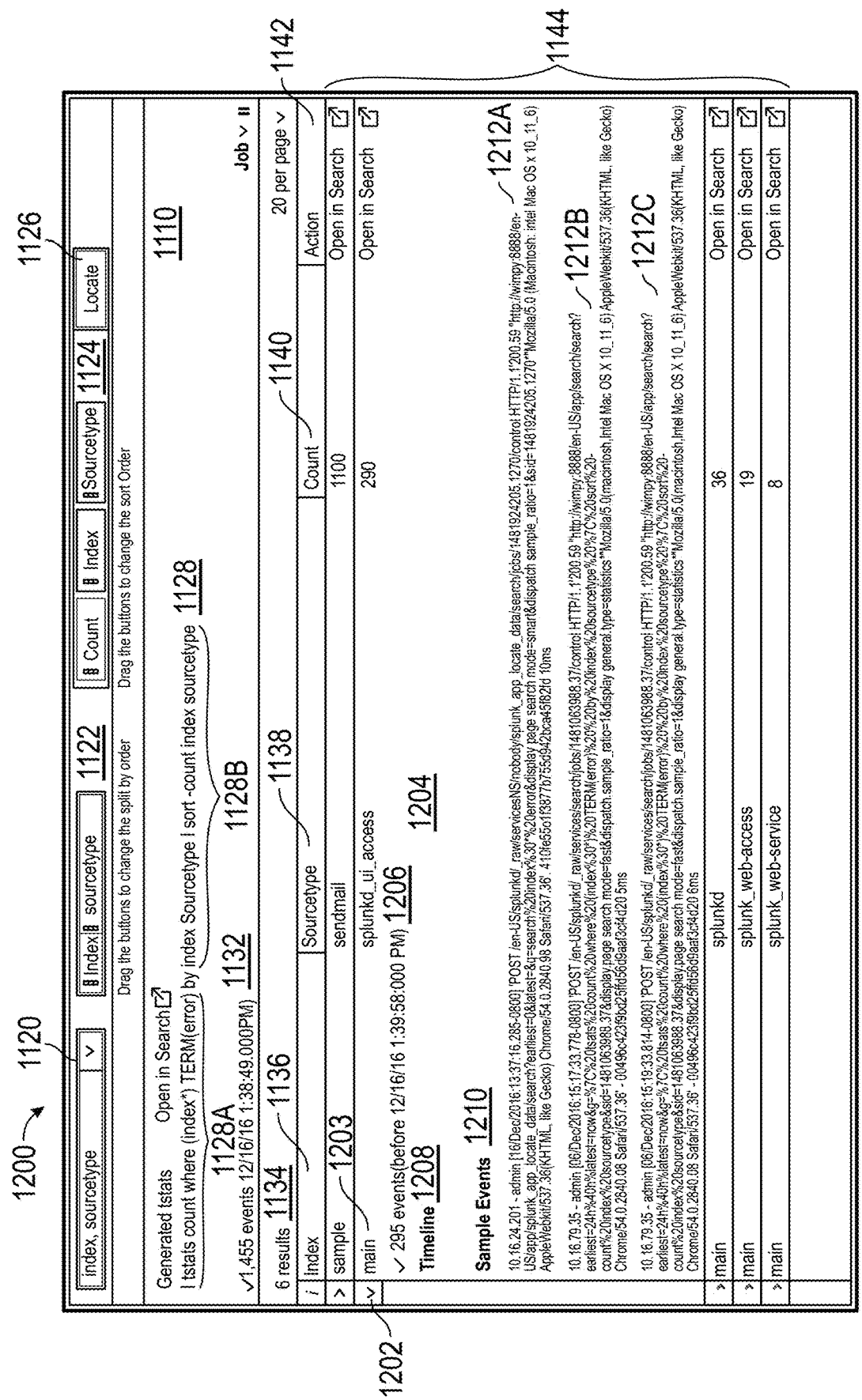
FIG. 12 illustrates a user interface screen for an example search interface including sample event information for selected results in accordance with one or more embodiments.

FIG. 12 illustrates an example search screen 1200 showing interface objects as well as additional result features in accordance with one or more embodiments. In some cases, screen 1200 represents an updated view of screen 1100 once a particular grouping 1144 has been selected. Accordingly, although not all features of screen 1100 are shown in FIG. 12, it will be understood that the screen 1200 can include any combination of any of the features shown in FIG. 11. In the illustrated embodiment of FIG. 12, search screen 1200 includes portions of the criteria section 1110 and summarization section 1130. The displayed portions of the criteria section 1110 include the categorization criteria selector 1120, the display order selector 1122, the sort order selector 1124, the request execution element 1126, and the generated request or command 1128. The displayed portions of the summarization section 1130 include the event summary 1132, the summarization 1134, summarization columns 1136, 1138, 1140, 1142, and a set of interactive, categorized results 1144.

In some embodiments, each grouping 1144 can be associated with an interface element, such as interface element 1202, selectable by the user to provide an expanded view of at least a subset of the events (or all of the events) within a grouping 1144. Although illustrated as a distinct interface element 1202, it will be understood that the interface element 1202 can be integrated with a particular grouping element, such that the selection of any portion, or a particular portion, of a grouping 1144 can result in the action associated with the interface element 1202.

In some embodiments, upon selection of the interface element 1202 (or a result group 1144), the request or command 1128 can be re-run or updated to reflect additional results in the result group 1144. In some cases, for example, the revised search can be a new search that includes additional filter criteria to provide different results, can be a more targeted search within the selected result group 1144, and/or can include additional results that were not available or were not included in an inverted index at the time the initial search was run.

Here, for example, the new search may utilize new filter criteria that provide more targeted results for the selected result group 1144. In certain cases, additional filter criteria, or a more targeted search, can result in fewer inverted indexes being reviewed and faster results, or an adjusted time range that can identify events that had not occurred and/or had not been processed at the time of the initial search. For example, in the illustrated embodiment of FIG. 12, the revised command can include filter criteria that limits the search to the index:main and sourcetype:splunkd_ui_access, which correspond to the categorization criteria-value pairs of the selected result group 1203. Similarly, the time range can be adjusted to identify all relevant events before a later time, as illustrated by the group events summary 1206.

In some embodiments, in response to the selection of the interface element 1202, a new request or command can be generated, similar to the way in which request or command 1128 is generated. The new generated request or command can correspond to the revised search that is to be run as described above. In certain cases, the new generated request or command can be included in the display. For example the new generated request or command can be displayed near the original request or command 1128 and/or alone in the expanded window 1204. In some embodiments, the command runs once a result group has been selected and can include a search of the actual events associated with the result group or a review of an inverted index similar to the initial search.

In some cases, the second review can correspond to a review of relevant inverted indexes. As part of the review, the system can identify events (or corresponding event references) that satisfy the updated filter criteria or filter criteria corresponding to the grouping (combination of the original filter criteria and the categorization criteria values associated with the selected grouping 1203). Once identified, the system can identify a sampling subset for review based on a sampling criteria. For example, the sampling criteria can indicate that the system is to review every hundredth or thousandth event and/or limit the number of events to be reviewed to 2,000 regardless of the number of events associated with the selected grouping. Once the sampling subset is identified, the system can use the inverted index to access the event data. In this way, the system can perform the sampling in a performant way be relying on the inverted index to identify the events for sampling before accessing any event data.

In the illustrated embodiment of FIG. 12, interface element 1202 is associated with grouping 1203 and has been selected. As a result, an expanded view 1204 of the grouping 1203 is displayed. The expanded view 1204 includes an event summary 1206, a timeline section 1208 and a sample events section 1210. Although not shown in FIG. 12, the expanded view 1204 can include any other fields shown and/or described herein, such as the graphical timeline 1320 and 1378 in FIGS. 13A and 13B, respectively, the display table section 1322 of FIG. 13A, the (column style) display table section 1382 of FIG. 13B, and the like.

The group event summary 1206 can identify the number of events in the grouping 1203, as well as the parameters of the search and/or date and time the search was completed. As mentioned, in some embodiments, upon selecting the interface element 1202 (or result group), the search or request or command can be re-run or updated and updated information displayed. In the illustrated embodiment, the search is updated and the group event summary 1206 identifies at least some of the updated filter criteria (e.g., time range filter criteria). Specifically, group event summary 1206 indicates that 295 events are associated with the result group 1203 as of the time that the updated search was run. As illustrated by the event summary 1132 and entry in the count column 1140 that corresponds to the result group 1203 (showing 290 results found), five additional events were identified when the search updated. In some cases, when the interface element 1202 is selected, the search is not updated.

The timeline section 1208 can include a timeline showing relevant times associated with the events and/or a time distribution of the events in the result group 1203. For example, the timeline section 1208 can show a bar graph for different segments of time in which timestamps associated with the results of the result group 1203 are located, as further shown and described in FIGS. 13A and 13B with respect to elements 1320 and 1378, respectively.

The sample events section 1210 includes three sample results or events 1212A, 1212B, 1212C, which may be representative of the results in the selected result group 1203. The system can identify the sample events 1212A, 1212B, 1212C for display in a variety of ways. In some cases, the system can identify the events with the most occurrences of a filter criterion, such as a keyword, as the sample events. In certain embodiments, the system can identify the events that appear to be the most relevant as the sample events, etc. Further, in some cases, the sample events can be identified based on a sampling rate described in greater detail below. It will be understood that although only three results 1212A, 1212B, 1212C are shown, the expanded view 1204 can display all results in the result group, or a portion thereof as is illustrated in FIG. 12.

The sample results 1212A, 1212B, 1212C can include the entire data entry corresponding to the sample results 1212A, 1212B, 1212C or a portion thereof. In some embodiments, the sample results 1212A, 1212B, 1212C can include samples of the raw machine data associated with or underlying the identified results or events. In certain embodiments, the sample events section 1210 can display a sample of indexed data associated with the events, e.g., by excerpting information regarding the events from a reduced-size summary of the events, such as an inverted index or lexicon. Further, in some cases, relevant keywords from the search bar or other filter criteria that are found in the sample events 1212A, 1212B, 1212C can be highlighted or otherwise demarcated from the other portions of the sample events 1212A, 1212B, 1212C.

Figure 13A:
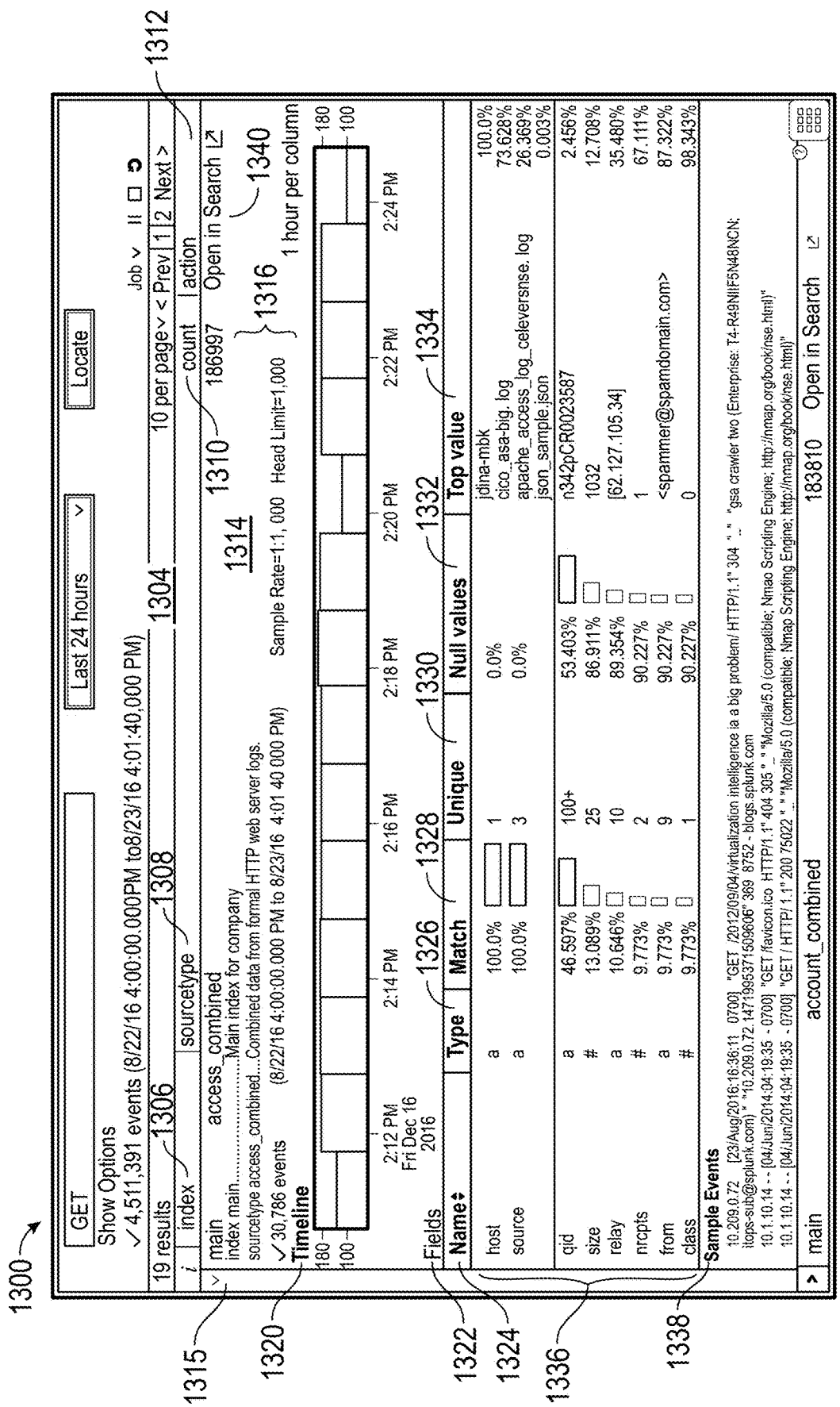

FIG. 13A illustrates an example screen 1300 including filter and display features as well as associated interface objects in accordance with one or more embodiments. In the illustrated embodiment, the screen 1300 depicts a summarization section 1304 that has multiple fields or result columns, including an index column 1306, a sourcetype column 1308, a count column 1310, and an action column 1312.

In addition, the search screen 1300 includes a display window 1314 overlaid over the summarization section 1304. In some embodiments, the display window 1314 can be accessed by selecting the result group 1315 as described previously with reference to FIG. 12. As described previously, in some embodiments, selecting the result group 1315 can cause the system to re-run or update the results for the result group 1315. In certain embodiments, selecting the result group 1315 does not cause the system to re-run or update the results and the result group 1315. In the illustrated embodiment of FIG. 13A, the system does not update the results based on the selection of the result group 1315.

The display window 1314 includes a group summary section 1316, a timeline section 1320, a fields or display table section 1322, and a sample events section 1338. However, it will be understood that the display window 1314 can include fewer or more section as desired. For example, the timeline section 1320 and/or sample events section 1338 can be omitted or replaced with other information as desired and/or any of the information shown and described in FIGS. 11, 12, 13B, 14A and/or 14B can be included as well.

In the illustrated embodiment, the group summary section 1316 identifies the relevant categorization criteria-value pairs index (main) and sourcetype (access_combined) associated with the particular result group 1315, the number of events associated with the result group 1315 (30,786) and the date and time of the search. It will be understood that the group summary section 1316 can include less or more information as described herein.

In certain embodiments, the group summary section 1316 may include various details regarding samples of results displayed in display window 1314. As mentioned previously, in some cases, the information displayed in the window 1314 can be based on sampling criteria indicating how to sample the events associated with the result group 1315. In the illustrated embodiment, the group summary section 1316 displays the sample or sampling rate of 1:1,000 for the result group 1315. In some embodiments, the sampling criteria, including sampling rate can be adjustable by the user. Further, the samples may be derived by a variety of sampling techniques, such as sampling the most recent events first, sampling at a predetermined interval, such as each $1000^{th}$ event or approximately each $1000^{th}$ event (e.g., every $1000^{th}$ event±10, 20, etc.), taking samples from over the full time or other range of data, or otherwise using algorithms to ensure that the sampled data provides an accurate representation or random or pseudo-random sampling of the results within the result group 1315.

The timeline section 1320 can include a timeline showing relevant times associated with the events and/or a time distribution of the events in the result group 1315. In the illustrated embodiment, the timeline section 1320 includes a bar graph or bins illustrating different segments of time in which timestamps associated with the results of the result group 1315 are located. The size of a particular bar or bin can correspond to the number of results within that particular time range. For example, the bars or bins with more results can be larger than bar or bins with fewer results. Further, the bins can correspond to equal time periods within a particular time range. For example, each bin or bar can correspond to an hour, minute, etc., within a time range. In the illustrated embodiment of FIG. 13A, each bin corresponds to approximately one minute, and the bins show a summary of results between 2:11 PM and 2:24 PM. However, it will be understood that the timeline section 1320 can be implemented using a variety of techniques to illustrate the time distribution of events in a particular search group.

The sample events section 1338 can include portions of entries of relevant results associated with the result group 1315, as described in greater detail above with reference to the sample events section 1210 of FIG. 12.

The display table section 1322 can provide detailed information corresponding to various fields or field values that relate to the selected result group 1315. In the illustrated embodiment of FIG. 13A, the display table section 1322 includes a field name column 1324, a type column 1326, a match column 1328, a uniqueness column 1330, a null values column 1332, and a top value column 1334.

The field name column 1324 can provide a listing of rows corresponding to different data fields (e.g., qid field, size field, relay field, form field, URL field, user field, IP address field, browser field, action field, etc.) found within the results of the selected result group 1315. The type column 1326 can indicate the type of field corresponding to the fields identified in the field name column. The match column 1328 can identify the percentage of events in the result group 1315 that include the field identified in the field name column 1324. The uniqueness column 1330 can indicate the quantity of unique entries that have the field identified in the field name column 1324. The null values column 1332 can identify the percentage of events in the result group 1315 that include a null value for identified in the field name column 1324. The top value column 1334 can identify the value with the highest number of instances in the results of the result group 1315 for the field identified in the field name column 1324. It will be understood that fewer or more columns or information can be display related to the results of the selected result group 1315.

As a non-limiting example and with reference to FIG. 13A and the field "qid," the display table section 1322 identifies qid as a field name in the field name column 1324 and as a field type 'a' in the type column 1326, which can indicate that the field is a string. Match field 1328 indicates that 46.597% of the results in the result group 1315 include a qid field. Unique field 1330 indicates that more than 100 unique results include a qid field. Null value field 1332 indicates that 53.403% of the results in the result group 1315 include a null value for the qid field, and top value field 1334 indicates that the most common qid value found within the results of the result group 1315 is "n342pCRO023587." In some embodiments, the top value field 1334 can further indicate the percentage of results that include the top value (2.456% in the illustrated embodiment). By reviewing the information, a user can identify relevant trends or results for further review.

Further, various numerical values within the table, such as the percentages of events that match and/or have no (null) corresponding match, may also be provided graphically next to the numerical value, such as via a bar graph. Such tabular/graphical display of data provides a high-level visual depiction of the results contained in the selected result group 1315, and enables the user to determine if the underlying raw data/events may be of interest. If initial or revised results are unsatisfactory, the present features and functionality for manipulating and refining results enable a user to generate and assess new results to determine if the underlying events are of potential interest. Such visual assessment of data subsets can enable the user to more quickly identify and promptly conduct additional search and analysis on results of greater interest. The displayed data can also enable a user to dynamically refine the results until a subset or result group with satisfactory data is identified, at which time the user can select the "open in search" 1340 icon, described in greater detail above with reference to action column 1142 of FIG. 11.

Further, in some embodiments, upon selecting a particular field in the display table section 1322 or a bin in the timeline section 1320, the system can provide additional information related to the selection. As non-limiting examples, upon selecting of a bin, the system can provide additional information related to results within the selected bin, upon selection of "qid," the system can provide additional information related to the results with a "qid" field, upon selection of "n342pCRO023587," the system can provide additional information related to the results that contain or are associated with qid "n342pCRO023587." The additional information can provide statistics or other relevant data regarding the selected information similar to the information provided in window 1314 or window 1374, described in greater detail below with reference to FIG. 13B.

In providing the additional information, in some cases, the system can perform an updated search to identify any additional results that may be relevant to the selected information as described in greater detail above. By allowing a user to review and select different data and provide additional information related to the selected data and/or update the review based on the selected data, the system can enable a user to iteratively review results to identify relevant events or data.

Figure 13B:
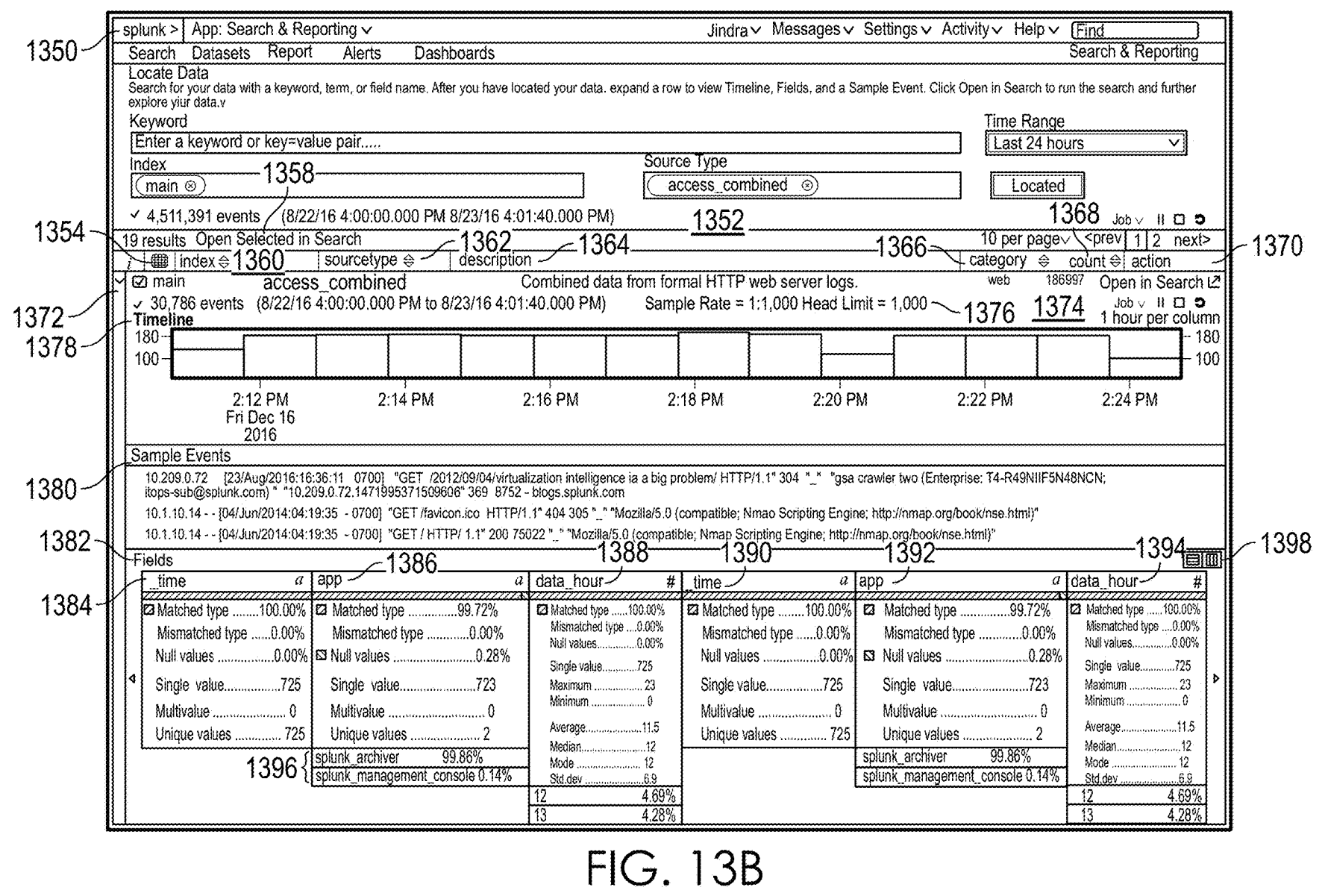

FIG. 13B illustrates an example search screen 1350, similar to search screen 1300, that includes a summarization section 1352 and a display window 1374 overlaid over the summarization section 1352.

In the illustrated embodiment of FIG. 13B, summarization section 1352 includes multiple summarization columns, including an index column 1360, a sourcetype column 1362, a description column 1364, a category column 1366, a count column 1368, and an action column 1370. However, it will be understood that fewer or more columns can be used. In some examples, a column can be included for each field selected by the categorization criteria selector 1120.

The various columns 1360, 1362, 1364, 1365, 1368 can provide information relevant to a particular result group, such as result group 1372, as described in greater detail above. In some cases, the result groups can be sorted based on the different columns 1360, 1362, 1364, 1365, 1368. The description column 1364 can provide a textual description of the data found within a particular result group. The category column 1366 can provide the type(s) of data or data category contained within a particular result group.

In some embodiments, the summarization section 1352 can also include interface elements 1354, such as checkboxes or other user interface objects that enable a user to select one or more result groups. The summarization section 1352 can also include an action element 1358 that enables the user to perform a desired action or function on selected results. For example, the action element 1358 can enable a user to open a selected result group, view all results in a result group, conduct a search of the event data associated with the result group and/or open display window 1374 to access additional search functionality.

The display window 1374 includes group summary section 1376, a timeline section 1378, a sample events section 1380, which can include information similar to what is described above with reference to the group summary section 1316, timeline section 1320, and sample events section 1338 of FIG. 13A. In addition, the display window 1374 includes a display table section 1382. It will be understood that the display window 1374 can include fewer or more sections as desired. For example, the group summary section 1376, timeline section 1378 and/or sample events section 1380 can be omitted or replaced with other information as desired.

The display table section 1382 can provide detailed information corresponding to various fields or field values that relate to the selected result group 1372.

In the illustrated embodiment of FIG. 13B, the display table section 1382 includes a column for different fields, categories, or other data characteristic found in the results of the result group 1372. The columns include a _time columns 1384, 1390, app columns 1386, 1392, and date_hour columns 1388, 1394.

The column heading for each column includes the name of the field and its type. The columns can include additional data, such as matched type percentage, null value, unique values, mismatched type percentage, single value, multivalue, some of which can correspond to the information in columns 1328, 1330, 1332, and 1334 described previously with reference to FIG. 13A. The mismatched type value can correspond to the number of results that do not include the identified field. The single value can correspond to the quantity of results or events that contain only a single instance of the term (e.g., field, category, etc.) at the top of its respective column. The multivalue can correspond to the quantity of results or events that contain multiple instances of the term (e.g., field, category, etc.) at the top of its respective column. The minimum and maximum values can denote the minimum and maximum instances of the term within the results or events that have the least and most occurrences of the term, respectively. Statistical values can also be provided regarding the occurrence of the term in the results, such as the average quantity of instances of the term in the results or events, as well as the median, mode, and/or standard deviation of occurrences of the term in the results or events. In some embodiments, the columns can correspond to the most frequently found and least frequently found field values 1396 for a particular field. In addition, in some cases, the display window 1374 can include interface elements 1398 to switch the fields display between row view and column view, or other interface elements to load additional or different sample events. Fewer or more columns or information can be included as desired. Further, upon selection of any information within the display table section 1382, additional information can be displayed and/or the search can be updated as described above.

Figure 14B:
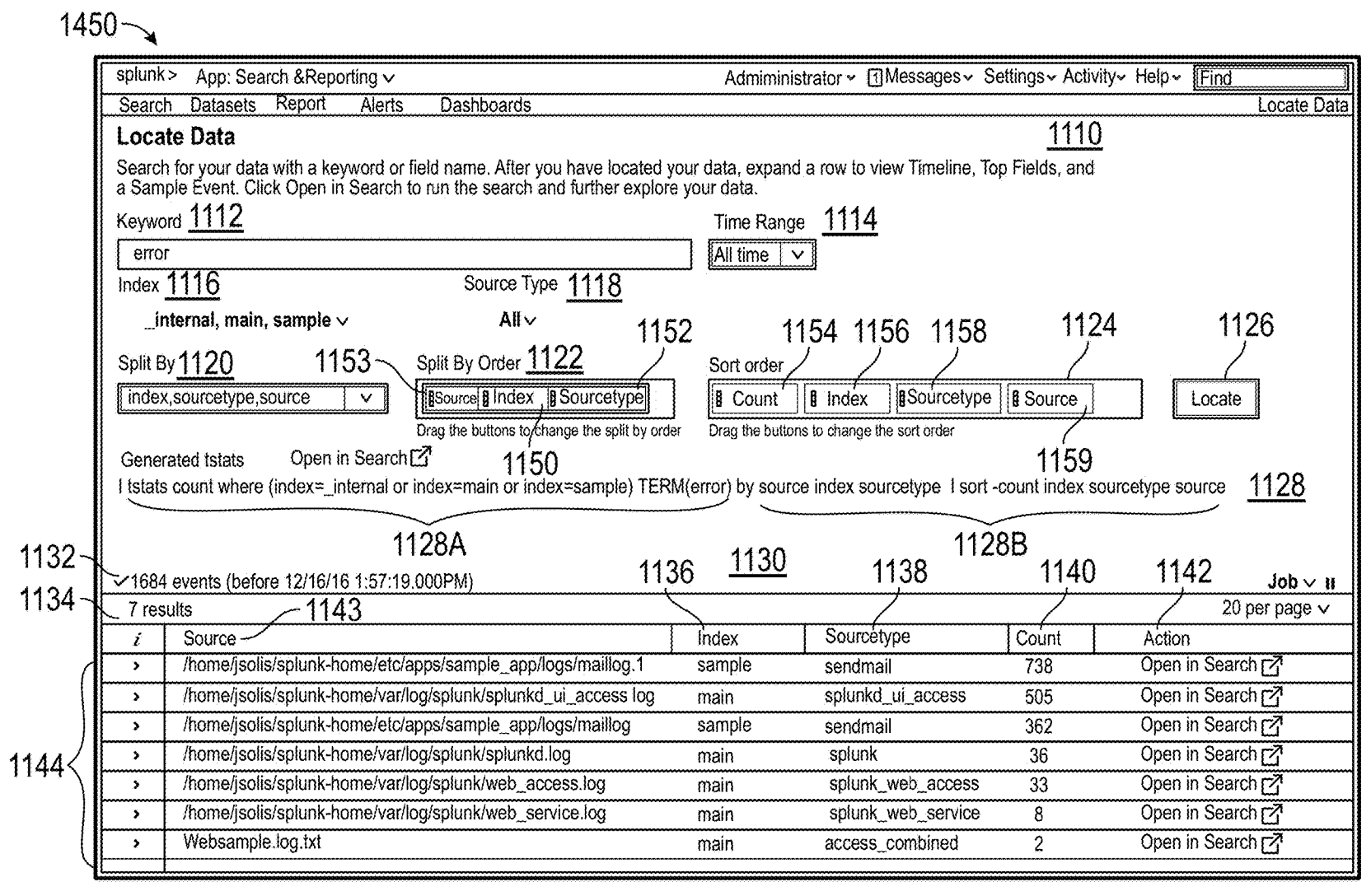

As mentioned above with reference to FIG. 11, the request or command 1128 can be updated using filter control elements 1112, 1114, 1116, 1118 category control element 1120, and/or display control elements 1122, 1124. FIGS. 14A and 14B illustrate example search screens 1400, 1450 in which one or more filter control elements 1112, 1114, 1116, 1118 category control element 1120, and/or display control elements 1122, 1124 have been updated.

In the illustrated embodiment of FIG. 14A, the partition selector 1116, categorization criteria selector 1120, display order selector 1122, and sort order selector 1124 have been changed relative to screen 1100 of FIG. 11. With respect to the partition selector 1116, the partitions internal, main, and sample have been selected. Accordingly, the system can limit the search to the internal, main, and sample partitions or to inverted indexes associated with the aforementioned partitions. The change to the selected indexes is reflected in the filter control portion 1128A of the generated request or command 1128, where "(index=*)" has been replaced with "(index=_internal OR index=main OR index=sample)." Although not illustrated in FIG. 14A, it will be understood that sourcetype selector 1118 (or source, host, or other selector) can be used to identify relevant items or locations to search. The combination of selectors can be used in an AND or an OR fashion (or any other fashion), such that the results must satisfy the filter criteria of all the selectors or any one of the selectors, etc. Further, as illustrated, in certain embodiments, such as when the filter criteria includes multiple values for a filter criterion, such as multiple indexes, hosts, sources, or sourcetypes, the events can satisfy the filter criteria by being associated with at least one of the values for each filter criterion. For example, if the selectors identify indexers I1, I2, I3, hosts H1, H2, sources S1, S2, S3, and sourcetypes ST1, ST2 as the filter criteria, then the events that correspond to at least one of I1, I2, I3, at least one of H1, H2, at least one of S1, S2, S3, and at least one of ST1, ST2 can be identified as satisfying the filter criteria. As mentioned, an event can correspond to an index, host, source, sourcetype, or other filter criterion based on the directory in which it (or associated inverted index or time series data store) is located, metadata associated with the event, a timestamp associated with the event and/or event data of the event.

With respect to the categorization criteria selector 1120, display order selector 1122, and sort order selector 1124, the display criteria can be used to determine how the results are to be categorized and displayed. In the illustrated embodiment, the change to the selectors 1120, 1122, 1124 is reflected in the category/display control portion 1128B of the generated request or command 1128, where "index sourcetype|sort-count index sourcetype" (shown in FIG. 11) has been replaced with "index sourcetype source|sort-count index sourcetype source."

In some cases, based on the addition or removal of a category using the categorization criteria selector 1120, the system can automatically update display order selector 1122 and/or the sort order selector 1124. In the illustrated embodiment of FIG. 14A, for example, based on the selection of the category: source in the categorization criteria selector 1120, the source interface object 1153 has been added to the display order selector 1122, and source interface object 1159 has been added to the sort order selector 1124.

In some embodiments, the request or command 1128 can be automatically updated based on any change in the criteria section 1110 (e.g., a change to a filter control element, category control element, and/or a display control element). In certain embodiments, the request or command 1128 can be updated based on a user interacting with a particular interface element of the screen 1400, such as the request execution element 1126 or other interface element.

As mentioned above, in some cases, based on a change to any filter control element, category control element, and/or display control element, a new search is initiated based on the content of the request or command 1128. In certain cases, rather than a new search, the results of the previous search are reviewed and reassessed in view of a change to a filter control element, category control element, and/or a display control element. In the illustrated embodiment of FIG. 14, based on an interaction with the request execution element 1126, a new search is initiated using the updated request or command 1128 and the summarization section 1130 is updated.

The new results can be categorized, ordered, and displayed based on the updated request or command 1128. Based on the updated request, source column 1143 is added to the summarization section 1130 and identifies the source for the results in a particular result group. In addition, based on the added source category, the results are categorized based on an index identifier, sourcetype field value and source field value. Results that have the same identifier/field value for each category are placed into the same result group 1144. With reference to FIGS. 11 and 14, the addition of the source category results in one additional result group. Accordingly, the summarization 1134 identifies seven results from the search. In addition, the event summary 1132 is updated to reflect the total number of events summarized.

As described above with reference to FIG. 11, the interface objects 1150, 1152, 1153, 1154, 1156, 1158, 1159 can be manipulated by a user to update the category/display control portion 1128B of the request or command 1128, as well as the results displayed in the results section 1130. Reorganizing or removing one or more of the interface objects 1150, 1152, 1153, 1154, 1156, 1158, 1159 from the display order selector 1122 and/or the sort order selector 1124 can cause the system to update the request or command 1128 and the summarization section 1130 based on the change. As mentioned previously, the system can run a new command and/or filter/reorganize the results of a previous review. In some instances, for example, the updates may simply result in refinement of the set of results currently being displayed.

FIG. 14B illustrates an example of a search screen 1450 in which the display order selector 1122 has been updated. Specifically, the source interface object 1153 has been moved to be in front of the index interface object 1150 and the sourcetype interface object 1152.

In response to the movement of the source interface object 1153, the system can automatically generate a new request or command 1128 based on the new order of the interface objects 1150, 1152, 1153. For example, based on the movement, the category/display control portion 1128B of the request or command 1128 can be changed from "index sourcetype source sort—count index sourcetype source" (shown in FIG. 14A) to "source index sourcetype sort—count index sourcetype source."

Further, the system can reprocess the results (or initiate a new search) and display the updated results in the summarization section 1130. Based on the changes to the interface objects 1150, 1152, 1153 and/or the request or command 1128, the columns in the summarization section 1130 are arranged with the source column 1143 first, the index column 1136 second, and the sourcetype column 1138 third. The order can correspond to the order of the interface objects 1150, 1152, 1153 arranged in the display order selector 1122. As described above, based on the scope of changes made by such updates to the criteria section 1110, a new search or review may or may not be initiated. In some instances, for example, the updates may simply result in refinement of the set of results currently being displayed.

Figure 15:
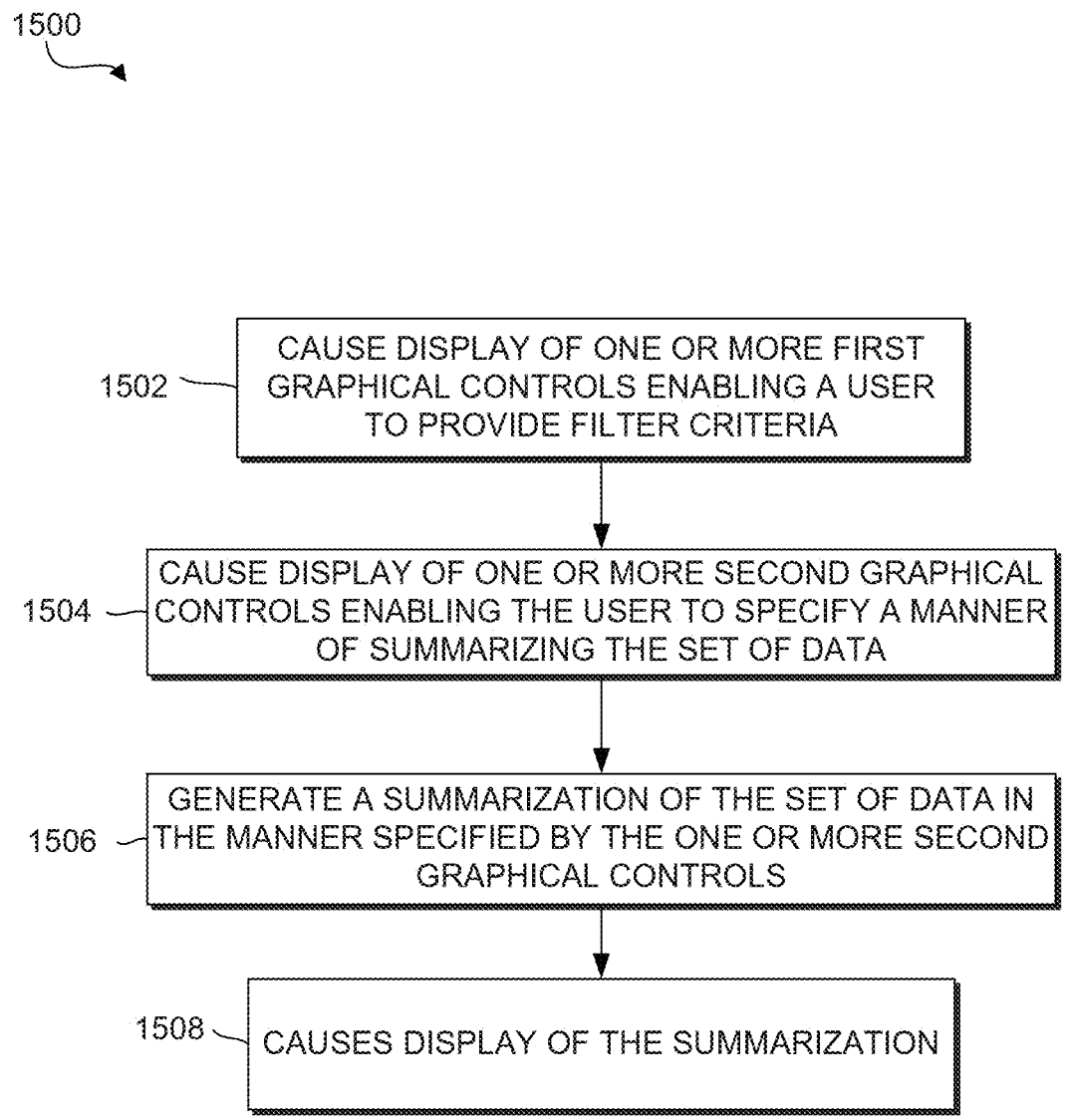
FIG. 15 is a flow diagram that illustrates how a search is performed via a search user interface to provide results in accordance with one or more embodiments.

FIG. 15 is a flow diagram of a routine 1500 that illustrates how a search index and query system performs a process to locate data of interest in accordance with one or more embodiments. At block 1502, a data intake and query system causes display of one or more first graphical controls enabling a user to provide filter criteria. As indicated above, the set of data can include events comprising a portion of raw machine data associated with a time stamp. The graphical indicators can include any one or more of the filter control elements described previously, or other filter control elements that identify data that is to be summarized.

At block 1504, the data intake and query system automatically causes display of one or more second graphical controls enabling the user to specify a manner of summarizing the set of data. The second graphical control can include any one or any combination of category control elements and/or display control elements described previously, or other category or display control elements as desired. In some cases, the second graphical controls enable the categorization or summarization of the set of data based on at least one of a host, source, sourcetype, and partition associated with the set of data. Furthermore, in certain cases, the second graphical controls enable the display of the groupings that result from the categorization, such as a display order of the categories and/or a sort order of the groupings.

At block 1506, the data intake and query system generates a summarization of the set of data in the manner specified by the one or more second graphical controls. The summarization can be generated in a variety of ways. For example, the summarization can be generated using one or more categorization criteria and/or display criteria and can include groupings of the set of data based on the categorization criteria.

In some cases, to generate the summarization, the data intake and query system generates a request or command based on the filter criteria, such as one or more keywords. In some embodiments, the request or command can be generated and displayed as a language-based request or command, such as a computer/programming language or source code request or command. In certain embodiments, such commands can include computer instructions in the form of regular expressions, object code, source code, or the like that when executed by a computer cause the computer to perform a particular review of one or more inverted indexes. In some cases, in response to the request or command, the system can return a summarization of events that satisfy the filter criteria. Further, each event may be associated with a time-stamp and include a portion of raw machine data. In some cases, the source code of the request or command can take the form of a human-readable and/or editable programming language defining the request or command to be run. In certain cases, the request or command is generated into a proprietary computer language, such as Splunk Processing Language (SPL).

In some cases, upon initiation of a command, the search process can further include displaying (i) a search progress indicator including a progress bar indicating status of a search job, and/or (ii) job control indicia in the search progress interface enabling a user to interact with the search job while it is in progress.

At block 1508, the data intake and query system causes display of the summarization. In some embodiments, the groupings of the summarization are displayed as a set of interactive, categorized results or result groups. In some cases, the display is based on the categorization criteria values associated with the one or more results. In some embodiments, a category identifier is associated with a result for each category used as part of the search. FIGS. 11, 12, 13A, 13B, 14A, and 14B illustrate various embodiments of displayed results.

Fewer or more steps can be included as desired. In some embodiments, the system can provide interface objects, features, and/or functionality to sort, categorize, manipulate, interact with and/or refine results, as discussed in greater detail above in connections with FIGS. 11, 12, 13A, 13B, 14A, and 14B. For example, the various features and functionality associated with the categorization criteria selector, display order selector and/or sort order selector can provide such various capabilities to manipulate and refine the results for deeper analysis.

In some embodiments, the data intake and query system can determine and provide event sample data for display, enabling the user to view more detailed sample information of the data associated with a selected row or batch of results. In certain cases, the sample data to be displayed is obtained using an inverted index. The system can use the inverted index to identify the events associated with the selected row, and identify which of the events to sample, and then use the inverted index to access the event data of the events to be sampled. As such, in some cases, this search can include comparing data from one or more inverted indexes with the one or more filter criteria associated with the relevant grouping. However, it will also be understood that searches can be performed on individual events stored in the data stores, without reference to an inverted index or lexicon characterizing such events.

3.2 Locating and Sampling Data

As described herein, various types of "lexicons" or "inverted indexes" characterizing or summarizing underlying raw machine data can be utilized to track and identify relevant events. The inverted indexes can specify occurrences of keywords, field-value pairs, or other relevant information within, or associated with, the events. Field-value pair entries in the inverted index can identify the field, one or more values for the field, and one or more events having each of the identified values for the field. Values for one or more fields (e.g., a performance metric) can be extracted from the events (e.g., using an extraction rule), or metadata associated with the events. A lexicon can be generated, accessed and/or modified that includes a set of values inclusive of the field values. The values in the lexicon can be a single number, a list of numbers or a range of numbers.

For each reviewed event, a representation of the event can be added to the lexicon. The representation can include an identifier, a pointer to the event, or an anonymous count increment. The lexicon can be associated with a time period that includes time stamps of events contributing to the lexicon. A lexicon can also or alternatively contain a set of keywords (or tokens) and pointers to events that contain those keywords. This enables fast keyword searching.

As described with reference to intermediate summaries, intermediate lexicons can be generated for non-overlapping time periods. Subsequent queries can then use and/or build on lexicons with relevant data to generate a result. For example, a number of events associated with a given lexicon value can be counted, an average field value can be determined or estimated (e.g., based on counts across multiple lexicon values), or correlations between multiple fields can be determined (e.g., since entries for multiple lexicon values can identify a single event). In one instance, correlations can also be determined based on data in multiple lexicons. For example, each point in a set of points analyzed for a correlation or model analysis can correspond to a lexicon and can represent frequencies of values of multiple fields in the lexicon (e.g., a first lexicon having an average value of X1 for field F1 and an average value of Y1 for field F2, and a second lexicon having an average value of X2 for field F1 and an average value of Y2 for field F2). U.S. application Ser. No. 13/475,798, filed on May 18, 2012, provides additional detail relating to lexicon, and is now U.S. Pat. No. 8,516,008, all of which are hereby incorporated by reference for all purposes.

The basic inverted index or lexicon functionality described above can be used as part of pre-processing the raw machine data. As part of the functionality, an inverted index characterizing the raw data can be created. In some cases, the inverted index can include one or more indexes of data and metadata regarding the events data specifying occurrences of keywords within each event. In certain cases, generating the summarization can be done by review of only the inverted indexes without reference to the underlying events themselves or raw machine data. In some embodiments, as a function of reviewing only inverted indexes, a summarization of large sets of the events can be can be generated, displayed, and visually assessed by the user all in a short timeframe. As such the relevance of large data sets having underlying raw data too extensive to search in entirety within a limited search timeframe can be visually assessed to determine whether the set of data includes events that are relevant to information sought by the user.

Figure 16:
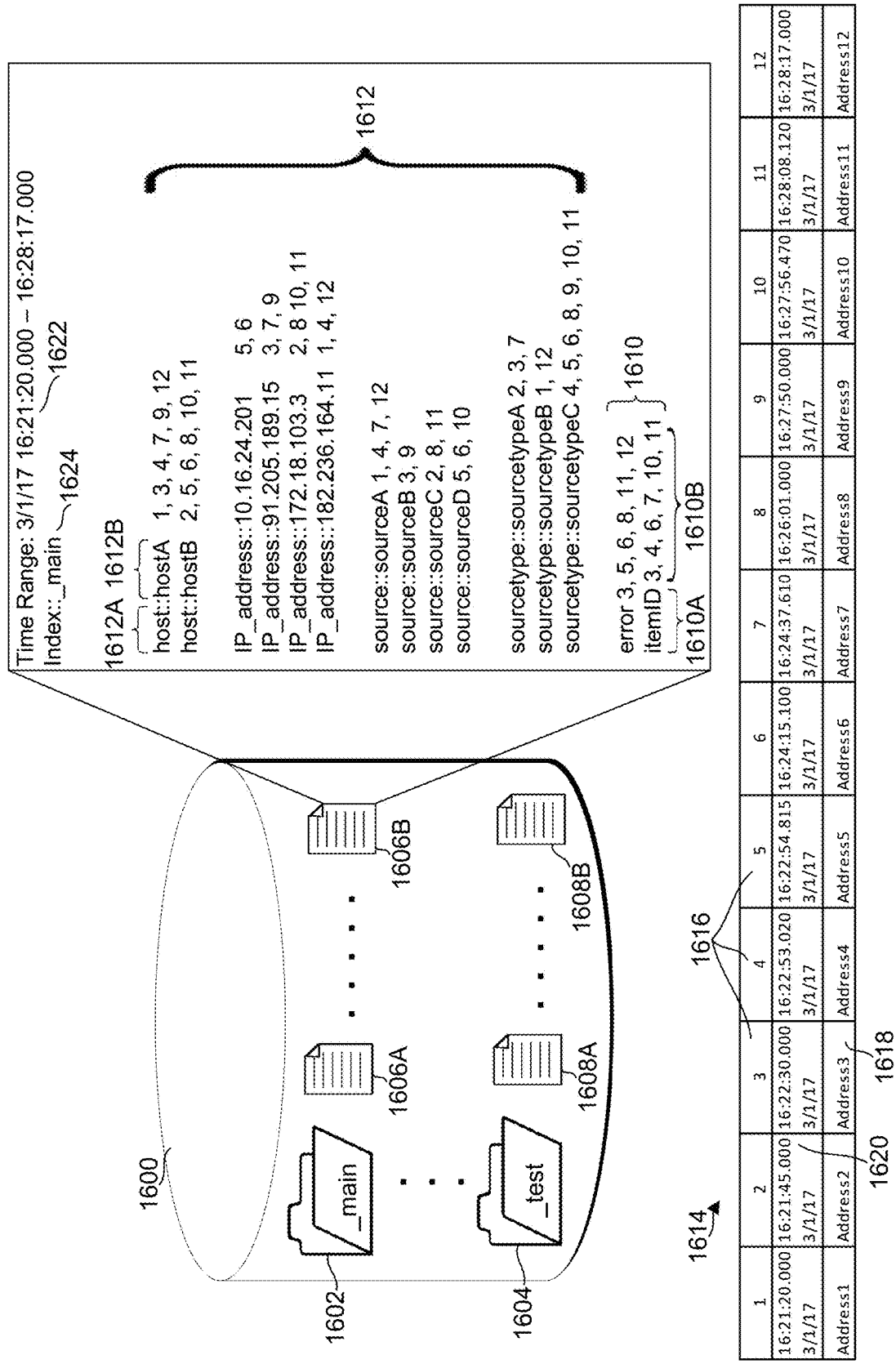
FIG. 16 is a block diagram illustrating an embodiment of a portion of a data store that includes directories for partitions that have a portion of data managed by an indexer.

FIG. 16 is a block diagram illustrating an embodiment of a portion of a data store 1600 that includes a directory for each index (or partition) that has a portion of data managed by an indexer 206. FIG. 16 further illustrates details of an embodiment of an inverted index 1606B and an event reference array 1614 associated with inverted index 1606B.

The data store 1600 can correspond to a data store 208 that stores events managed by an indexer 206 and/or can correspond to a different data store associated with an indexer 206. In the illustrated embodiment, the data store 1600 includes a _main directory 1602 associated with a _main index and a _test directory 1604 associated with a _test index. However, it will be understood that the data store 1600 can include fewer or more directories as desired. In some embodiments, multiple indexes can share a single directory and/or all indexes can share a common directory. Additionally, although illustrated as a single data store 1600, it will be understood that the data store 1600 can be implemented as multiple data stores storing different portions of the information shown in FIG. 16.

Further, in the illustrated embodiment, the index-specific directories 1602 and 1604 include inverted indexes 1606A, 1606B and 1608A, 1608B, respectively (in some embodiments referred to as TSIDX files or lexicons). The inverted indexes 1606A, 1606B, 1608A, 1608B can be similar to the keyword indexes described previously and can include less or more information as desired. In some embodiments, each inverted index 1606A, 1606B, 1608A, 1608B can correspond to a distinct time-series bucket that is managed by the indexer 206 and that contains events corresponding to the relevant index (e.g., _main index, _test index). As such, each inverted index can correspond to a particular range of time for an index. Additional files, such as high performance indexes for each time-series bucket of an index, can also be stored in the same directory as the inverted indexes 1606A, 1606B, 1608A, 1608B. It will be understood that in some embodiments each inverted index 1606A, 1606B, 1608A, 1608B can correspond to multiple time-series buckets or multiple inverted indexes 1606A, 1606B, 1608A, 1608B can correspond to a single time-series bucket.

Each inverted index 1606A, 1606B, 1608A, 1608B includes one or more entries, such as token (or keyword) entries and/or field-value pair entries. Furthermore, in certain embodiments, the inverted indexes 1606A, 1606B, 1608A, 1608B can include additional information, such as a time range 1622 associated with the inverted index and/or an index identifier 1624 identifying the index associated with the inverted index 1606A, 1606B, 1608A, 1608B. However, it will be understood that each inverted index 1606A, 1606B, 1608A, 1608B can include less or more information as desired.

Token entries, such as token entries 1610 illustrated in inverted index 1606B, can include a token 1610A (e.g., "error," "itemID," etc.) and event references 1610B indicative of events that include the token. For example, for the token "error," the corresponding token entry includes the token "error" and an event reference, or unique identifier, for each event stored in the corresponding time-series bucket that includes the token "error." In the illustrated embodiment of FIG. 16, the error token entry includes the identifiers 3, 5, 6, 8, 11, and 12 corresponding to events managed by the indexer 206 and associated with the index _main 1602 that are located in the time-series bucket associated with the inverted index 1608B.

In some cases, some token entries can be default entries, automatically determined entries, and/or user specified entries. In some embodiments, the indexer 206 can identify each word and/or string in an event as a distinct token and generate a token entry for it. In some cases, the indexer 206 can identify the beginning and ending of tokens based on punctuation, spaces, as described in greater detail above, etc. In certain cases, the indexer 206 can rely on user input or a configuration file to identify tokens for token entries 210, etc. It will be understood that any combination of token entries can be included as a default, automatically determined, and/or included based on user-specified criteria.

Similarly, field-value pair entries, such as field-value pair entries 1612 shown in inverted index 1606B, can include a field-value pair 1612A and event references 1612B indicative of events that include a field value that corresponds to the field-value pair. For example, for a field-value pair sourcetype::sendmail, a field-value pair entry would include the field-value pair sourcetype::sendmail and a unique identifier, or event reference, for each event stored in the corresponding time-series bucket that includes a sendmail sourcetype.

In some cases, the field-value pair entries 1612 can be default entries, automatically determined entries, and/or user specified entries. As a non-limiting example, the field-value pair entries for the fields host, source, sourcetype can be included in the inverted indexes 1606A, 1606B, 1608A, 1608B as a default. As such, all of the inverted indexes 1606A, 1606B, 1608A, 1608B can include field-value pair entries for the fields host, source, sourcetype. As yet another non-limiting example, the field-value pair entries for the IP_address field can be user specified and may only appear in the inverted index 1606B based on user-specified criteria. As another non-limiting example, as the indexer indexes the events, it can automatically identify field-value pairs and create field-value pair entries. For example, based on the indexers review of events, it can identify IP_address as a field in each event and add the IP_address field-value pair entries to the inverted index 1606B. It will be understood that any combination of field-value pair entries can be included as a default, automatically determined, and/or included based on user-specified criteria.

Each unique identifier, or event reference, can correspond to a unique event located in the time series bucket. However, the same event reference can be located in multiple entries. For example if an event has a sourcetype splunkd, host www1 and token "warning," then the unique identifier for the event will appear in the field-value pair entries sourcetype::splunkd and host::www1, as well as the token entry "warning." With reference to the illustrated embodiment of FIG. 16 and the event that corresponds to the event reference 3, the event reference 3 is found in the field-value pair entries 1612 host::hostA, source::sourceB, sourcetype::sourcetypeA, and IP_address::91.205.189.15 indicating that the event corresponding to the event references is from hostA, sourceB, of sourcetypeA, and includes 91.205.189.15 in the event data.

For some fields, the unique identifier is located in only one field-value pair entry for a particular field. For example, the inverted index may include four sourcetype field-value pair entries corresponding to four different sourcetypes of the events stored in a bucket (e.g., sourcetypes:sendmail, splunkd, web_access, and web_service). Within those four sourcetype field-value pair entries, an identifier for a particular event may appear in only one of the field-value pair entries. With continued reference to the example illustrated embodiment of FIG. 16, since the event reference 7 appears in the field-value pair entry sourcetype::sourcetypeA, then it does not appear in the other field-value pair entries for the sourcetype field, including sourcetype::sourcetypeB, sourcetype::sourcetypeC, and sourcetype::sourcetypeD.

The event references 1610, 1612 can be used to locate the events in the corresponding bucket. For example, the inverted index can include, or be associated with, an event reference array 1614. The event reference array 1614 can include an array entry 1616 for each event reference in the inverted index 1606B. Each array entry 1616 can include location information 1618 of the event corresponding to the unique identifier (non-limiting example: seek address of the event), a timestamp 1620 associated with the event, and/or additional information regarding the event associated with the event reference, etc.

For each token entry 1610 and/or field-value pair entry 1612, the event reference 1610B, 1612B or unique identifiers can be listed in chronological order and/or the value of the event reference can be assigned based on chronological data, such as a timestamp associated with the event referenced by the event reference. For example, the event reference 1 in the illustrated embodiment can correspond to the first-in-time event for the bucket, and the event reference 12 can correspond to the last-in-time event for the bucket. However, it will be understood that the event references can be listed in any order, such as reverse chronological order, ascending order, descending order, or some other order, etc. Further, it will be understood that the entries can be sorted. For example, the entries can be sorted alphabetically (collectively or within a particular group), by entry origin (e.g., default, automatically generated, user-specified, etc.), by entry type (e.g., field-value pair entry, token entry, etc.), and/or chronologically by when added to the inverted index, etc. In the illustrated embodiment of FIG. 16, the entries are sorted first by entry type and then alphabetically.

As a non-limiting example of how the inverted indexes 1606A, 1606B, 1608A, 1608B can be used during a data categorization request or tstats command, the indexers receive filter criteria indicating data that is to be categorized and categorization criteria indicating how the data is to be categorized. Example filter criteria can include, but is not limited to, indexes (or partitions), hosts, sources, sourcetypes, time ranges, field identifier, keywords, etc.

Using the filter criteria, the indexer identifies relevant inverted indexes to be searched. For example, if the filter criteria includes a set of partitions, the indexer can identify the inverted indexes stored in the directory corresponding to the particular partition as relevant inverted indexes. Other means can be used to identify inverted indexes associated with a partition of interest. For example, in some embodiments, the indexer can review an entry in the inverted indexes, such as an index-value pair entry 1624 to determine if a particular inverted index is relevant. If the filter criteria does not identify any partition, then the indexer can identify all inverted indexes managed by the indexer as relevant inverted indexes.

Similarly, if the filter criteria includes a time range, the indexer can identify inverted indexes corresponding to buckets that satisfy at least a portion of the time range as relevant inverted indexes. For example, if the time range is last hour then the indexer can identify all inverted indexes that correspond to buckets storing events associated with timestamps within the last hour as relevant inverted indexes.

When used in combination, an index filter criterion specifying one or more partitions and a time range filter criterion specifying a particular time range can be used to identify a subset of inverted indexes within a particular directory (or otherwise associated with a particular partition) as relevant inverted indexes. As such, the indexer can focus the processing to only a subset of the total number of inverted indexes that the indexer manages.

Once the relevant inverted indexes are identified, the indexer can review them using any additional filter criteria to identify events that satisfy the filter criteria. In some cases, using the known location of the directory in which the relevant inverted indexes are located, the indexer can determine that any events identified using the relevant inverted indexes satisfy an index filter criterion. For example, if the filter criteria includes a partition main, then the indexer can determine that any events identified using inverted indexes within the partition main directory (or otherwise associated with the partition main) satisfy the index filter criterion.

Furthermore, based on the time range associated with each inverted index, the indexer can determine that that any events identified using a particular inverted index satisfies a time range filter criterion. For example, if a time range filter criterion is for the last hour and a particular inverted index corresponds to events within a time range of 30 minutes ago to 35 minutes ago, the indexer can determine that any events identified using the particular inverted index satisfy the time range filter criterion. Conversely, if the particular inverted index corresponds to events within a time range of 59 minutes ago to 62 minutes ago, the indexer can determine that some events identified using the particular inverted index may not satisfy the time range filter criterion.

Using the inverted indexes, the indexer can identify event references (and therefore events) that satisfy the filter criteria. For example, if the token "error" is a filter criterion, the indexer can track all event references within the token entry "error." Similarly, the indexer can identify other event references located in other token entries or field-value pair entries that match the filter criteria. The system can identify event references located in all of the entries identified by the filter criteria. For example, if the filter criteria include the token "error" and field-value pair sourcetype::web_ui, the indexer can track the event references found in both the token entry "error" and the field-value pair entry sourcetype::web_ui. As mentioned previously, in some cases, such as when multiple values are identified for a particular filter criterion (e.g., multiple sources for a source filter criterion), the system can identify event references located in at least one of the entries corresponding to the multiple values and in all other entries identified by the filter criteria. The indexer can determine that the events associated with the identified event references satisfy the filter criteria.

In some cases, the indexer can further consult a timestamp associated with the event reference to determine whether an event satisfies the filter criteria. For example, if an inverted index corresponds to a time range that is partially outside of a time range filter criterion, then the indexer can consult a timestamp associated with the event reference to determine whether the corresponding event satisfies the time range criterion. In some embodiments, to identify events that satisfy a time range, the indexer can review an array, such as the event reference array 1614 that identifies the time associated with the events. Furthermore, as mentioned above using the known location of the directory in which the relevant inverted indexes are located (or other index identifier), the indexer can determine that any events identified using the relevant inverted indexes satisfy the index filter criterion.

In some cases, based on the filter criteria, the indexer reviews an extraction rule. In certain embodiments, if the filter criteria includes a field name that does not correspond to a field-value pair entry in an inverted index, the indexer can review an extraction rule, which may be located in a configuration file, to identify a field that corresponds to a field-value pair entry in the inverted index.

For example, the filter criteria includes a field name "sessionID" and the indexer determines that at least one relevant inverted index does not include a field-value pair entry corresponding to the field name sessionID, the indexer can review an extraction rule that identifies how the sessionID field is to be extracted from a particular host, source, or sourcetype (implicitly identifying the particular host, source, or sourcetype that includes a sessionID field). The indexer can replace the field name "sessionID" in the filter criteria with the identified host, source, or sourcetype. In some cases, the field name "sessionID" may be associated with multiples hosts, sources, or sourcetypes, in which case, all identified hosts, sources, and sourcetypes can be added as filter criteria. In some cases, the identified host, source, or sourcetype can replace or be appended to a filter criterion, or be excluded. For example, if the filter criteria includes a criterion for source S1 and the "sessionID" field is found in source S2, the source S2 can replace S1 in the filter criteria, be appended such that the filter criteria includes source S1 and source S2, or be excluded based on the presence of the filter criterion source S1. If the identified host, source, or sourcetype is included in the filter criteria, the indexer can then identify a field-value pair entry in the inverted index that includes a field value corresponding to the identity of the particular host, source, or sourcetype identified using the extraction rule.

Once the events that satisfy the filter criteria are identified, the system, such as the indexer 206 can categorize the results based on the categorization criteria. The categorization criteria can include categories for grouping the results, such as any combination of partition, source, sourcetype, or host, or other categories or fields as desired.

The indexer can use the categorization criteria to identify categorization criteria-value pairs or categorization criteria values by which to categorize or group the results. The categorization criteria-value pairs can correspond to one or more field-value pair entries stored in a relevant inverted index, one or more index-value pairs based on a directory in which the inverted index is located or an entry in the inverted index (or other means by which an inverted index can be associated with a partition), or other criteria-value pair that identifies a general category and a particular value for that category. The categorization criteria values can correspond to the value portion of the categorization criteria-value pair.

As mentioned, in some cases, the categorization criteria-value pairs can correspond to one or more field-value pair entries stored in the relevant inverted indexes. For example, the categorization criteria-value pairs can correspond to field-value pair entries of host, source, and sourcetype (or other field-value pair entry as desired). For instance, if there are ten different hosts, four different sources, and five different sourcetypes for an inverted index, then the inverted index can include ten host field-value pair entries, four source field-value pair entries, and five sourcetype field-value pair entries. The indexer can use the nineteen distinct field-value pair entries as categorization criteria-value pairs to group the results.

Specifically, the indexer can identify the location of the event references associated with the events that satisfy the filter criteria within the field-value pairs, and group the event references based on their location. As such, the indexer can identify the particular field value associated with the event corresponding to the event reference. For example, if the categorization criteria include host and sourcetype, the host field-value pair entries and sourcetype field-value pair entries can be used as categorization criteria-value pairs to identify the specific host and sourcetype associated with the events that satisfy the filter criteria.

In addition, as mentioned, categorization criteria-value pairs can correspond to data other than the field-value pair entries in the relevant inverted indexes. For example, if partition or index is used as a categorization criterion, the inverted indexes may not include partition field-value pair entries. Rather, the indexer can identify the categorization criteria-value pair associated with the partition based on the directory in which an inverted index is located, information in the inverted index, or other information that associates the inverted index with the partition, etc. As such a variety of methods can be used to identify the categorization criteria-value pairs from the categorization criteria.

Accordingly based on the categorization criteria (and categorization criteria-value pairs), the indexer can generate groupings based on the events that satisfy the filter criteria. As a non-limiting example, if the categorization criteria includes a partition and sourcetype, then the groupings can correspond to events that are associated with each unique combination of partition and sourcetype. For instance, if there are three different partitions and two different sourcetypes associated with the identified events, then the six different groups can be formed, each with a unique partition value-sourcetype value combination. Similarly, if the categorization criteria includes partition, sourcetype, and host and there are two different partitions, three sourcetypes, and five hosts associated with the identified events, then the indexer can generate up to thirty groups for the results that satisfy the filter criteria. Each group can be associated with a unique combination of categorization criteria-value pairs (e.g., unique combinations of partition value sourcetype value, and host value).

In addition, the indexer can count the number of events associated with each group based on the number of events that meet the unique combination of categorization criteria for a particular group (or match the categorization criteria-value pairs for the particular group). With continued reference to the example above, the indexer can count the number of events that meet the unique combination of partition, sourcetype, and host for a particular group.

Each indexer communicates the groupings to the search head. The search head can aggregate the groupings from the indexers and provide the groupings for display. In some cases, the groups are displayed based on at least one of the host, source, sourcetype, or partition associated with the groupings. In some embodiments, the search head can further display the groups based on display criteria, such as a display order and/or a sort order as described in greater detail above.

As a non-limiting example and with reference to FIG. 16, consider a request received by an indexer 206 that includes the following filter criteria: keyword=error, partition=_main, time range=Mar. 1, 17 16:22.00.000-16:28.00.000, sourcetype=sourcetypeC, host=hostB, and the following categorization criteria:source.

Based on the above criteria, the indexer 206 identifies _main directory 1602 and can ignore _test directory 1604 and any other partition-specific directories. The indexer determines that inverted partition 1606B is a relevant partition based on its location within the _main directory 1602 and the time range associated with it. For sake of simplicity in this example, the indexer 206 determines that no other inverted indexes in the _main directory 1602, such as inverted index 1606A satisfy the time range criterion.

Having identified the relevant inverted index 1606B, the indexer reviews the token entries 1610 and the field-value pair entries 1612 to identify event references, or events, that satisfy all of the filter criteria.

With respect to the token entries 1610, the indexer can review the error token entry and identify event references 3, 5, 6, 8, 11, 12, indicating that the term "error" is found in the corresponding events. Similarly, the indexer can identify event references 4, 5, 6, 8, 9, 10, 11 in the field-value pair entry sourcetype::sourcetypeC and event references 2, 5, 6, 8, 10, 11 in the field-value pair entry host::hostB. As the filter criteria did not include a source or an IP_address field-value pair, the indexer can ignore those field-value pair entries.

In addition to identifying event references found in at least one token entry or field-value pair entry (e.g., event references 3, 4, 5, 6, 8, 9, 10, 11, 12), the indexer can identify events (and corresponding event references) that satisfy the time range criterion using the event reference array 1614 (e.g., event references 2, 3, 4, 5, 6, 7, 8, 9, 10). Using the information obtained from the inverted index 1606B (including the event reference array 1614), the indexer 206 can identify the event references that satisfy all of the filter criteria (e.g., event references 5, 6, 8).

Having identified the events (and event references) that satisfy all of the filter criteria, the indexer 206 can group the event references using the received categorization criteria (source). In doing so, the indexer can determine that event references 5 and 6 are located in the field-value pair entry source::sourceD (or have matching categorization criteria-value pairs) and event reference 8 is located in the field-value pair entry source::sourceC. Accordingly, the indexer can generate a sourceC group having a count of one corresponding to reference 8 and a sourceD group having a count of two corresponding to references 5 and 6. This information can be communicated to the search head. In turn the search head can aggregate the results from the various indexers and display the groupings. As mentioned above, in some embodiments, the groupings can be displayed based at least in part on the categorization criteria, including at least one of host, source, sourcetype, or partition.

It will be understood that a change to any of the filter criteria and/or categorization criteria can result in different groupings. As a one non-limiting example, a request received by an indexer 206 that includes the following filter criteria: partition=_main, time range=Mar. 1, 2017 Mar. 1, 2017 16:21:20.000-16:28:17.000, and the following categorization criteria: host, source, sourcetype would result in the indexer identifying event references 1-12 as satisfying the filter criteria. The indexer would then generate up to 24 groupings corresponding to the 24 different combinations of the categorization criteria-value pairs, including host (hostA, hostB), source (sourceA, sourceB, sourceC, sourceD), and sourcetype (sourcetypeA, sourcetypeB, sourcetypeC). However, as there are only twelve events identifiers in the illustrated embodiment and some fall into the same grouping, the indexer generates eight groups and counts as follows:

Group 1 (hostA, sourceA, sourcetypeA): 1 (event reference 7)
Group 2 (hostA, sourceA, sourcetypeB): 2 (event references 1, 12)
Group 3 (hostA, sourceA, sourcetypeC): 1 (event reference 4)
Group 4 (hostA, sourceB, sourcetypeA): 1 (event reference 3)
Group 5 (hostA, sourceB, sourcetypeC): 1 (event reference 9)

Group 6 (hostB, sourceC, sourcetypeA): 1 (event reference 2)
Group 7 (hostB, sourceC, sourcetypeC): 2 (event references 8, 11)
Group 8 (hostB, sourceD, sourcetypeC): 3 (event references 5, 6, 10)

As noted, each group has a unique combination of categorization criteria-value pairs or categorization criteria values. The indexer communicates the groups to the search head for aggregation with results received from other indexers. In communicating the groups to the search head, the indexer can include the categorization criteria-value pairs for each group and the count. In some embodiments, the indexer can include more or less information. For example, the indexer can include the event references associated with each group and other identifying information, such as the indexer or inverted index used to identify the groups.

As another non-limiting examples, a request received by an indexer 206 that includes the following filter criteria: partition=main, time range=Mar. 1, 2017 Mar. 1, 2017 16:21:20.000-16:28:17.000, source=sourceA, sourceD, and keyword=itemID and the following categorization criteria: host, source, sourcetype would result in the indexer identifying event references 4, 7, and 10 as satisfying the filter criteria, and generate the following groups:

Group 1 (hostA, sourceA, sourcetypeC): 1 (event reference 4)
Group 2 (hostA, sourceA, sourcetypeA): 1 (event reference 7)
Group 3 (hostB, sourceD, sourcetypeC): 1 (event references 10)

The indexer communicates the groups to the search head for aggregation with results received from other indexers. As will be understand there are myriad ways for filtering and categorizing the events and event references. For example, the indexer can review multiple inverted indexes associated with an partition and/or review the inverted indexes of multiple partitions, and categorize the data using any one or any combination of partition, host, source, sourcetype, or other category, as desired.

Further, if a user interacts with a particular group, the indexer can provide additional information regarding the group. For example, the indexer can perform a targeted search and/or sampling of the events that satisfy the filter criteria and the categorization criteria for the selected group, also referred to as the filter criteria corresponding to the group or filter criteria associated with the group.

In some cases, to provide the additional information, the indexer relies on the inverted index. For example, the indexer can identify the event references associated with the events that satisfy the filter criteria and the categorization criteria for the selected group and then use the event reference array 1616 to access some or all of the identified events. In some cases, the categorization criteria values or categorization criteria-value pairs associated with the group become part of the filter criteria for the review.

With reference to FIG. 16 for instance, suppose a group is displayed with a count of six corresponding to event references 4, 5, 6, 8, 10, 11 (i.e., event references 4, 5, 6, 8, 10, 11 satisfy the filter criteria and are associated with matching categorization criteria values or categorization criteria-value pairs) and a user interacts with the group (e.g., selecting the group, clicking on the group, etc.). In response, the search head communicates with the indexer to provide additional information regarding the group.

In some embodiments, the indexer identifies the event references associated with the group using the filter criteria and the categorization criteria for the group (e.g., categorization criteria values or categorization criteria-value pairs unique to the group). Together, the filter criteria and the categorization criteria for the group can be referred to as the filter criteria associated with the group. Using the filter criteria associated with the group, the indexer identifies event references 4, 5, 6, 8, 10, 11.

Based on a sampling criteria, discussed in greater detail above, the indexer can determine that it will analyze a sample of the events associated with the event references 4, 5, 6, 8, 10, 11. For example, the sample can include analyzing event data associated with the event references 5, 8, 10. In some embodiments, the indexer can use the event reference array 1616 to access the event data associated with the event references 5, 8, 10. Once accessed, the indexer can compile the relevant information and provide it to the search head for aggregation with results from other indexers. By identifying events and sampling event data using the inverted indexes, the indexer can reduce the amount of actual data this is analyzed and the number of events that are accessed in order to generate the summary of the group and provide a response in less time.

Figure 17:
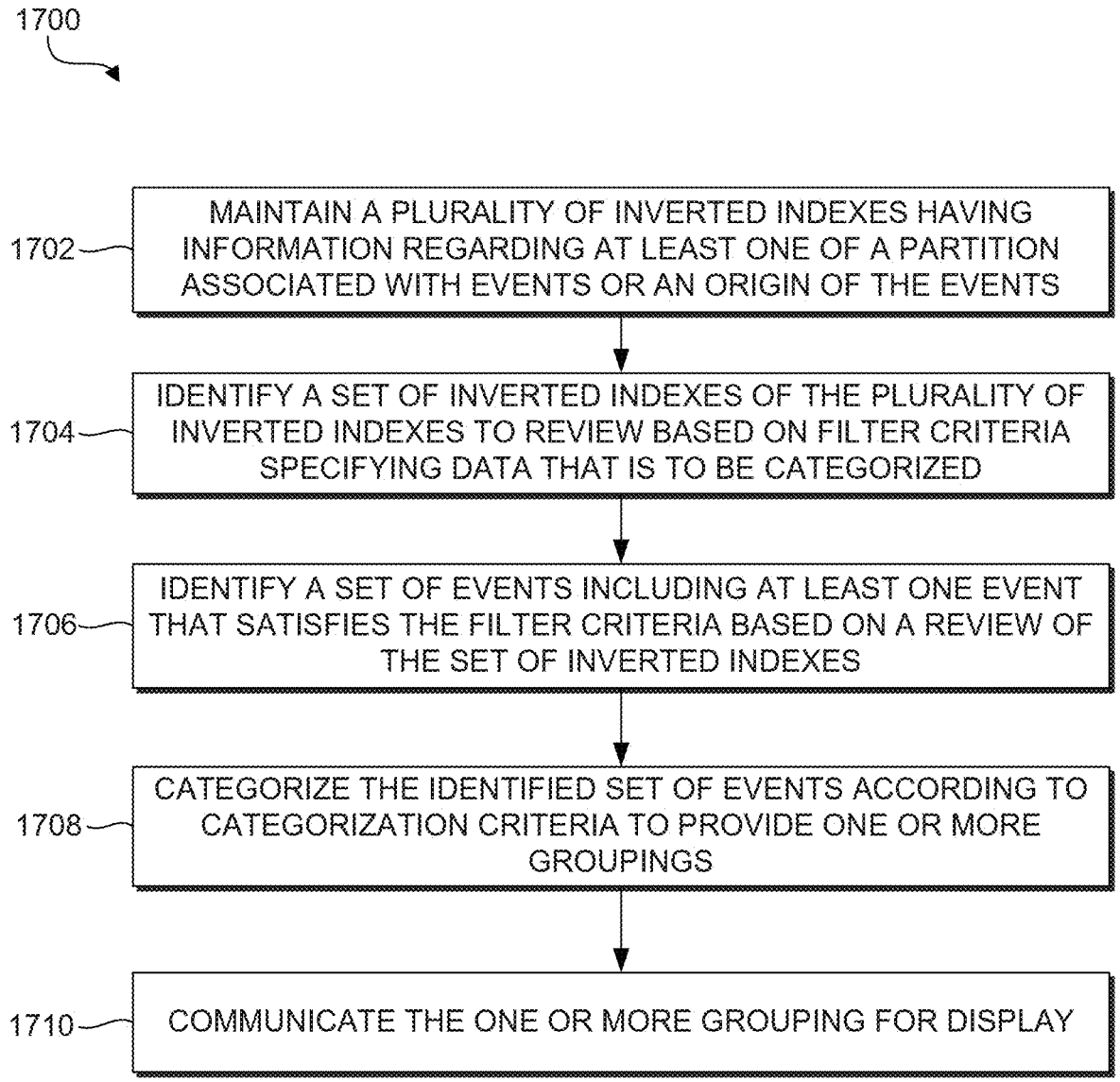
FIG. 17 is a flow diagram that illustrates how a search index and query system performs a process to locate data of interest in accordance with one or more embodiments.

FIG. 17 is a flow diagram of a routine 1700 that illustrates how a search index and query system performs a process to locate data of interest in accordance with one or more embodiments. At block 1702, a data intake and query system maintains a plurality of inverted indexes having information regarding at least one of a partition associated with events or an origin of the events. As mentioned above, each event can include a portion of raw machine data associated with a time stamp and each inverted index can include multiple entries, such as token entries and/or field-value pair entries. Each entry can include a token or a field-value pair and one or more event references indicative of an event that includes the token or the field-value pair.

At block 1704, the data intake and query system identifies a set of inverted indexes of the plurality of inverted indexes to review based on filter criteria specifying data that is to be categorized. As discussed above, identifying the set of inverted indexes can include identifying inverted indexes located in a particular directory and/or associated with a particular time range and/or partition.

At block 1706, the data intake and query system identifies a set of events including at least one event that satisfies the filter criteria based on a review of the set of inverted indexes. As discussed in greater detail above, identifying the set of events can include comparing the received filter criteria with the token entries and/or field-value pair entries located in the inverted index, and/or comparing timestamps associated with events with the filter criteria. In some embodiments, the identification can be based on event references located within the inverted indexes. For example, the identification can be based on the presence or location of the event references in one or more field-value pair entries and/or token entries.

At block 1708, the data intake and query system categorizes the identified set of events according to categorization criteria to provide one or more groupings. As discussed in greater detail above, the categorization criteria can specify how data is to be categorized. Categorizing the data can include forming result groups based on events that have matching categorization criteria values for the categorization criteria. In some cases, the data can be categorized based on one or more of host, source, sourcetype, or a partition associated with the data.

At block 1710, the data intake and query system communicates the one or more grouping for display. As discussed in greater detail, in some embodiments, the groupings can be displayed based on one or more of host, source, sourcetype, or a partition associated with the data. Further, the groupings can be displayed based on received display criteria.

Fewer or more steps can be included as desired. For example, in some embodiments, the system can consult an event reference array to identify the timestamp associated with events, etc. Further in certain embodiments, the system can provide interface objects, features, and/or functionality to sort, categorize, manipulate, interact with and/or refine results, as discussed in greater detail above in connections with FIGS. 11, 12, 13A, 13B, 14A, and 14B. For example, the various features and functionality associated with the categorization criteria selector, display order selector and/or sort order selector can provide such various capabilities to manipulate and refine the results for deeper analysis.

Figure 18:
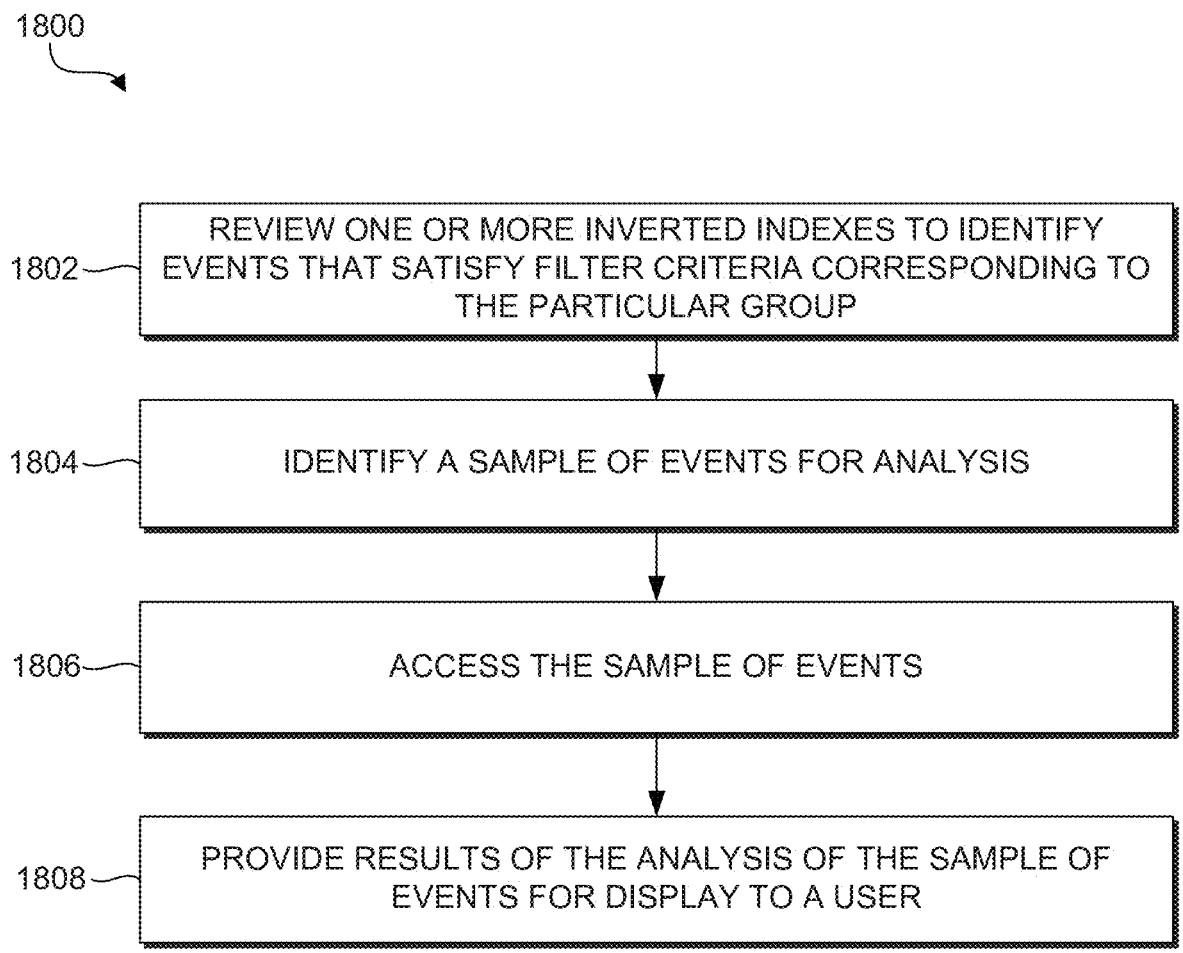
FIG. 18 is a flow diagram that illustrates how a search index and query system performs a process to sample data of interest in accordance with one or more embodiments.

FIG. 18 is a flow diagram of a routine 1800 that illustrates how a search index and query system performs a sampling of data of interest in accordance with one or more embodiments. At block 1802, in response to an interaction with a particular group of a displayed summarization of a set of data, the search index and query system reviews one or more inverted indexes to identify events that satisfy filter criteria corresponding to the particular group. In some embodiments, the summarization is based on at least one of one of a host, source, source type, and partition associated with the set of data. As described in greater detail above, in certain embodiments, the filter criteria can correspond to filter criteria from a previous review or command and categorization criteria-value pairs associated with the particular group. As further described in greater detail above, the inverted indexes can be identified based on a comparison of the filter criteria with the directory where they are located and/or time ranges or partitions with which the inverted indexes are associated. Further, the inverted indexes can include various entries that include tokens or field-value pairs and event references indicative of events that include the token or are associated with field values corresponding to the field-value pairs.

At block 1804, the data intake and query system identifies a sample of events for analysis. As described in greater detail above, the sample of events can correspond to a subset of the events referenced in the inverted index that satisfy the filter criteria. The sample of events can be identified in a variety of ways as discussed in greater detail previously.

At block 1806, the data intake and query system accesses the sample of events. As discussed in greater detail above, in some embodiments, the inverted index can include location information for the events that are referenced in the inverted index. Accordingly, the system can use the location reference to identify the location of the event data of the sample of events.

At block 1808, the data intake and query system provides results of the analysis of the sample of events for display to a user. As described in greater detail above, the analysis can include any one or any combination of sample event data, timelines, field summaries, etc.

Fewer or more steps can be included as desired. For example, in some embodiments, the routine 1800 can include maintaining the inverted indexers, as described in greater detail above with reference to block 1702 of routine 1700.

Although described above with reference to generating search queries and commands, and displaying results related to events and machine data, it will be understood that the system can be used in the search and display of configuration data or other type of data alone or in combination with the search and display of events and event data. The configuration data can include information regarding a configuration or topology of data sources or hosts, reports and/or dashboards, and can be used to identify relationships between them. In some embodiments, the request or command can include a search of one or more data stores storing configuration data. Configuration data that satisfies some or all of the filter criteria can be returned as part of the results. The configuration data can be combined with the events and/or displayed separately. Furthermore, the system can include selectors or other interface objects to enable a user to review the configuration data with the events, categorize and/or the results based on data type (event data vs. configuration data, categorize results based on configuration data and/or event data, etc.), and so on. In this manner, the system can enable a user to identify relevant data and where the relevant data, host, source, or sourcetype may be.

Figure 19:
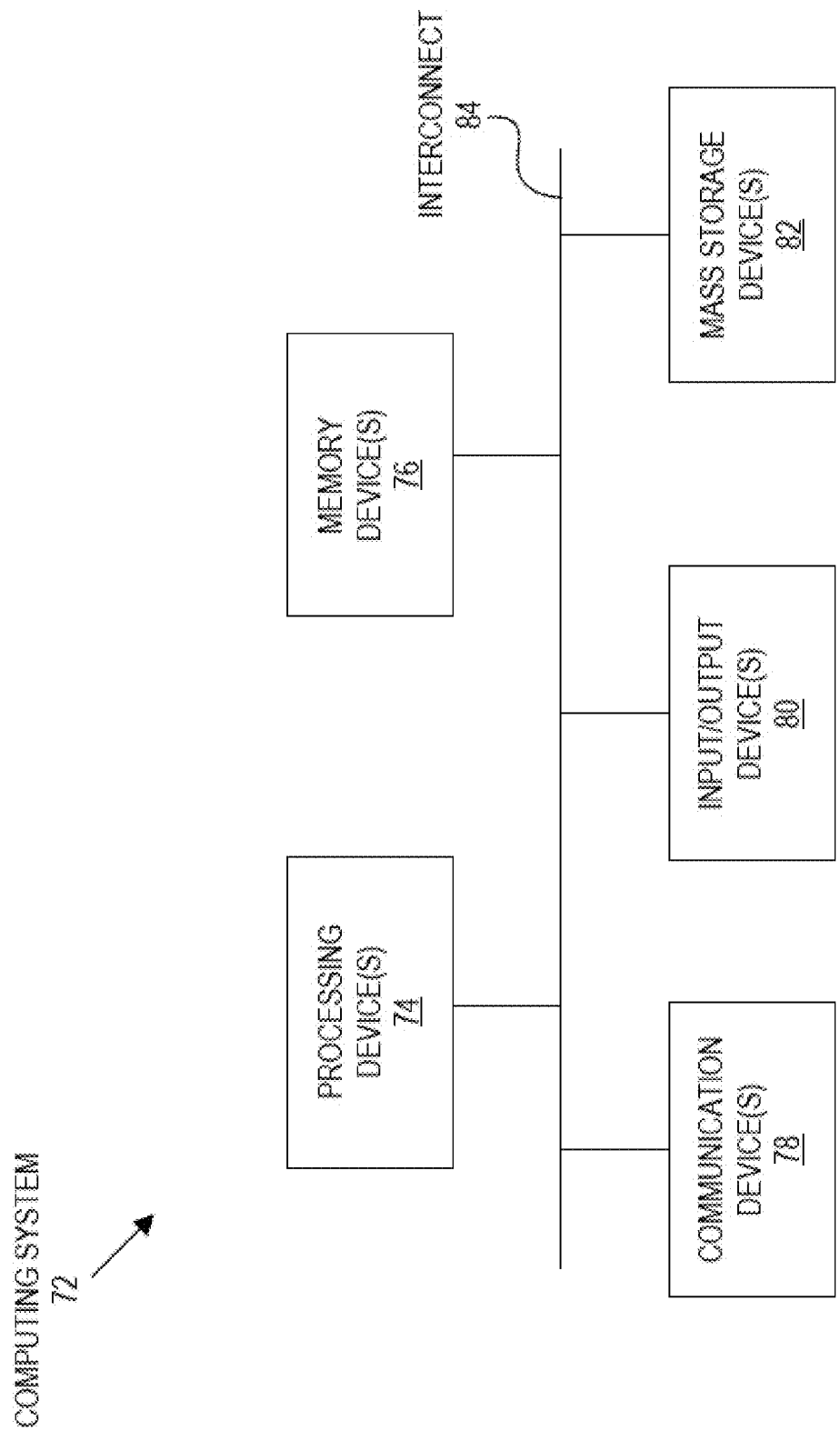
FIG. 19 is a block diagram illustrating a high-level example of a hardware architecture of a computing system in which one or more implementations may be embodied.

FIG. 19 is a block diagram illustrating a high-level example of a hardware architecture of a computing system in which an embodiment may be implemented. For example, the hardware architecture of a computing system 72 can be used to implement any one or more of the functional components described herein (e.g., indexer, data intake and query system, search head, data store, server computer system, edge device, etc.). In some embodiments, one or multiple instances of the computing system 72 can be used to implement the techniques described herein, where multiple such instances can be coupled to each other via one or more networks.

The illustrated computing system 72 includes one or more processing devices 74, one or more memory devices 76, one or more communication devices 78, one or more input/output (I/O) devices 80, and one or more mass storage devices 82, all coupled to each other through an interconnect 84. The interconnect 84 may be or include one or more conductive traces, buses, point-to-point connections, controllers, adapters, and/or other conventional connection devices. Each of the processing devices 74 controls, at least in part, the overall operation of the processing of the computing system 72 and can be or include, for example, one or more general-purpose programmable microprocessors, digital signal processors (DSPs), mobile application processors, microcontrollers, application-specific integrated circuits (ASICs), programmable gate arrays (PGAs), or the like, or a combination of such devices.

Each of the memory devices 76 can be or include one or more physical storage devices, which may be in the form of random access memory (RAM), read-only memory (ROM) (which may be erasable and programmable), flash memory, miniature hard disk drive, or other suitable type of storage device, or a combination of such devices. Each mass storage device 82 can be or include one or more hard drives, digital versatile disks (DVDs), flash memories, or the like. Each memory device 76 and/or mass storage device 82 can store (individually or collectively) data and instructions that configure the processing device(s) 74 to execute operations to implement the techniques described above.

Each communication device 78 may be or include, for example, an Ethernet adapter, cable modem, Wi-Fi adapter, cellular transceiver, baseband processor, Bluetooth or Bluetooth Low Energy (BLE) transceiver, or the like, or a combination thereof. Depending on the specific nature and purpose of the processing devices 74, each I/O device 80 can be or include a device such as a display (which may be a touch screen display), audio speaker, keyboard, mouse or other pointing device, microphone, camera, etc. Note, however, that such I/O devices 80 may be unnecessary if the processing device 74 is embodied solely as a server computer.

In the case of a client device (e.g., edge device), the communication devices(s) 78 can be or include, for example, a cellular telecommunications transceiver (e.g., 3G, LTE/4G, 5G), Wi-Fi transceiver, baseband processor, Bluetooth or BLE transceiver, or the like, or a combination thereof. In the case of a server, the communication device(s) 78 can be or include, for example, any of the aforementioned types of communication devices, a wired Ethernet adapter, cable modem, DSL modem, or the like, or a combination of such devices.

A software program or algorithm, when referred to as "implemented in a computer-readable storage medium," includes computer-readable instructions stored in a memory device (e.g., memory device(s) 76). A processor (e.g., processing device(s) 74) is "configured to execute a software program" when at least one value associated with the software program is stored in a register that is readable by the processor. In some embodiments, routines executed to implement the disclosed techniques may be implemented as part of OS software (e.g., MICROSOFT WINDOWS® and LINUX®) or a specific software application, algorithm component, program, object, module, or sequence of instructions referred to as "computer programs."

Computer programs typically comprise one or more instructions set at various times in various memory devices of a computing device, which, when read and executed by at least one processor (e.g., processing device(s) 74), will cause a computing device to execute functions involving the disclosed techniques. In some embodiments, a carrier containing the aforementioned computer program product is provided. The carrier is one of an electronic signal, an optical signal, a radio signal, or a non-transitory computer-readable storage medium (e.g., the memory device(s) 76).

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Conjunctive language such as the phrase "at least one of X, Y and Z," unless specifically stated otherwise, is otherwise understood with the context as used in general to convey that an item, term, etc. may be either X, Y or Z, or any combination thereof. Thus, such conjunctive language is not generally intended to imply that certain embodiments require at least one of X, at least one of Y and at least one of Z to each be present. Further, use of the phrase "at least one of X, Y or Z" as used in general is to convey that an item, term, etc. may be either X, Y or Z, or any combination thereof.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. For example, while only one aspect of the invention is recited as a means-plus-function claim under 35 U.S.C sec. 112(f) (MA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

The invention claimed is:

1. A method, comprising:
    causing display of one or more first graphical controls of a graphical user interface on a display device, the one or more first graphical controls enabling a user to specify filter criteria to identify a set of data of a distributed data intake and query system to be summarized,
    wherein the set of data includes events, each event comprising a portion of raw machine data associated with a time stamp and generated by one or more components in an information technology (IT) environment, wherein the distributed data intake and query system uses the filter criteria provided in the one or more first graphical controls to obtain the set of data;
    causing display of one or more second graphical controls of the graphical user interface on the display device, the one or more second graphical controls enabling the user to specify:
        grouping criteria to generate a plurality of groups of data from the set of data based on at least one of a host, source, source type, and partition associated with the set of data, wherein the grouping criteria comprises a field identifier, and
        summarizing criteria to summarize the plurality of groups of data,
    wherein the one or more second graphical controls are distinct from and displayed concurrently with the one or more first graphical controls;
    generating, by a computer, the plurality of groups of data based at least in part on the field identifier and an inverted index, the inverted index comprising a plurality of entries, each entry of the plurality of entries comprising:
        a field value corresponding to the field identifier, and
        one or more event references, each event reference indicative of an event of the events that is associated with the field value;
    generating, by the computer, a summarization of the plurality of groups of data based at least in part on the summarizing criteria specified by the one or more second graphical controls; and
    causing display of the summarization.

2. The method of claim 1, wherein the summarization is displayed as a plurality of interactive group summaries based at least in part on the summarizing criteria, wherein the plurality of interactive group summaries correspond to the plurality of groups.

3. The method of claim 1, further comprising identifying a set of events that satisfies the filter criteria based at least in part on a review of the inverted index and not a search of individual events,
wherein the summarization is generated based at least in part on the identifying the set of events.

4. The method of claim 1, wherein the filter criteria comprises a second field value, the method further comprising identifying a set of events that satisfy the filter criteria based at least in part on a comparison of the second field value with field values of entries of the inverted index, wherein the summarization is generated based at least in part on the identifying the set of events.

5. The method of claim 1, wherein the filter criteria comprises a token, the method further comprising identifying a set of events that satisfy the filter criteria based at least in part on a comparison of the token with a plurality of token entries of the inverted index, wherein the summarization is generated based at least in part on the identifying the set of events.

6. The method of claim 1, wherein the filter criteria comprises a partition identifier, the method further comprising identifying a set of events that satisfy the filter criteria based at least in part on a review of inverted indexes located in a directory corresponding to the partition, wherein the summarization is generated based at least in part on the identifying the set of events.

7. The method of claim 1, wherein the filter criteria comprises one or more tokens.

8. The method of claim 1, further comprising automatically generating and causing display of a command based at least in part on the filter criteria indicated by the one or more first graphical controls and the summarizing criteria indicated by the one or more second graphical controls.

9. The method of claim 1, wherein the one or more first graphical controls include a partition selector to identify a particular partition as a filter criterion of the filter criteria.

10. The method of claim 1, wherein the one or more first graphical controls include a host selector to identify a particular host as a filter criterion of the filter criteria.

11. The method of claim 1, wherein the one or more first graphical controls include a source selector to identify a particular source as a filter criterion of the filter criteria.

12. The method of claim 1, wherein the one or more first graphical controls include a source type selector to identify a particular source type as a filter criterion of the filter criteria.

13. The method of claim 1, wherein the one or more first graphical controls include a time range selector to identify a particular time range as a filter criterion of the filter criteria.

14. The method of claim 1, wherein the one or more second graphical controls include a category selector to identify the grouping criteria.

15. The method of claim 1, wherein the one or more second graphical controls include a display order selector to identify the summarizing criteria.

16. The method of claim 1, wherein the one or more second graphical controls include a plurality of interactive user interface objects associated with the grouping criteria and the summarizing criteria, the method further comprising:
receiving an indication that a first interactive user interface object of the plurality of interactive user interface objects has been moved; and
modifying the display of the summarization based at least in part on the receiving the indication.

17. The method of claim 1, wherein the one or more second graphical controls include a sort order selector to identify an order for displaying the plurality of groups for the summarization, wherein the order for displaying the plurality of groups corresponds to at least a portion of the summarizing criteria.

18. The method of claim 1, wherein the one or more second graphical controls include a plurality of interactive user interface objects associated with the grouping criteria, a sort order corresponding to at least a portion of the summarizing criteria, wherein the summarization includes a plurality of sorted groups based at least in part on the grouping criteria and the sort order, the method further comprising:
receiving an indication that a first interactive user interface object of the plurality of interactive user interface objects has been moved; and
modifying a sorted order of the plurality of sorted groups based at least in part on the receiving the indication.

19. The method of claim 1, wherein the summarization comprises the plurality of groups and a count for each of the plurality of groups, the count based at least in part on a number of events that satisfy the filter criteria and are associated with a matching field value.

20. The method of claim 1, wherein the summarization comprises a plurality of interactive group summaries corresponding to the plurality of groups, the method further comprising:
receiving an indication that an interactive user interface object associated with a particular interactive group summary of the plurality of interactive group summaries has been selected; and
displaying event data corresponding to an event associated with the particular interactive group summary based at least in part on said receiving the indication.

21. The method of claim 1, wherein the summarization comprises a plurality of interactive group summaries corresponding to the plurality of groups, the method further comprising:
receiving an indication that an interactive user interface object associated with a particular interactive group summary of the plurality of interactive group summaries has been selected; and
displaying one or more field values corresponding at least one event associated with the particular interactive group summary based at least in part on said receiving the indication.

22. The method of claim 1, wherein the summarization is a first summarization and comprises a plurality of interactive group summaries, the method further comprising based at least in part on a determination that a particular group of the plurality of interactive group summaries has been selected, causing display of a second summarization specific to the particular group, the second summarization comprising at least one of sample event data, a timeline, or a field summary.

23. The method of claim 1, wherein the summarization comprises a plurality of interactive group summaries corresponding to the plurality of groups, the method further comprising based at least in part on a determination that a particular interactive group summary of the plurality of interactive group summaries has been selected, generating a request that includes the filter criteria and grouping criteria-value pairs corresponding to the particular group.

24. The method of claim 1, wherein the summarization comprises a plurality of interactive group summaries corresponding to plurality of groups, the method further comprising:

based at least in part on a determination that a particular interactive group summary of the plurality of interactive group summaries has been selected, reviewing one or more inverted indexes to identify events that satisfy the filter criteria and satisfy grouping criteria-value pairs corresponding to the particular interactive group summary;

identifying a sample of events of the identified events for analysis;

accessing the sample of events; and providing results of the analysis of the sample of events for display.

25. The method of claim 1, wherein the summarization comprises a plurality of interactive group summaries corresponding to plurality of groups, the method further comprising:

based at least in part on a determination that a particular interactive group summary of the plurality of interactive group summaries has been selected, reviewing one or more inverted indexes to identify event references corresponding to events that satisfy the filter criteria and satisfy grouping criteria-value pairs corresponding to the particular interactive group summary;

identifying a sample of the events for analysis using the identified event references;

accessing the sample of the events using an event reference array associated with the inverted index; and providing results of the analysis of the sample of the events for display.

26. A system, comprising:

a memory; and a processing device coupled with the memory to:

cause display of one or more first graphical controls of a graphical user interface on a display device, the one or more first graphical controls enabling a user to specify filter criteria to identify a set of data of a distributed data intake and query system to be summarized, wherein the set of data includes events, each event comprising a portion of raw machine data associated with a time stamp and generated by one or more components in an information technology (IT) environment, wherein the distributed data intake and query system uses the filter criteria provided in the one or more first graphical controls to obtain the set of data;

cause display of one or more second graphical controls of the graphical user interface on the display device, the one or more second graphical controls enabling the user to specify:

grouping criteria to generate a plurality of groups of data from the set of data based on at least one of a host, source, source type, and partition associated with the set of data, wherein the grouping criteria comprises a field identifier, and summarizing criteria to summarize the plurality of groups of data, wherein the one or more second graphical controls are distinct from and displayed concurrently with the one or more first graphical controls;

generate the plurality of groups of data based at least in part on the field identifier and an inverted index, the inverted index comprising a plurality of entries, each entry of the plurality of entries comprising:

a field value corresponding to the field identifier, and one or more event references, each event reference indicative of an event of the events that is associated with the field value;

generate a summarization of the plurality of groups of data based at least in part on the summarizing criteria specified by the one or more second graphical controls; and cause display of the summarization.

27. The system of claim 26, wherein the summarization comprises the plurality of groups based at least in part on a number of different categorization criteria-value pairs associated with the set of data and a count for each of the plurality of groups, the count corresponding to a number of events that satisfy the filter criteria and are associated with matching categorization criteria-value pairs.

28. A non-transitory computer-readable medium encoding instructions thereon that, in response to execution by one or more processing devices, cause the one or more processing devices to perform operations comprising:

causing display of one or more first graphical controls of a graphical user interface on a display device, the one or more first graphical controls enabling a user to specify filter criteria to identify a set of data of a distributed data intake and query system to be summarized, wherein the set of data includes events, each event comprising a portion of raw machine data associated with a time stamp and generated by one or more components in an information technology (IT) environment, wherein the distributed data intake and query system uses the filter criteria provided in the one or more first graphical controls to obtain the set of data;

causing display of one or more second graphical controls of the graphical user interface on the display device, the one or more second graphical controls enabling the user to specify:

grouping criteria to generate a plurality of groups of data from the set of data based on at least one of a host, source, source type, and partition associated with the set of data, wherein the grouping criteria comprises a field identifier, and summarizing criteria to summarize the plurality of groups of data, wherein the one or more second graphical controls are distinct from and displayed concurrently with the one or more first graphical controls;

generating the plurality of groups of data based at least in part on the field identifier and an inverted index, the inverted index comprising a plurality of entries, each entry of the plurality of entries comprising:

a field value corresponding to the field identifier, and one or more event references, each event reference indicative of an event of the events that is associated with the field value;

generating a summarization of the plurality of groups of data based at least in part on the summarizing criteria specified by the one or more second graphical controls; and causing display of the summarization.

29. The computer-readable medium of claim 28, wherein the summarization comprises the plurality of groups based at least in part on a number of different categorization criteria-value pairs associated with the set of data and a count for each group of the plurality of groups, the count corresponding to a number of events that satisfy the filter criteria and are associated with matching categorization criteria-value pairs.

\* \* \* \* \*